US012552049B2

(12) United States Patent
Hirata et al.

(10) Patent No.: US 12,552,049 B2
(45) Date of Patent: Feb. 17, 2026

(54) DRIVE DEVICE, MANIPULATOR, PUPPET OPERATING DEVICE, AND MOVABLE BASE

(71) Applicant: Sony Interactive Entertainment Inc., Tokyo (JP)

(72) Inventors: Shinichi Hirata, Kanagawa (JP); Hitoshi Nakamura, Tokyo (JP); Yuuichi Machida, Kanagawa (JP); Toru Kuronuma, Kanagawa (JP); Takuya Kuji, Tokyo (JP); Maito Omori, Tokyo (JP); Toshiyuki Ando, Tokyo (JP); Yumi Ueda, Chiba (JP); Takeshi Asano, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 37 days.

(21) Appl. No.: 18/832,308

(22) PCT Filed: Feb. 17, 2022

(86) PCT No.: PCT/JP2022/006494
§ 371 (c)(1),
(2) Date: Jul. 23, 2024

(87) PCT Pub. No.: WO2023/157203
PCT Pub. Date: Aug. 24, 2023

(65) Prior Publication Data
US 2025/0108518 A1    Apr. 3, 2025

(51) Int. Cl.
*G06F 17/00* (2019.01)
*A63J 19/00* (2006.01)
*B25J 15/00* (2006.01)

(52) U.S. Cl.
CPC ......... *B25J 15/0095* (2013.01); *A63J 19/006* (2013.01)

(58) Field of Classification Search
CPC ....... B25J 15/0095; B25J 13/00; A63J 19/006
(Continued)

(56) References Cited

U.S. PATENT DOCUMENTS

| 1,501,912 A | * | 7/1924 | Meehan | ............... A63J 19/006 446/366 |
| 2,760,305 A | * | 8/1956 | Hetrick | ............... A63J 19/006 446/392 |

(Continued)

FOREIGN PATENT DOCUMENTS

| JP | 2003145474 A | 5/2003 |
| JP | 201899755 A | 6/2018 |

(Continued)

OTHER PUBLICATIONS

How Do Robot Manipulators Move_ Robotic Sea Bass (Year: 2024).*
International Search Report for corresponding PCT Application No. PCT/JP2022/006494, 4 pages, dated May 17, 2022.

*Primary Examiner* — Ronnie M Mancho
(74) *Attorney, Agent, or Firm* — Kilpatrick Townsend & Stockton LLP

(57) ABSTRACT

A drive device (7) that unwinds, in a first direction, a wire (WR) connected to an operation target (41, 551, 552) with predetermined tension and pulls the wire in a direction opposite to the first direction to cause the operation target to perform an action includes a motor (71), a first rotating member (74) that can be rotated by the motor in a second direction and in a direction opposite to the second direction about a rotation axis (Rx5), a pulling member (TM) that is provided rotatably coaxially with the first rotating member, holds an end (WR1) of the wire, rotates in the second direction to unwind the wire in the first direction, and rotates in the direction opposite to the second direction to pull the wire in the direction opposite to the first direction, and a (Continued)

pulling member side urging member (77) that urges the pulling member in the direction opposite to the second direction relative to the first rotating member, in which, when the wire is moved in the first direction due to an external factor, the pulling member rotates in the second direction against an urging force of the pulling member side urging member, to unwind the wire in the first direction.

21 Claims, 33 Drawing Sheets

(58) Field of Classification Search
USPC .......................................................... 700/245
See application file for complete search history.

(56) References Cited

U.S. PATENT DOCUMENTS

| | | | |
|---|---|---|---|
| 3,496,673 A * | 2/1970 | Carpenter | A63J 19/006 446/363 |
| 3,564,764 A * | 2/1971 | Crossman et al. | A63J 19/006 446/359 |
| 2025/0108518 A1 * | 4/2025 | Hirata | B25J 13/00 |

FOREIGN PATENT DOCUMENTS

| | | | | |
|---|---|---|---|---|
| KR | 101054296 B1 * | 8/2011 | | |
| WO | WO-2023157203 A1 * | 8/2023 | ......... | B25J 15/0095 |

\* cited by examiner

DRIVE DEVICE, MANIPULATOR, PUPPET OPERATING DEVICE, AND MOVABLE BASE

TECHNICAL FIELD

The present invention relates to a drive device, a manipulator, a puppet operating device, and a movable base.

BACKGROUND ART

Conventionally, there have been known robot hands that are mounted on a machine such as a robot arm and grip an article (see PTL 1, for example).

A robot hand described in PTL 1 includes three finger sections and a control section that controls the position of a leading end of each finger section in opening/bending directions. The control section has control wires and a control body section, and each control wire is provided corresponding to one of the fingers. The control body section includes a motor such as a servomotor, and pulls and unwinds the control wires. When the motor of the control body section rotates and each finger section is pulled via the control wire, the leading end of each finger section gets opened significantly. When the motor is caused to rotate in the opposite direction in this state, the control wires are unwound by the motor, and the leading end of each finger section moves in the bending direction. Such an action causes the robot hand to grip an article.

CITATION LIST

Patent Literature

[PTL1] JP 2018-99755A

SUMMARY

Technical Problem

However, there is a possibility that, in the configuration of the robot hand described in PTL 1, the finger sections no longer perform actions normally in a case where a stress acts on the finger sections unintentionally due to an external factor.

For example, in a case where a stress in the opening direction of the leading end of a finger section acts on the finger section due to an external factor, the control wire is pulled toward the finger section, and the motor is caused to rotate in the opposite direction forcibly. In this case, there is a possibility that a load is applied to the motor.

In addition, for example, in a case where a stress in the bending direction of the leading end of a finger section acts on the finger section due to an external factor, the control wire loosens undesirably. In this case, there is a possibility that the finger section no longer performs an action normally even in a case where the motor rotates and the control wire is pulled.

A configuration that can solve at least part of such a problem has been demanded.

Solution to Problem

A drive device according to a first aspect of the present invention is a drive device that unwinds, in a first direction, a wire connected to an operation target with predetermined tension and pulls the wire in a direction opposite to the first direction to cause the operation target to perform an action. The drive device includes a motor, a first rotating member that is able to be rotated by the motor in a second direction and in a direction opposite to the second direction about a rotation axis, a pulling member that is provided rotatably coaxially with the first rotating member, holds an end of the wire, rotates in the second direction to unwind the wire in the first direction, and rotates in the direction opposite to the second direction to pull the wire in the direction opposite to the first direction, and a pulling member side urging member that urges the pulling member in the direction opposite to the second direction relative to the first rotating member. When the wire is moved in the first direction due to an external factor, the pulling member rotates in the second direction against an urging force of the pulling member side urging member, to unwind the wire in the first direction.

A drive device according to a second aspect of the present invention is a drive device that unwinds, in a first direction, a wire connected to an operation target with predetermined tension and pulls the wire in a direction opposite to the first direction to cause the operation target to perform an action. The drive device includes a motor, a rotating member that is able to be rotated by the motor in a second direction and in a direction opposite to the second direction about a rotation axis, a coupling member that is provided rotatably coaxially with the rotating member, is coupled with the wire, rotates in the second direction integrally with the rotating member to unwind the wire in the first direction, and rotates in the direction opposite to the second direction integrally with the rotating member to pull the wire in the direction opposite to the first direction, and a coupling member side urging member that urges the coupling member in the direction opposite to the second direction. When the wire is moved in the direction opposite to the first direction due to an external factor, the coupling member rotates in the direction opposite to the second direction independently of the rotating member due to an urging force of the coupling member side urging member to pull the wire in the direction opposite to the first direction.

A manipulator according to a third aspect of the present invention includes an arm having a plurality of links bendable relative to each other, a wire connected to at least one of the plurality of links, and the drive device according to the first or second aspect described above that unwinds the wire in the first direction and pulls the wire in the direction opposite to the first direction to drive the arm.

A puppet operating device according to a fourth aspect of the present invention is a puppet operating device that is attached inside a puppet and that causes the puppet to perform an action, the puppet operating device including the manipulator according to the third aspect described above and a support member. The manipulator includes a plurality of sets of the arm, the wire, and the drive device. A plurality of the arms include a first arm that is mounted to extend leftward from a left portion of the support member as seen from a front surface side of the support member, a second arm that is mounted to extend rightward from a right portion of the support member as seen from the front surface side of the support member, and a third arm and a fourth arm that are mounted to extend upward from an upper portion of the support member as seen from the front surface side of the support member. The third arm is arranged to a left side of the fourth arm as seen from the front surface side of the support member.

A movable base according to a fifth aspect of the present invention includes a first base, a second base arranged to face the first base, a support mechanism that is provided to the second base and that supports the first base, a wire, and the drive device according to the first or second aspect described above that unwinds and pulls the wire. The support mechanism includes a main moving link having a main moving link side mounting section mounted on one base of the first base and the second base and a main moving link side sliding section that is able to slide along the other base of the first base and the second base. The drive device either pulls or unwinds the wire to cause the main moving link side sliding section to slide, thereby inclining the first base relative to the second base.

DESCRIPTION OF EMBODIMENTS

First Embodiment

Hereinbelow, a first embodiment of the present invention is explained on the basis of figures.

Figure 1:
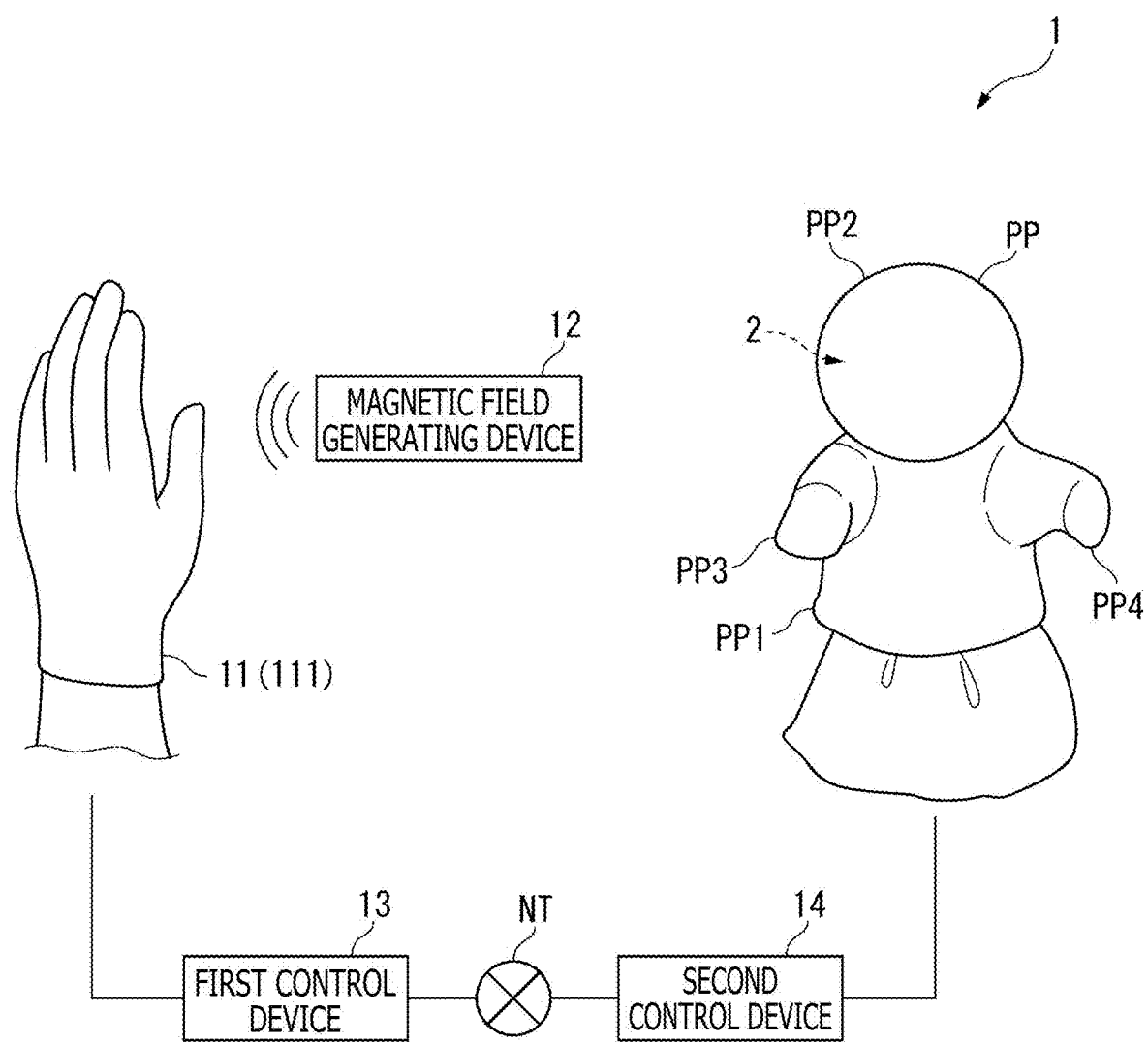
FIG. 1 is a schematic diagram depicting a configuration of an operation system in a first embodiment.

[Schematic Configuration of Operation System] FIG. 1 is a schematic diagram depicting a configuration of an operation system 1 according to the present embodiment.

As depicted in FIG. 1, the operation system 1 according to the present embodiment includes an operating device 11, a magnetic field generating device 12, a first control device 13, a second control device 14, and a puppet operating device 2. In the operation system 1, via the first control device 13 and the second control device 14, the operating device 11 remotely operates the puppet operating device 2 on which a puppet PP is attached, and also the operating device 11 causes a user to perceive a stimulus sensed at the puppet operating device 2.

Note that the puppet PP is a hollow doll having a trunk section PP1, a head section PP2, a right arm section PP3, and a left arm section PP4, and is formed of cloth, for example.

In addition, the magnetic field generating device 12 generates a magnetic field to be sensed by a position/posture sensing section 112 of the operating device 11.

Figure 2:
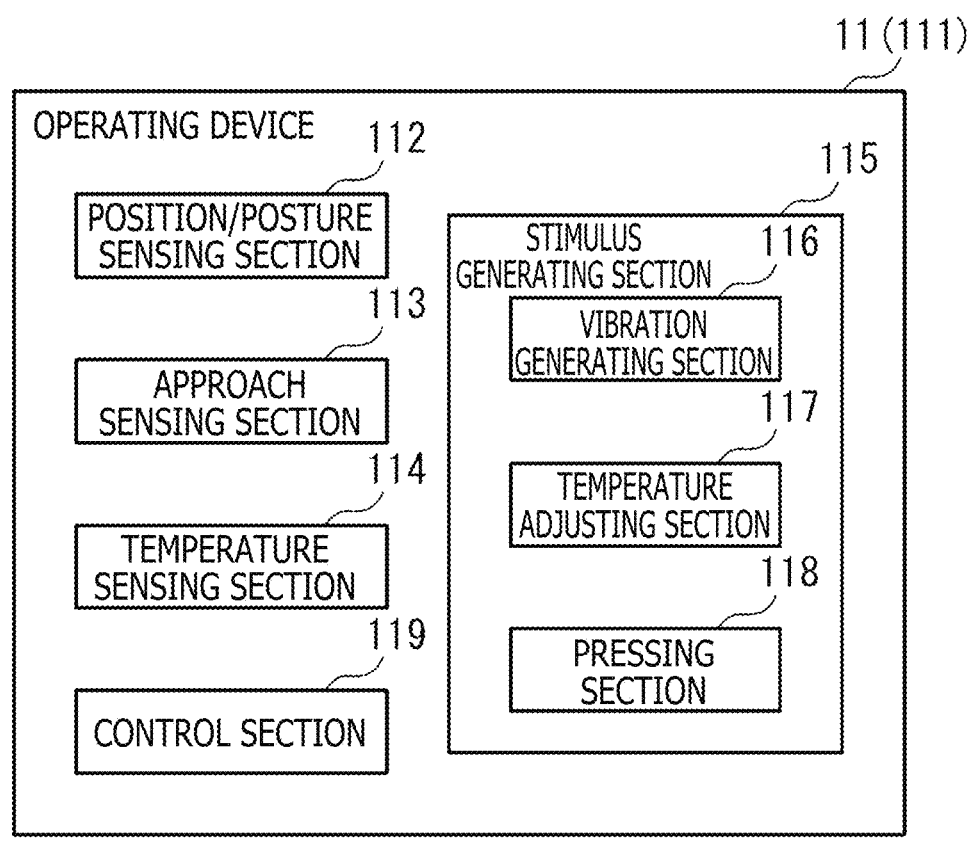
FIG. 2 is a block diagram depicting a configuration of an operating device in the first embodiment.

[Configuration of Operating Device] FIG. 2 is a block diagram depicting a configuration of the operating device 11.

The operating device 11 remotely operates the puppet operating device 2. Specifically, the operating device 11 senses a motion of the user, transmits an operation signal according to the sensed motion of the user to the first control device 13, and operates the puppet operating device 2 via the first control device 13 and the second control device 14. In addition, the operating device 11 gives an external stimulus to the user according to a control signal received from the first control device 13 on the basis of a result of sensing by the puppet operating device 2.

As depicted in FIG. 1, the operating device 11 includes a glove-like attachment section 111 to be attached to one hand of the user, and, in addition, includes the position/posture sensing section 112, an approach sensing section 113, a temperature sensing section 114, a stimulus generating section 115, and a control section 119 as depicted in FIG. 2.

The position/posture sensing section 112 is provided to the attachment section 111, senses the positions and postures of a hand/fingers (a hand and its fingers) of the user, and thus senses motions of the hand/fingers of the user.

The approach sensing section 113 is provided to the attachment section 111, and senses approach of an object to the hand/fingers of the user and a pressure from an object in contact.

The temperature sensing section 114 is provided to the attachment section 111, and senses the temperature of the hand/fingers of the user.

The stimulus generating section 115 is provided to the attachment section 111, performs an action on the basis of a control signal received from the first control device 13, and gives an external stimulus to the user. That is, the stimulus generating section 115 artificially reproduces a stimulus to the puppet PP on the basis of a control signal according to a result of sensing by the puppet operating device 2 that senses stimuli to the puppet PP. The stimulus generating section 115 includes a vibration generating section 116, a temperature adjusting section 117, and a pressing section 118.

By giving a vibration to the user, the vibration generating section 116 generates an illusion that an object is in contact with the hand/fingers of the user.

The temperature adjusting section 117 gives a warm sensation and a cold sensation to the hand/fingers of the user.

The pressing section 118 presses the hand/fingers of the user and gives a pressure to the user.

The control section 119 controls actions of the operating device 11. The control section 119 transmits, to the first control device 13, an operation signal representing the positions and postures of the hand/fingers sensed by the position/posture sensing section 112. The control section 119 transmits, to the first control device 13, a sensing signal representing a result of sensing by the approach sensing section 113. The control section 119 transmits, to the first control device 13, a sensing signal representing a temperature sensed by the temperature sensing section 114. The control section 119 causes the stimulus generating section 115 to perform an action on the basis of a control signal received from the first control device 13.

[Configuration of First Control Device] The first control device 13 depicted in FIG. 1 communicates with the operating device 11, and, in addition, communicates with the second control device 14 via a network NT. The first control device 13 transmits, to the second control device 14, operational information according to an operation signal input from the operating device 11 and sensing information according to a sensing signal input from the operating device 11, and, in addition, causes the operating device 11 to perform an action on the basis of sensing information received from the second control device 14. That is, the first control device 13 controls some of constituent elements of the operating device 11.

For example, on the basis of an operation signal input from the operating device 11, the first control device 13 generates operational information suitable for causing the puppet operating device 2 to perform an action, and transmits the generated operational information to the second control device 14. In addition, on the basis of sensing information received from the second control device 14, the first control device 13 generates a control signal for causing the stimulus generating section 115 of the operating device 11 to perform an action, transmits the generated control signal to the operating device 11, and causes the stimulus generating section 115 to perform an action.

[Configuration of Second Control Device] The second control device 14 communicates with the puppet operating device 2, and, in addition, communicates with the first control device 13 via the network NT. The second control device 14 controls actions of the puppet operating device 2.

Specifically, according to operational information received from the first control device 13, the second control device 14 causes the puppet operating device 2, and hence the puppet PP, to perform an action.

For example, the second control device 14 transmits, to the puppet operating device 2, a control signal based on operational information received from the first control device 13. In addition, the second control device 14 transmits, to the first control device 13, sensing information representing a result of sensing by the puppet operating device 2.

[Configuration of Puppet Operating Device] The puppet operating device 2 is an operation target operated by the operating device 11. The puppet operating device 2 is inserted inside the puppet PP and causes the puppet PP to perform actions. The puppet operating device 2 can also be called an operating device that is operated by another user different from the user who uses the operating device 11, and that gives an external stimulus to the user by use of the operating device 11. That is, the puppet operating device 2 is a communication tool for allowing the user who uses the operating device 11 and another user that contacts the puppet operating device 2 to communicate with each other.

Figure 3:
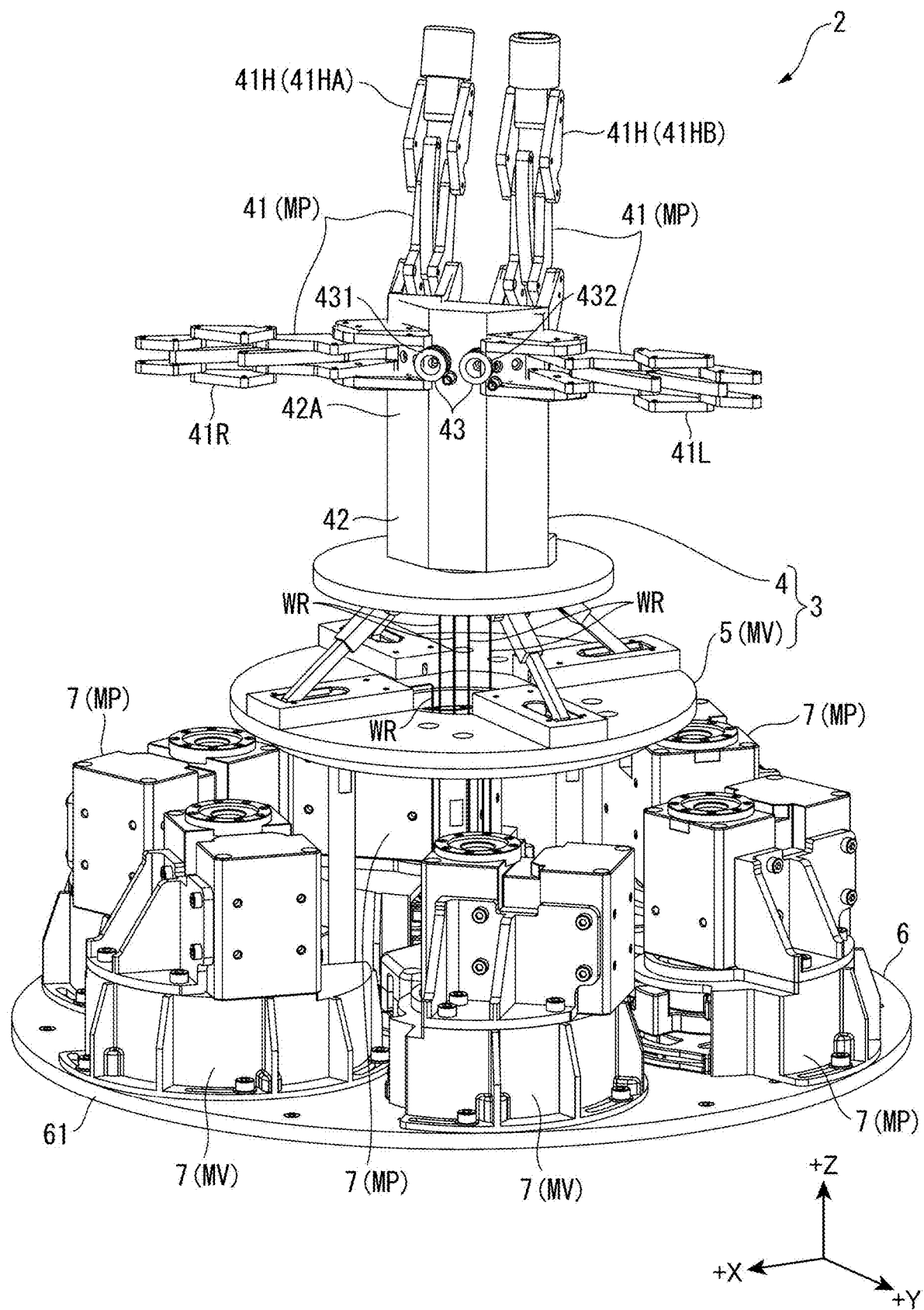
FIG. 3 is a perspective view depicting a puppet operating device in the first embodiment.
Figure 4:
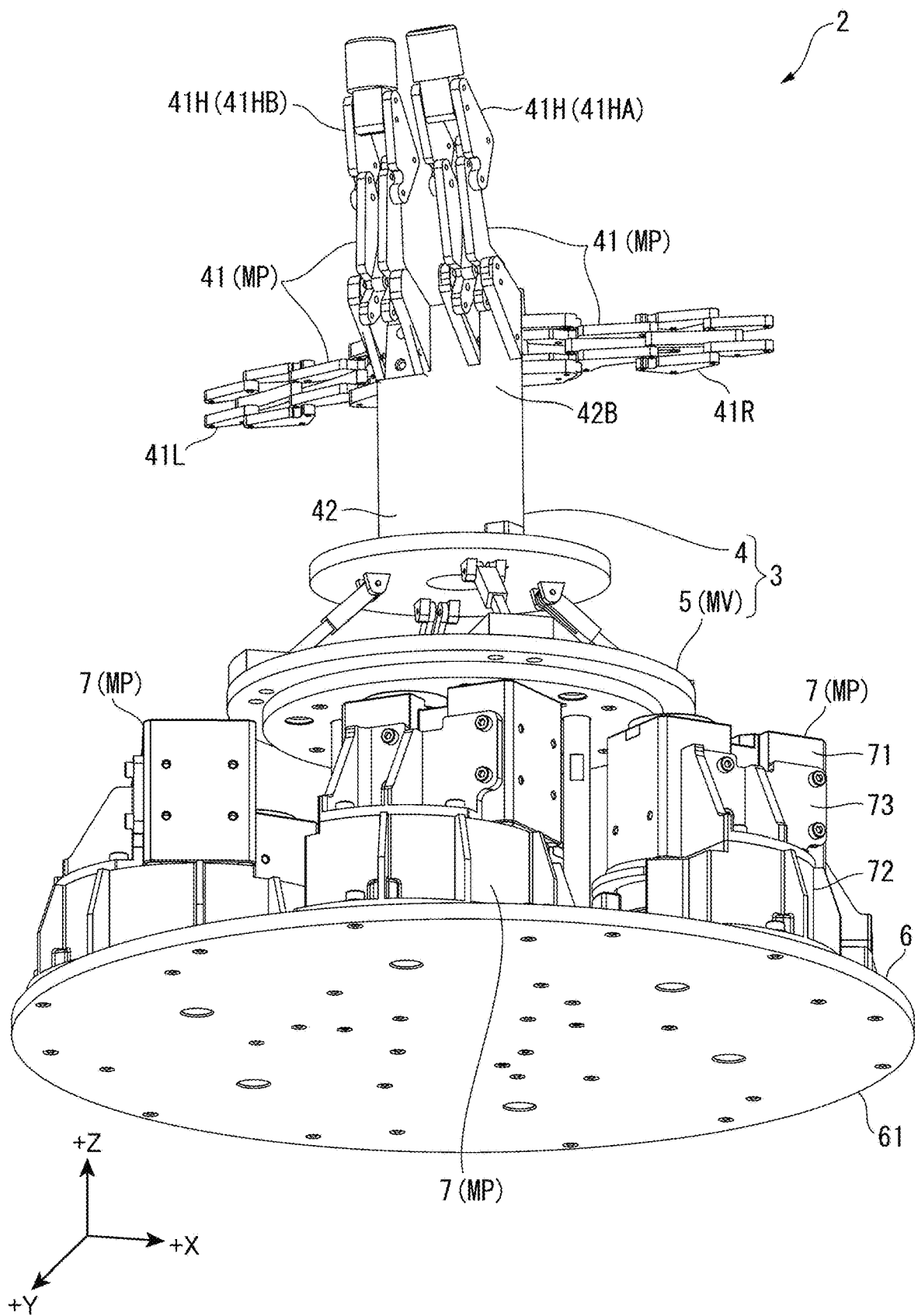
FIG. 4 is a perspective view depicting the puppet operating device in the first embodiment.

FIG. 3 is a perspective view depicting the puppet operating device 2 as seen from a front surface side, and FIG. 4 is a perspective view depicting the puppet operating device 2 as seen from a back surface side.

As depicted in FIG. 3 and FIG. 4, the puppet operating device 2 includes an action unit 3 and a drive unit 6.

In the following explanation, mutually perpendicular directions are defined as +X direction, +Y direction, and +Z direction. +Z direction is a direction in which the action unit 3 is arranged relative to the drive unit 6, and is an upward direction as seen in FIG. 3 and FIG. 4. +Y direction is a right direction as seen from +X direction, with +Z direction pointing the upward direction. In addition, although illustrations are omitted, a direction opposite to +X direction is −X direction, a direction opposite to +Y direction is −Y direction, and a direction opposite to +Z direction is −Z direction.

Furthermore, a surface, in surfaces of an object, that is oriented toward a direction, in directions perpendicular to +Z direction, that crosses both +X direction and +Y direction at 45° is a front surface, and a surface on a side opposite to the front surface is a back surface.

Figure 5:
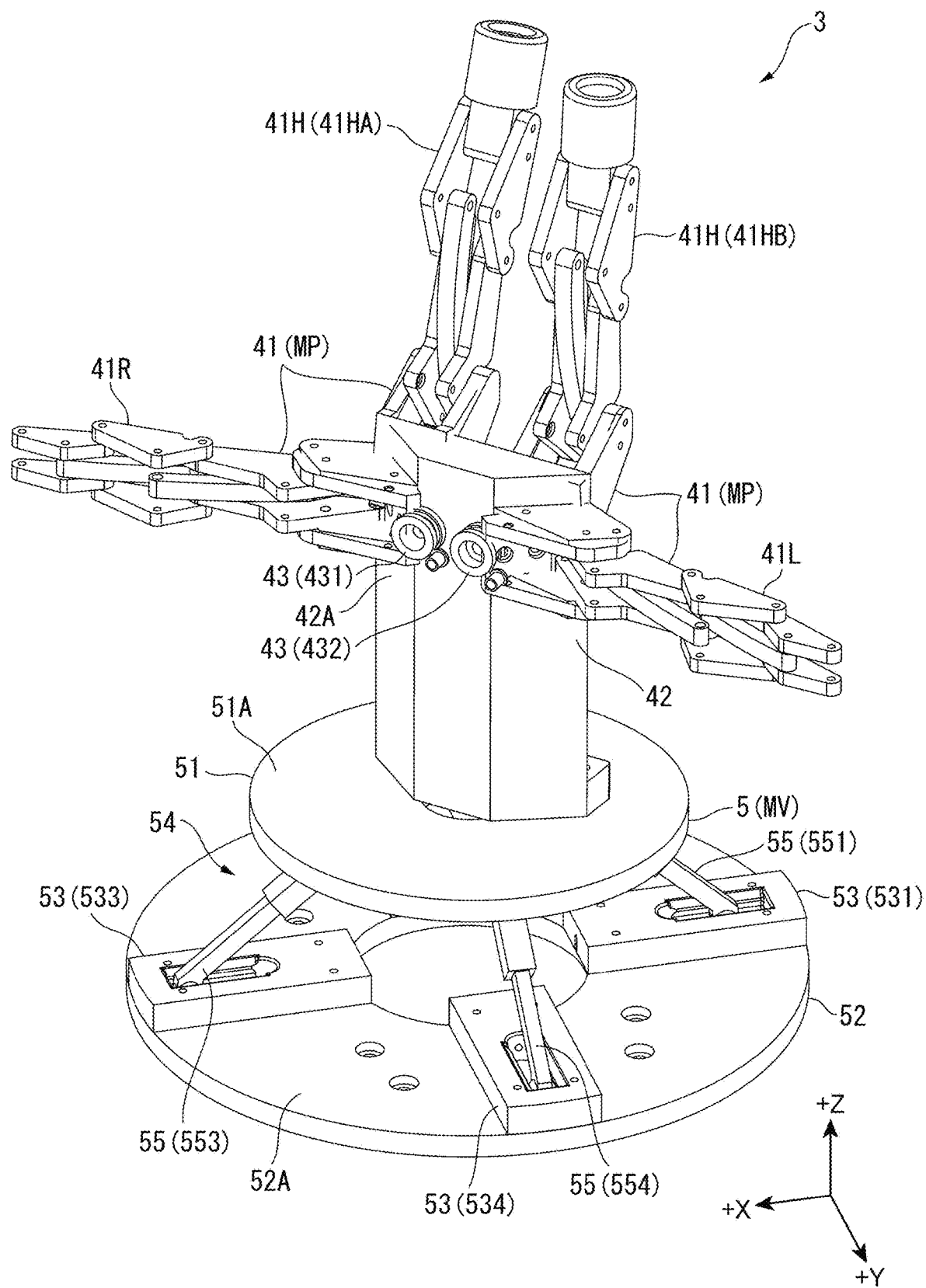
FIG. 5 is a perspective view depicting an action unit in the first embodiment.

[Configuration of Action Unit] FIG. 5 is a perspective view depicting the action unit 3 as seen from the front surface side.

The action unit 3 is arranged in +Z direction relative to the drive unit 6 and is caused to perform an action by the drive unit 6. As depicted in FIG. 3 to FIG. 5, the action unit 3 includes an arm unit 4 and a base unit 5.

[Configuration of Arm Unit] The arm unit 4 is a unit that is inserted in the puppet PP and that bends and extends the head section PP2, the right arm section PP3, and the left arm section PP4 of the puppet PP. The arm unit 4 includes four arms 41, and a support member 42 that supports the four arms 41.

[Configuration of Support Member] First, the support member 42 is explained.

The support member 42 supports each arm 41.

The support member 42 is fixed to a first base 51, mentioned later, of the base unit 5. As depicted in FIG. 3 and FIG. 5, a right arm 41R and a left arm 41L in the four arms 41 are mounted on a front surface 42A of the support member 42.

The front surface 42A is provided with two pulleys 43 and bearings (illustration omitted) that rotatably support the respective pulleys. A wire WR connected with the right arm 41R is wound around a +X direction side pulley 431 in the two pulleys 43, and a wire WR connected with the left arm 41L is wound around a +Y direction side pulley 432 in the two pulleys 43.

As depicted in FIG. 4, two upper arms 41H are mounted on a back surface 42B of the support member 42 in such a manner that the two upper arms 41H extend in +Z direction.

[Configuration of Arms] At least one arm 41 of the plurality of arms 41 and the at least one arm 41 in a plurality of drive devices 7 included in the drive unit 6 constitute a manipulator MP.

That is, a manipulator MP includes an arm 41, a wire WR, and a drive device 7. The arm 41 has a plurality of links that can bend relative to each other. The wire WR is connected to at least one of the plurality of links and moves in a first direction and a direction opposite to the first direction to drive the arm 41. As mentioned specifically later, the drive device 7 unwinds the wire WR in the first direction and pulls the wire WR in the direction opposite to the first direction to drive the arm 41.

The four arms 41 cause the respective sections PP2 to PP4 of the puppet PP to perform actions. The four arms 41 include the right arm 41R, the left arm 41L, and the two upper arms 41H.

The right arm 41R is equivalent to a first arm. The right arm 41R is mounted to extend leftward from a left portion of the support member 42 as seen from the front surface side of the support member 42. That is, the right arm 41R is mounted to extend in +X direction from a +X direction side portion of the support member 42. The right arm 41R causes the right arm section PP3 to perform an action when the arm unit 4 is attached to the puppet PP.

The left arm 41L is equivalent to a second arm. The left arm 41L is mounted to extend rightward from a right portion of the support member 42 as seen from the front surface side of the support member 42. That is, the left arm 41L is mounted to extend in +Y direction from a +Y direction side portion of the support member 42. The left arm 41L causes the left arm section PP4 to perform an action when the arm unit 4 is attached to the puppet PP.

The two upper arms 41H are mounted to extend upward from an upper portion of the support member 42 as seen from the front surface side of the support member 42. One of the two upper arms 41H is an upper first arm 41HA, and the other of the two upper arms 41H is an upper second arm 41HB. The upper first arm 41HA is equivalent to a third arm, and the upper second arm 41HB is equivalent to a fourth arm. The upper first arm 41HA is arranged to the left side of the upper second arm 41HB as seen from the front surface side of the support member 42. That is, the upper first arm 41HA and the upper second arm 41HB are mounted to extend in +Z direction from a +Z direction side portion of the support member 42 as seen from the front surface side of the support member 42. Then, the upper first arm 41HA is arranged to the left side of the upper second arm 41HB as seen from the front surface side of the support member 42. When the arm unit 4 is attached to the puppet PP, the upper first arm 41HA and the upper second arm 41HB mutually independently cause the head section PP2 to perform actions.

Each arm 41HA, 41HB, 41R, or 41L is connected to a corresponding drive device 7 in the plurality of drive devices 7 via a wire WR. Then, the corresponding drive device 7 unwinds or pulls the wire WR to thereby bend each arm 41HA, 41HB, 41R, or 41L as in a case where the fingers of the hand are bent, or extend each arm 41HA, 41HB, 41R, or 41L as in a case where the fingers of the hand are extended.

As a result, the right arm section PP3 of the puppet PP is bent or extended by the arm 41R, and the left arm section PP4 of the puppet PP is bent or extended by the arm 41L. The head section PP2 of the puppet PP is bent or extended by the arms 41HA and 41HB at a portion corresponding to the neck of the puppet PP. At this time, by bending the upper first arm 41HA in the upper arms 41H toward the front surface side while the upper second arm 41HB is kept extended upward, the head section PP2 can be inclined leftward as seen from the front surface side. In addition, for example, by bending the upper second arm 41HB in the upper arms 41H toward the front surface side while the upper first arm 41HA is kept extended upward, the head section PP2 can be inclined rightward as seen from the front surface side.

Note that predetermined tension is applied to the wires WR connecting the arms 41 and the drive devices 7. Because of this, in a case where an arm 41 is extended due to an external factor such as another user, a load is applied to the drive device 7. In addition, in a case where an arm 41 is bent due to an external factor, the wire WR loosens, and there is a possibility that an action of the arm 41 cannot be performed appropriately. The drive devices 7 have a configuration to cope with such a problem. The configuration of the drive devices 7 is mentioned specifically later.

[Configuration of Base Unit] As depicted in FIG. 3 to FIG. 5, the base unit 5 supports the arm unit 4 and also inclines the arm unit 4 relative to an imaginary plane perpendicular to +Z direction. The base unit 5 constitutes a movable base MV. Specifically, the movable base MV includes the base unit 5, wires WR, and drive devices 7 that unwind and pull the wires WR.

Figure 6:
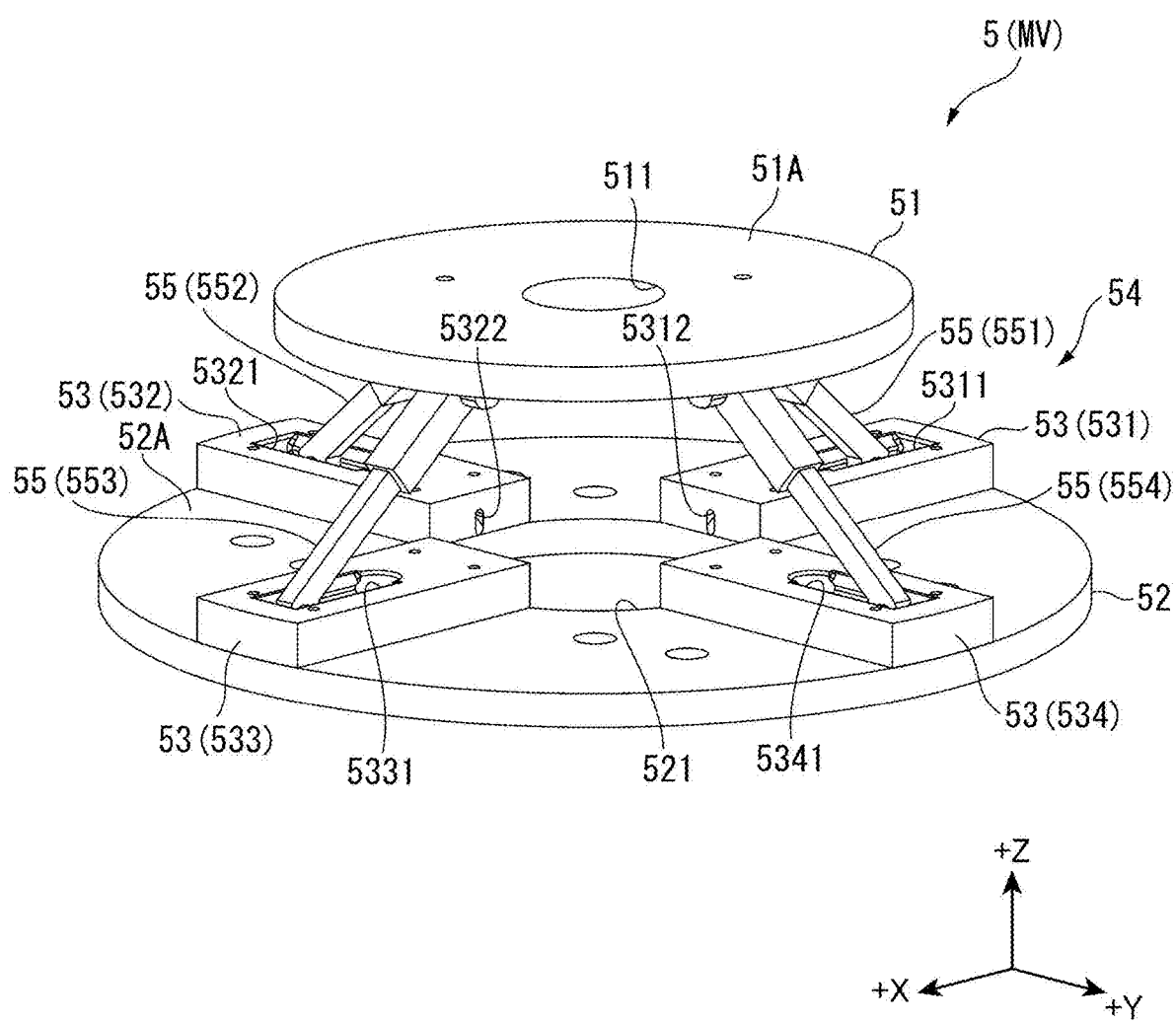
FIG. 6 is a perspective view depicting a base unit in the first embodiment.
Figure 7:
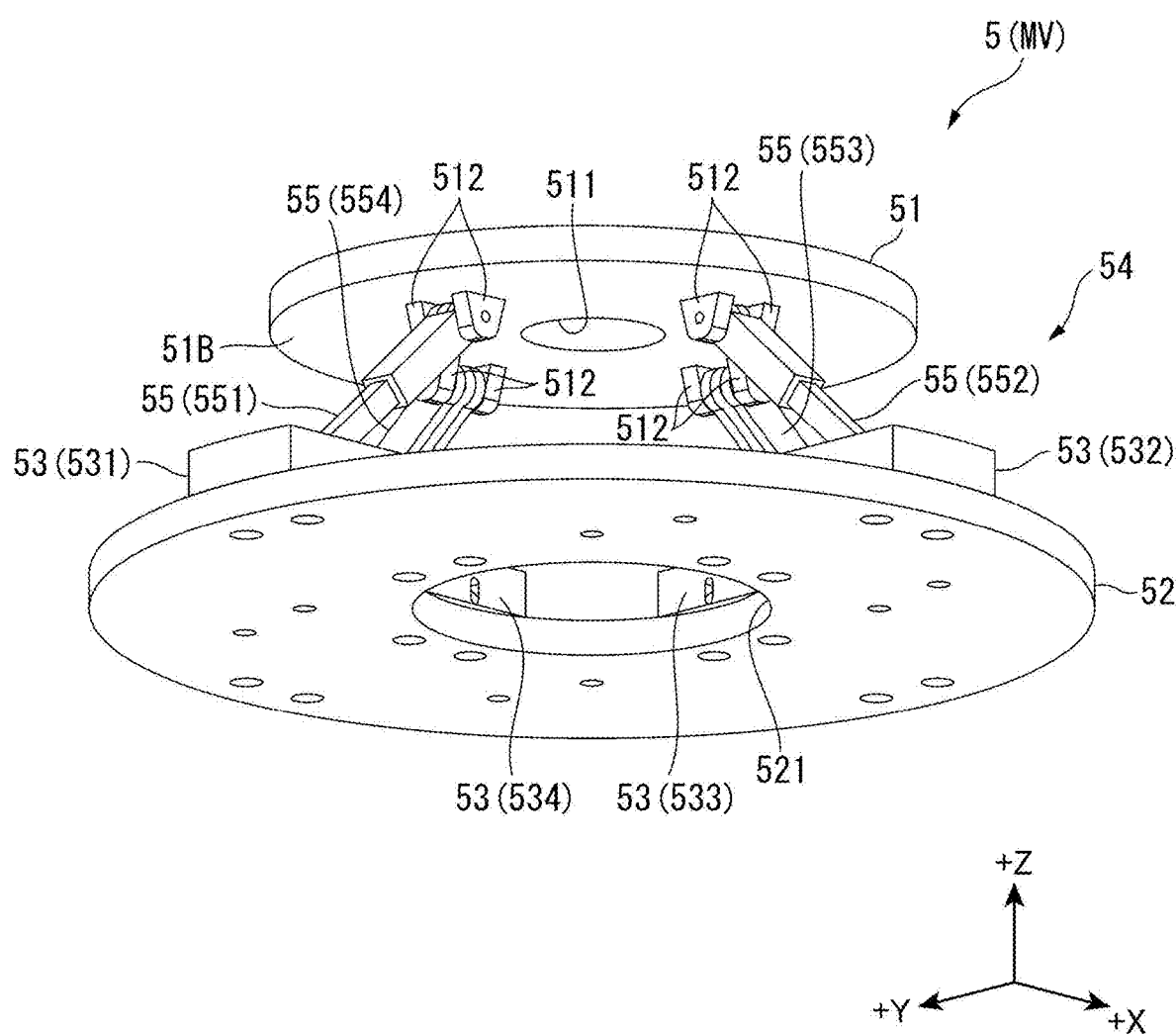
FIG. 7 is a perspective view depicting the base unit in the first embodiment.

FIG. 6 is a perspective view depicting the base unit 5 as seen from the front surface side, and FIG. 7 is a perspective view depicting the base unit 5 as seen from the back surface side.

As depicted in FIG. 6 and FIG. 7, the base unit 5 includes the first base 51, a second base 52, a plurality of guide rails 53, and a support mechanism 54. As mentioned specifically later, the drive devices 7 pull or unwind the wires WR to cause sliding sections 5512 and 5522 of main moving links 551 and 552 of the support mechanism 54 to slide along the second base 52. As a result, in the base unit 5, the first base 51 is inclined relative to the second base 52.

Hereinbelow, respective constituent elements of the base unit 5 are explained.

[Configuration of First Base] The first base 51 supports the arm unit 4 at a +Z direction side surface 51A. The first base 51 is formed in a ring shape as seen from +Z direction, and the middle of the first base 51 is provided with an opening 511. The wires WR (see FIG. 3) are inserted through the opening 511 along +Z direction.

As depicted in FIG. 7, the first base 51 has a plurality of connecting sections 512 provided to a −Z direction side surface 51B. Each of the plurality of connecting sections 512 pivotably supports a corresponding link 55 in four links 55 constituting the support mechanism 54. That is, the first base 51 has four connecting sections 512.

[Configuration of Second Base] The second base 52 is equivalent to the other base in the first base 51 and the second base 52. As depicted in FIG. 6 and FIG. 7, the second base 52 is arranged in −Z direction relative to the first base 51 and is arranged to face the first base 51. As with the first base 51, the second base 52 is formed in a ring shape as seen from +Z direction, and the middle of the second base 52 is provided with an opening 521. The wires WR (see FIG. 3) are inserted through the opening 521 along +Z direction.

Figure 8:
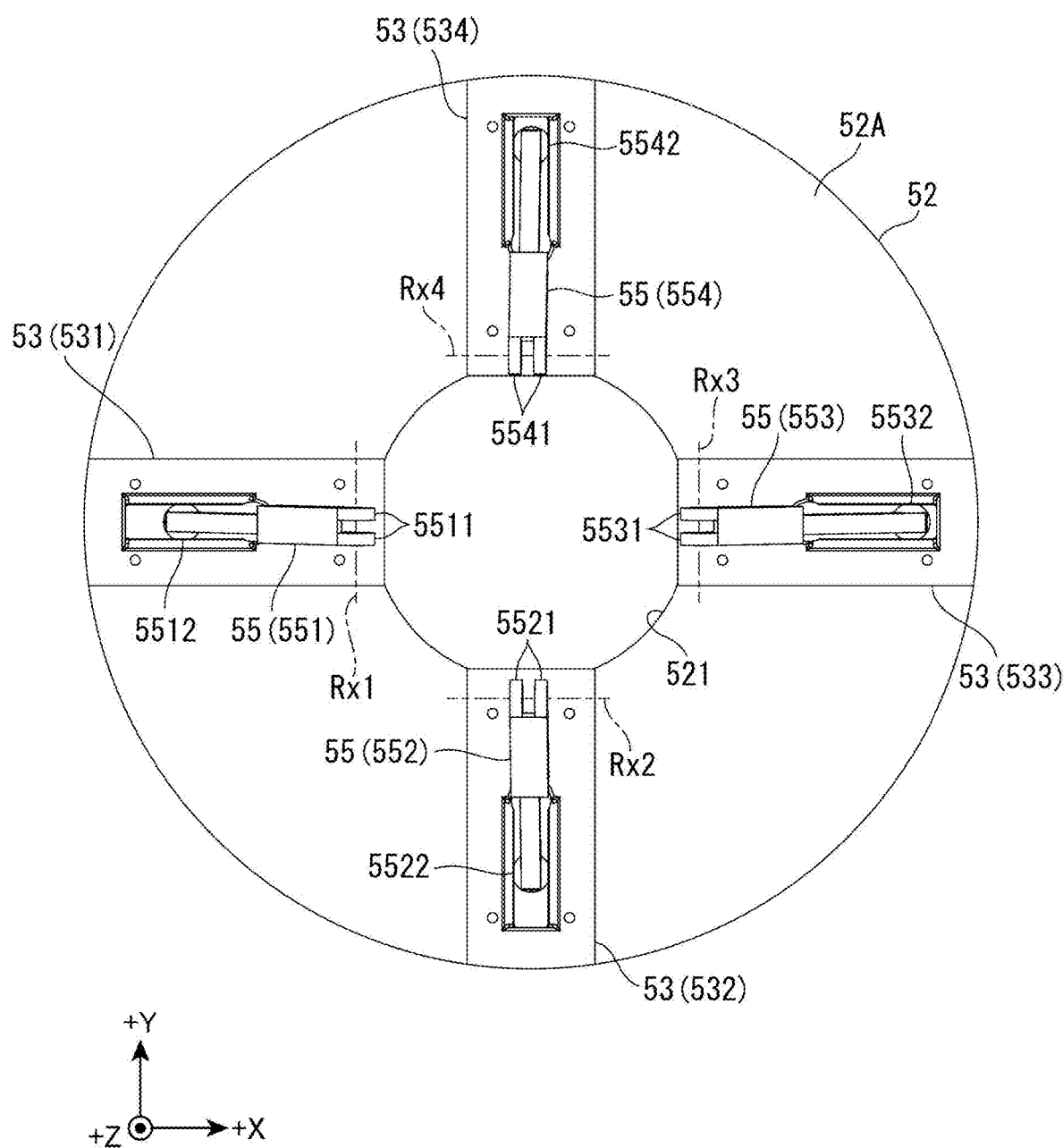
FIG. 8 is a plan view depicting a second base in the first embodiment.

[Configuration of Guide Rails] FIG. 8 is a plan view depicting the second base 52 as seen from +Z direction.

As depicted in FIG. 6 to FIG. 8, the plurality of guide rails 53 are provided to a +Z direction side surface 52A of the second base 52. In the present embodiment, four guide rails 53 are provided.

As depicted in FIG. 8, the four guide rail 53 include two first guide rails 531 and 532 and two second guide rails 533 and 534.

The first guide rail 531 is arranged in −X direction relative to the opening 521 and extends along −X direction. The first guide rail 531 has an opening 5311 that lies along −X direction, which is an extending direction of the first guide rail 531, and that opens in +Z direction. The sliding section 5512 of the main moving link 551 in the four links 55 is arranged inside the first guide rail 531 through the opening 5311, and the sliding section 5512 is thus coupled with the first guide rail 531 slidably along +X direction.

The first guide rail 532 is arranged in −Y direction relative to the opening 521 and extends along −Y direction. The first guide rail 532 has an opening 5321 that lies along −Y direction, which is an extending direction of the first guide rail 532, and that opens in +Z direction. The −Z direction side sliding section 5522 of the main moving link 552 in the four links 55 is arranged inside the first guide rail 532 through the opening 5321, and the sliding section 5522 is thus coupled with the first guide rail 532 slidably along +Y direction. The sliding sections 5512 and 5522 are equivalent to first sliding sections.

Note that an end of the first guide rail 531 on the opening 521 side has a hole 5312 that communicates with the inside of the first guide rail 531. A wire WR connected to the sliding section 5512 extends out of the first guide rail 531 through the hole 5312.

Similarly, an end of the first guide rail 532 on the opening 521 side has a hole 5322 that communicates with the inside of the first guide rail 532. A wire WR connected to the sliding section 5522 extends out of the first guide rail 532 through the hole 5322.

The second guide rail 533 is arranged in +X direction relative to the opening 521 and extends along +X direction. The second guide rail 534 is arranged in +Y direction relative to the opening 521 and extends along +Y direction. The second guide rail 533 has an opening 5331 that lies along an extending direction of the second guide rail 533 and that opens in +Z direction. Similarly, the second guide rail 534 has an opening 5341 that lies along an extending direction of the second guide rail 534 and that opens in +Z direction.

A −Z direction side sliding section 5532 of a follower moving link 553 in the four links 55 is arranged inside the second guide rail 533 through the opening 5331, and the sliding section 5532 is thus coupled with the second guide rail 533 slidably along −X direction. A −Z direction side sliding section 5542 of a follower moving link 554 in the four links 55 is arranged inside the second guide rail 534 through the opening 5341, and the sliding section 5542 is thus coupled with the second guide rail 534 slidably along −Y direction. The sliding sections 5532 and 5542 are equivalent to second sliding sections.

[Configuration of Support Mechanism] The support mechanism 54 is provided to the second base 52 and supports the first base 51. As depicted in FIG. 6 to FIG. 8, the support mechanism 54 includes a plurality of links 55 connected to both the first base 51 and the second base 52. In the present embodiment, the support mechanism 54 includes the four links 55. The four links 55 include the two main moving links 551 and 552, the two follower moving links 553 and 554, and urging members, which are not depicted.

Figure 9:
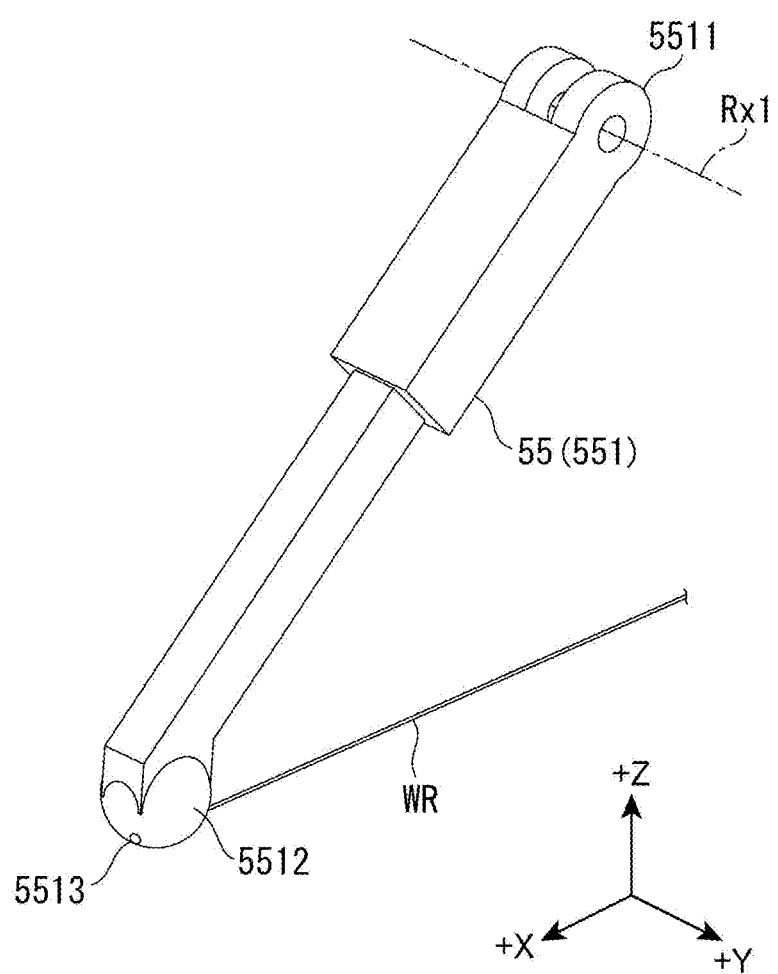
FIG. 9 is a perspective view depicting a main moving link in the first embodiment.

FIG. 9 is a perspective view depicting the main moving link 551.

Each of the main moving links 551 and 552 is connected with an end of a wire WR (see FIG. 3), and each of the main moving links 551 and 552 is individually moved by a drive device 7. That is, a plurality of the drive devices 7 mentioned later are provided corresponding to the main moving links 551 and 552.

As depicted in FIG. 9, the main moving link 551 has a mounting section 5511 provided to a +Z direction side end thereof and the sliding section 5512 provided to a −Z direction side end thereof.

The mounting section 5511 is equivalent to a main moving link side mounting section of the main moving link 551. The mounting section 5511 is mounted on a corresponding connecting section 512 in the plurality of connecting sections 512 provided to the first base 51, in such a manner that the mounting section 5511 can rotate about a pivot axis Rx1 crossing an extending direction of the main moving link 551. That is, the mounting section 5511 can rotate about the pivot axis Rx1 lying along +Y direction. In other words, the position of the mounting section 5511 on an X-Y plane is fixed. Note that the first base 51 is equivalent to one base of the first base 51 and the second base 52.

The sliding section 5512 is equivalent to a main moving link side sliding section of the main moving link 551. The sliding section 5512 is formed in a spherical shape. The sliding section 5512 is connected slidably along +X direction to the first guide rail 531 provided to the second base 52. That is, the sliding section 5512 can slide along +X direction due to the first guide rail 531.

The sliding section 5512 has a connecting section 5513 provided to an outer surface of the sliding section 5512. The connecting section 5513 is a hole that holds an inserted end of the wire WR, and, at this connecting section 5513, the end of the wire WR is connected to the sliding section 5512. The wire WR connected to the sliding section 5512 extends linearly, is inserted through the hole 5312 (see FIG. 7) of the first guide rail 531, and is inserted through the opening 521 in −Z direction. As a result, the wire WR can be prevented from being twisted.

As depicted in FIG. 8, as with the main moving link 551, the main moving link 552 has a +Z direction side mounting section 5521 and the −Z direction side sliding section 5522.

The mounting section 5521 is equivalent to a main moving link side sliding section of the main moving link 552. The mounting section 5521 is connected to a corresponding connecting section 512 in the plurality of connecting sections 512 in such a manner that the mounting section 5521 can rotate about a pivot axis Rx2 lying along +X direction crossing an extending direction of the main moving link 552.

The sliding section 5522 is equivalent to the main moving link side sliding section of the main moving link 552. The sliding section 5522 is formed in a spherical shape and is connected slidably along +Y direction to the first guide rail 532. Although illustrations are omitted, the sliding section 5522 has a connecting section similar to the connecting section 5513, and, at this connecting section, one end of a wire WR extending from a drive device 7 which is different from the drive device 7 connected to the main moving link 551 via the wire WR is connected to the sliding section 5522. Then, sliding movements of the sliding sections 5512 and 5522 change the angle relative to the second base 52.

In this manner, the directions, as seen from +Z direction, in which the sliding sections 5512 and 5522 of the respective main moving links 551 and 552 can slide cross each other.

The positions of the follower moving links 553 and 554 change according to positional changes of the main moving links 551 and 552.

The follower moving link 553 is provided being spaced apart from the main moving link 551 in ±X direction, which is a direction in which the sliding section 5512 can slide. As with the main moving link 551, the follower moving link 553 has a mounting section 5531 which is a +Z direction side end, and the sliding section 5532 which is a −Z direction side end.

The mounting section 5531 is equivalent to a follower moving link side mounting section of the follower moving link 553. The mounting section 5531 is connected to a corresponding connecting section 512 in the plurality of connecting sections 512 in such a manner that the mounting section 5531 can rotate about a pivot axis Rx3 lying along +Y direction crossing an extending direction of the follower moving link 553.

The sliding section 5532 is equivalent to a follower moving link side sliding section of the follower moving link 553. The sliding section 5532 is connected slidably along +X direction to the second guide rail 533. The sliding section 5532 is formed in a spherical shape. Such a sliding section 5532 is not provided with a connecting section connected with a wire WR.

The follower moving link 554 is provided being spaced apart from the main moving link 552 in ±Y direction, which is a direction in which the sliding section 5522 can slide. As with the follower moving link 553, the follower moving link 554 has a mounting section 5541 connected to a corresponding connecting section 512 in the plurality of connecting sections 512 in such a manner that the mounting section 5541 can rotate about a pivot axis Rx4 lying along +X direction crossing an extending direction of the follower moving link 554, and the spherical sliding section 5542 connected to the second guide rail 534 slidably along +Y direction. The mounting section 5541 is equivalent to the follower moving link side mounting section of the follower moving link 553, and the sliding section 5542 is equivalent to the follower moving link side sliding section of the follower moving link 553. Such a sliding section 5542 is not provided with a connecting section connected with a wire WR.

In this manner, the directions, as seen from +Z direction, in which the sliding sections 5532 and 5542 of the respective follower moving links 553 and 554 can slide cross each other.

Note that, when the base unit 5 is in its initial state, the sliding sections 5512, 5522, 5532, and 5542 are arranged at positions farthest from the opening 521 within slidable areas of the respective sliding sections 5512, 5522, 5532, and 5542.

The urging members are provided corresponding to the respective links 55 and urge the respective links 55 in such a manner that the state of the base unit 5 becomes the initial state. Specifically, the urging member corresponding to the main moving link 551 urges the sliding section 5512 in −X direction, and the urging member corresponding to the main moving link 552 urges the sliding section 5522 in −Y direction. The urging member corresponding to the follower moving link 553 urges the sliding section 5532 in +X direction, and the urging member corresponding to the follower moving link 554 urges the sliding section 5542 in +Y direction. An example of such urging members is a torsion coil spring whose one end is fixed to the first base 51 and other end is connected to the link 55.

Here, the lengthwise dimensions of the follower moving links 553 and 554 are greater than the lengthwise dimensions of the main moving links 551 and 552. That is, the dimensions between the mounting sections 5531 and 5541 and the sliding sections 5532 and 5542 of the follower moving links 553 and 554 are greater than the dimensions between the mounting sections 5511 and 5521 and the sliding sections 5512 and 5522 of the main moving links 551 and 552.

Specifically, the dimension between the mounting section 5511 and the sliding section 5512 of the main moving link 551 and the dimension between the mounting section 5521 and the sliding section 5522 of the main moving link 552 are the same. The dimension between the mounting section 5531 and the sliding section 5532 of the follower moving link 553 and the dimension between the mounting section 5541 and the sliding section 5542 of the follower moving link 554 are the same. Meanwhile, the dimension between the mounting section 5531 and the sliding section 5532 of the follower moving link 553 is greater than the dimension between the mounting section 5511 and the sliding section 5512 of the main moving link 551.

Figure 10:
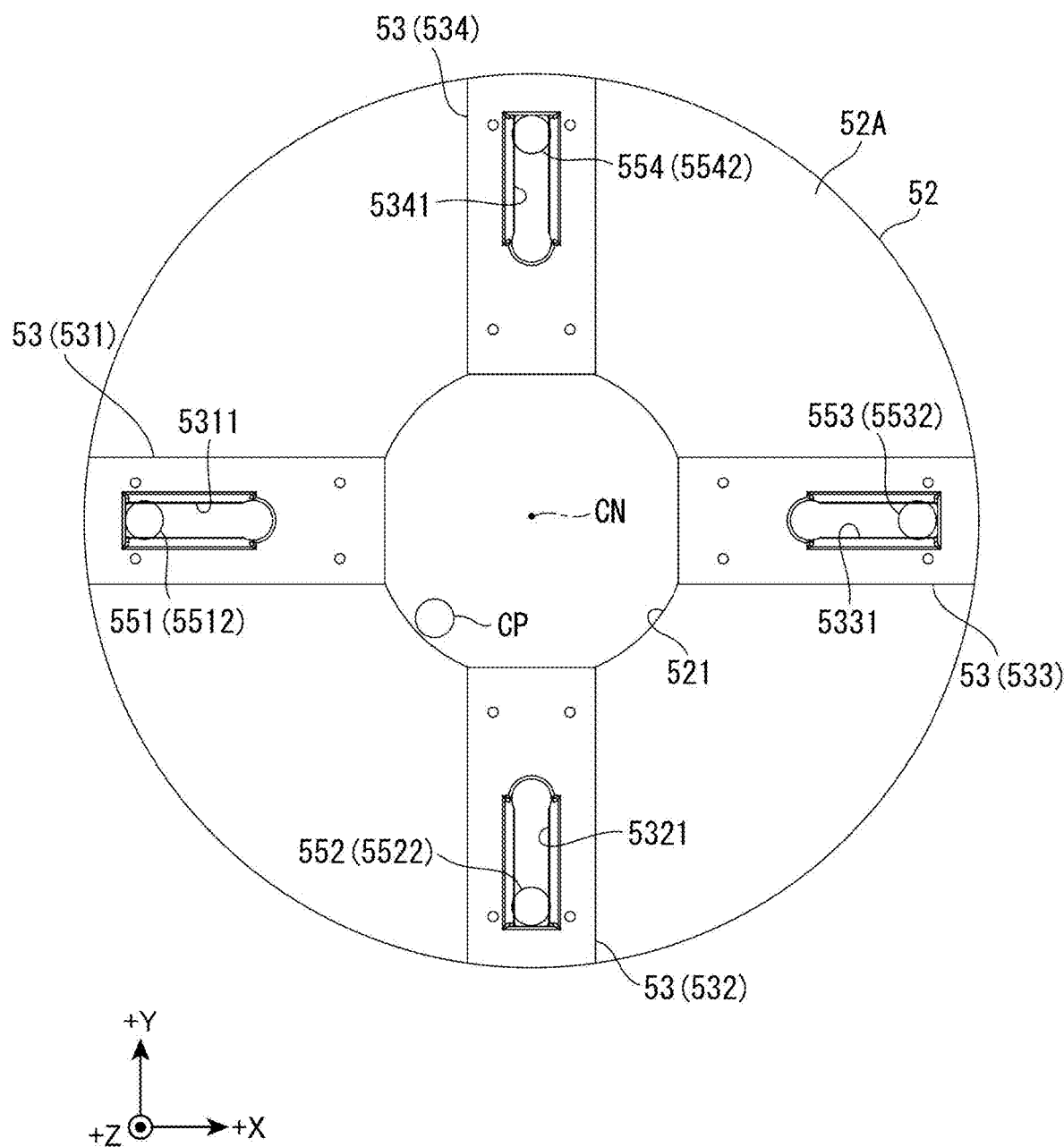
FIG. 10 is a figure schematically depicting a center-of-mass position of a first base in an initial state in the first embodiment.
Figure 11:
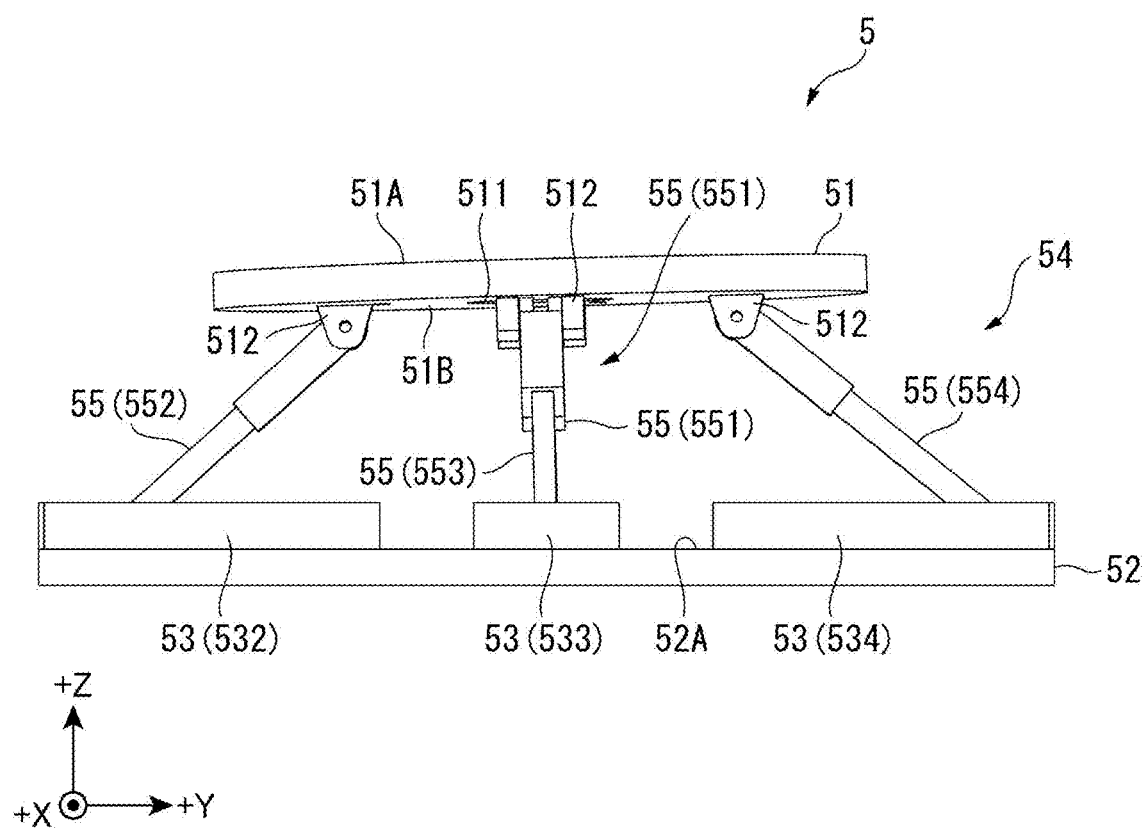
FIG. 11 is a side view depicting the base unit in the initial state in the first embodiment.

FIG. 10 is a figure schematically depicting a center-of-mass position CP of the first base 51 when the state of the base unit 5 is the initial state. FIG. 11 is a side view of the base unit 5 in the initial state as seen from +X direction.

Because of this, as depicted in FIG. 10, when the base unit 5 is in its initial state, the center-of-mass position CP of the structure including the first base 51 and the arm unit 4 arranged on the first base 51 is shifted in −X direction and −Y direction relative to the center CN of the opening 521 of the second base 52 as seen from +Z direction. Note that the center CN of the opening 521 matches the center of the opening 511 of the first base 51 as seen from +Z direction.

At this time, as depicted in FIG. 11, the first base 51 is inclined in −X direction and −Y direction relative to the X-Y plane perpendicular to +Z direction.

Figure 12:
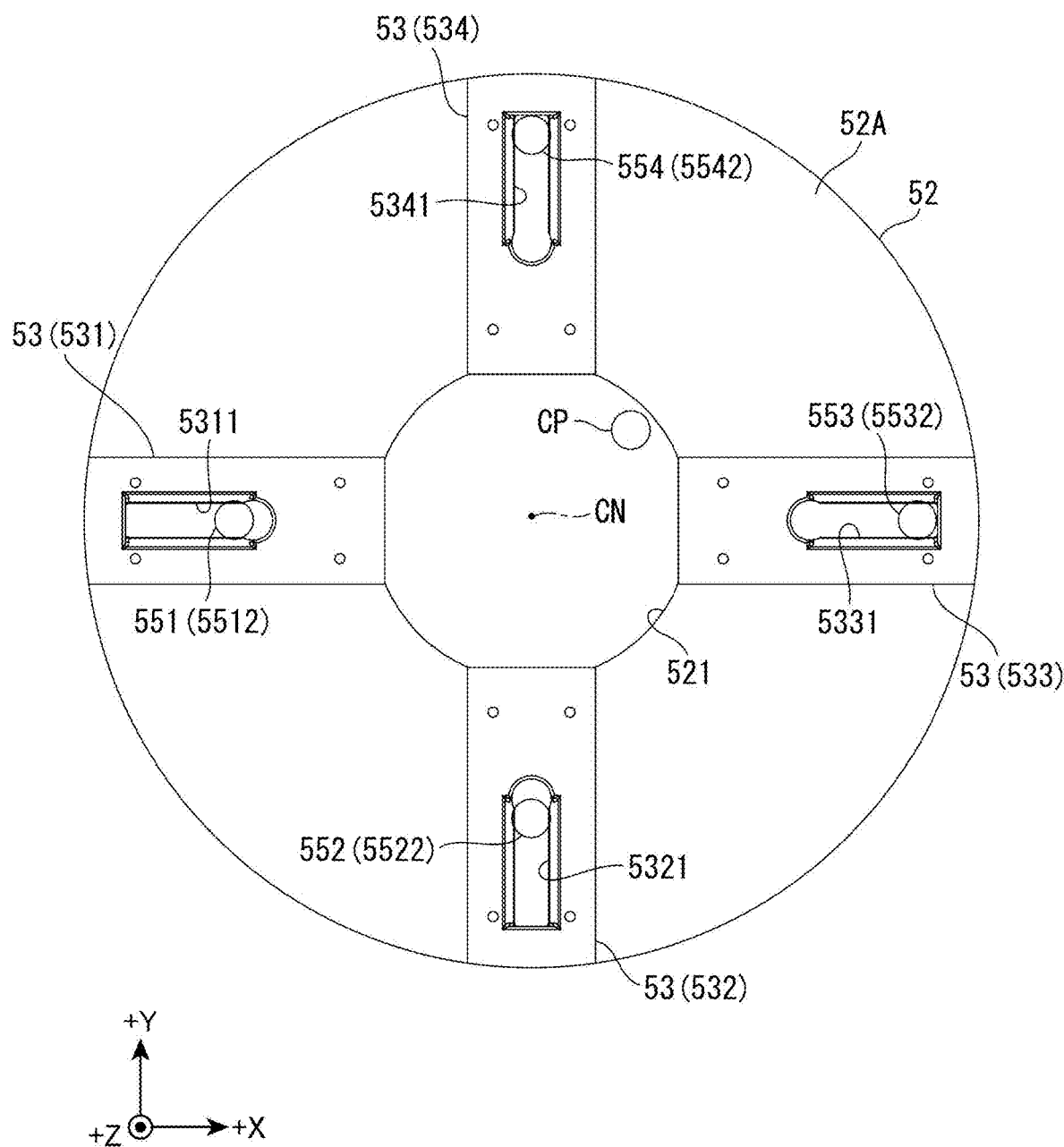
FIG. 12 is a figure schematically depicting the center-of-mass position of the first base when sliding sections are moved in the first embodiment.

FIG. 12 is a figure schematically depicting the center-of-mass position CP of the first base 51 when the sliding sections 5512 and 5522 of the main moving links 551 and 552 are moved.

In a case where the drive unit 6 causes the sliding section 5512 to be arranged farthest in +X direction and causes the sliding section 5522 to be arranged farthest in +Y direction, as depicted in FIG. 12, the sliding section 5532 is arranged farthest in +X direction, and the sliding section 5542 is arranged farthest in +Y direction. In this case, the center-of-mass position CP is shifted in +X direction and +Y direction relative to the center CN. At this time, although illustrations are omitted, the first base 51 inclines in +X direction and +Y direction relative to the X-Y plane.

Figure 13:
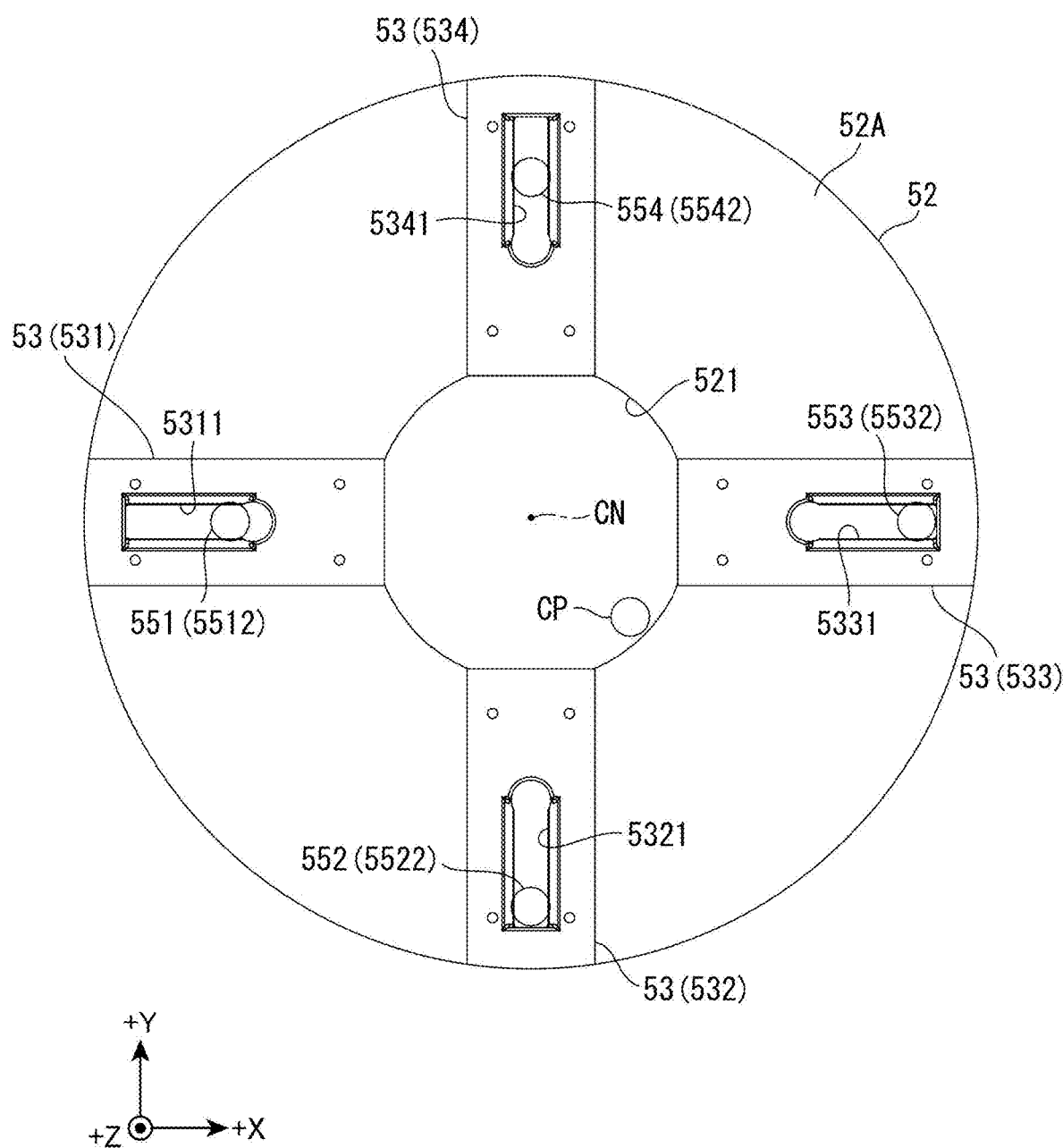
FIG. 13 is a figure schematically depicting the center-of-mass position of the first base when the sliding sections are moved in the first embodiment.

FIG. 13 is a figure schematically depicting the center-of-mass position CP of the first base 51 when the sliding sections 5512 and 5522 of the main moving links 551 and 552 are moved.

In a case where the drive unit 6 causes the sliding section 5512 to be arranged farthest in +X direction and causes the sliding section 5522 to be arranged farthest in −Y direction, as depicted in FIG. 13, the sliding section 5532 is arranged farthest in +X direction, and the sliding section 5542 is arranged at substantially the middle of its slidable area lying along −Y direction. In this case, the center-of-mass position CP is shifted in +X direction and −Y direction relative to the center CN. At this time, although illustrations are omitted, the first base 51 inclines in +X direction and −Y direction relative to the X-Y plane.

In addition, although illustrations are omitted, in a case where the drive unit 6 causes the sliding section 5512 to be arranged farthest in −X direction and causes the sliding section 5522 to be arranged farthest in +Y direction, the sliding section 5542 is arranged farthest in +Y direction, and the sliding section 5532 is arranged at substantially the middle of its slidable area lying along −X direction. In this case, the center-of-mass position CP is shifted in −X direction and +Y direction relative to the center CN. At this time, the first base 51 is inclined in −X direction and +Y direction relative to the X-Y plane.

In this manner, by adjusting the respective positions of the sliding sections 5512 and 5522, the inclination direction and inclination amount of the first base 51 relative to the X-Y plane can be adjusted. Accordingly, the orientation of the arm unit 4 arranged on the first base 51 can be adjusted.

Figure 14:
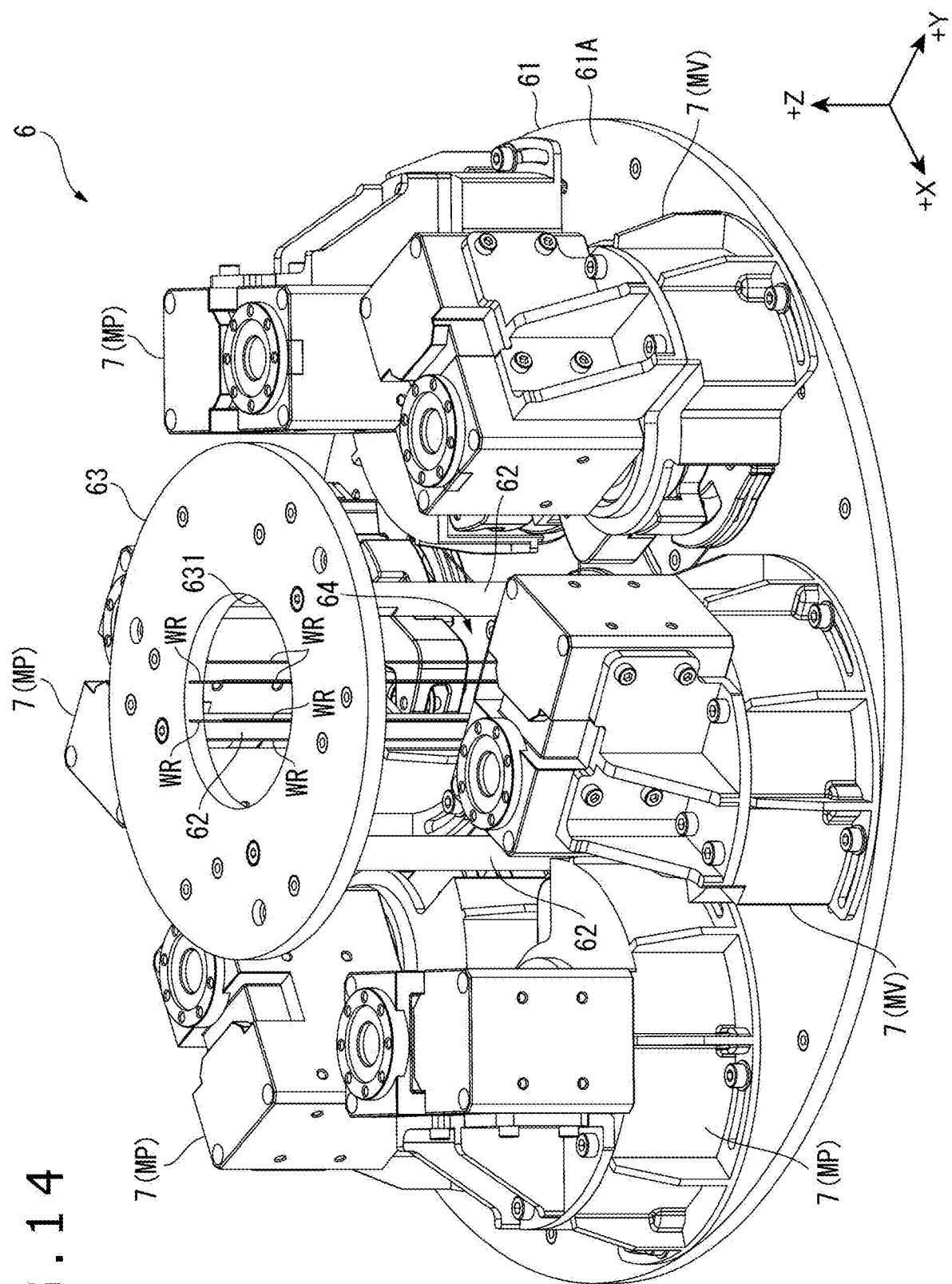
FIG. 14 is a perspective view depicting a drive unit in the first embodiment.
Figure 15:
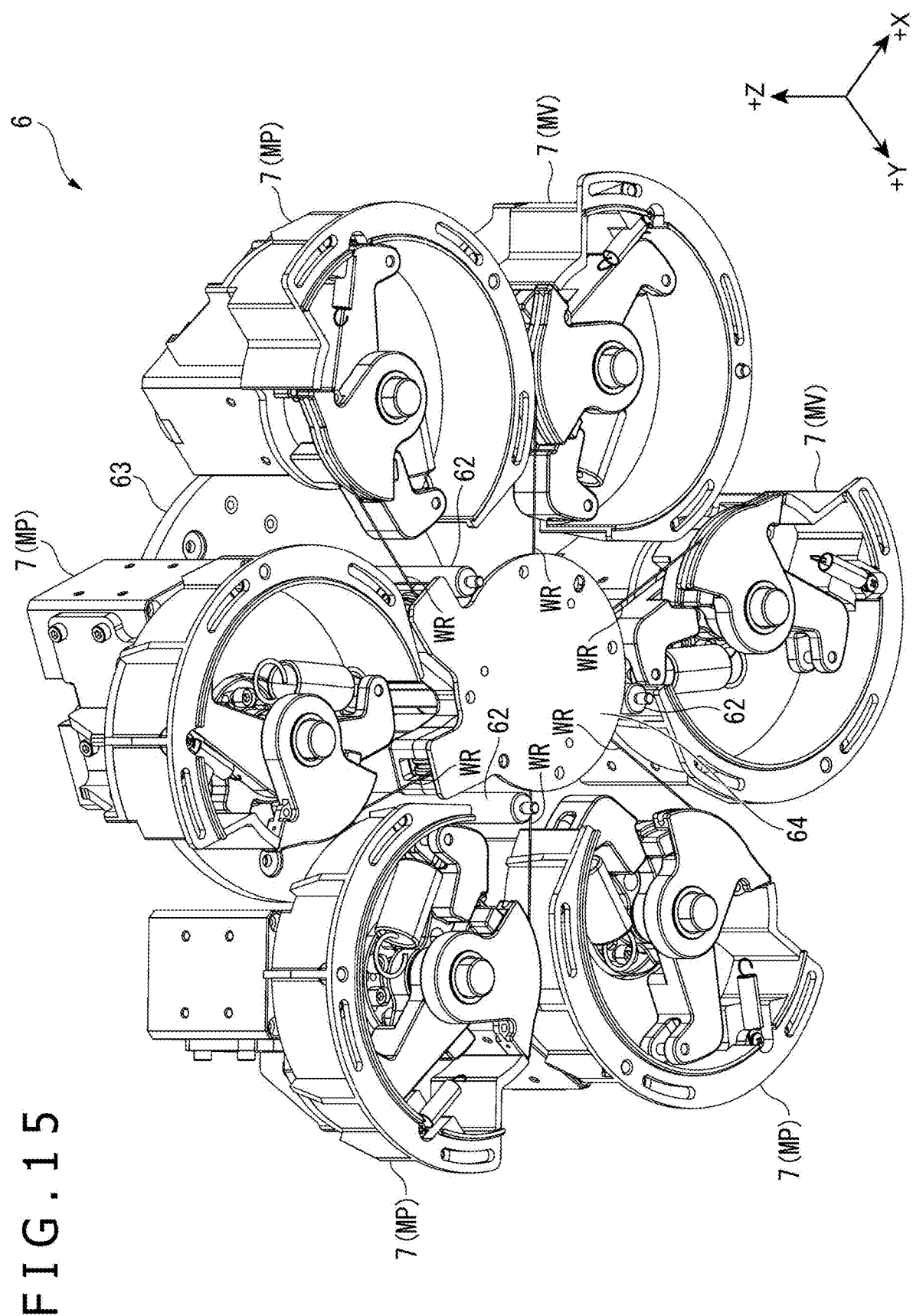
FIG. 15 is a perspective view depicting the drive unit in the first embodiment.

[Configuration of Drive Unit] FIG. 14 is a perspective view depicting the drive unit 6 as seen from +Z direction, and FIG. 15 is a perspective view depicting the drive unit 6 as seen from −Z direction.

The drive unit 6 causes the action unit 3 to perform actions. Specifically, the drive unit 6 bends and extends the four arms 41 of the arm unit 4, and, in addition, slides the sliding sections 5512 and 5522 of the main moving links 551 and 552 of the base unit 5 to adjust the orientation of the first base 51 on which the arm unit 4 is arranged. As depicted in FIG. 14 and FIG. 15, the drive unit 6 includes a base member 61, posts 62, a support plate 63, a pulley unit 64, and six drive devices 7.

[Configurations of Base Member, Posts, and Support Plate] The base member 61 is a plate-shaped member that supports the posts 62, the pulley unit 64, and the respective drive devices 7. The base member 61 is formed in a disc shape as seen from +Z direction.

The posts 62 stand up in +Z direction from a +Z direction side surface 61A of the base member 61 and support the support plate 63. The number of the posts 62 provided is plural. In the present embodiment, as the plurality of posts 62, three posts are provided at substantially equal intervals along a circumferential direction about the center CT (see FIG. 16) of the base member 61 as seen from +Z direction.

As depicted in FIG. 14, the support plate 63 is a plate formed in a ring shape as seen from +Z direction and supports the second base 52 of the base unit 5 from −Z direction. The support plate 63 is arranged in +Z direction relative to the base member 61 and is supported by the plurality of posts 62. The support plate 63 has an opening 631 provided to the middle of the support plate 63 as seen from +Z direction. The wires WR extending from the drive devices 7 are inserted through the opening 631 and extend in +Z direction. Note that the support plate 63 may double as the second base 52.

Figure 16:
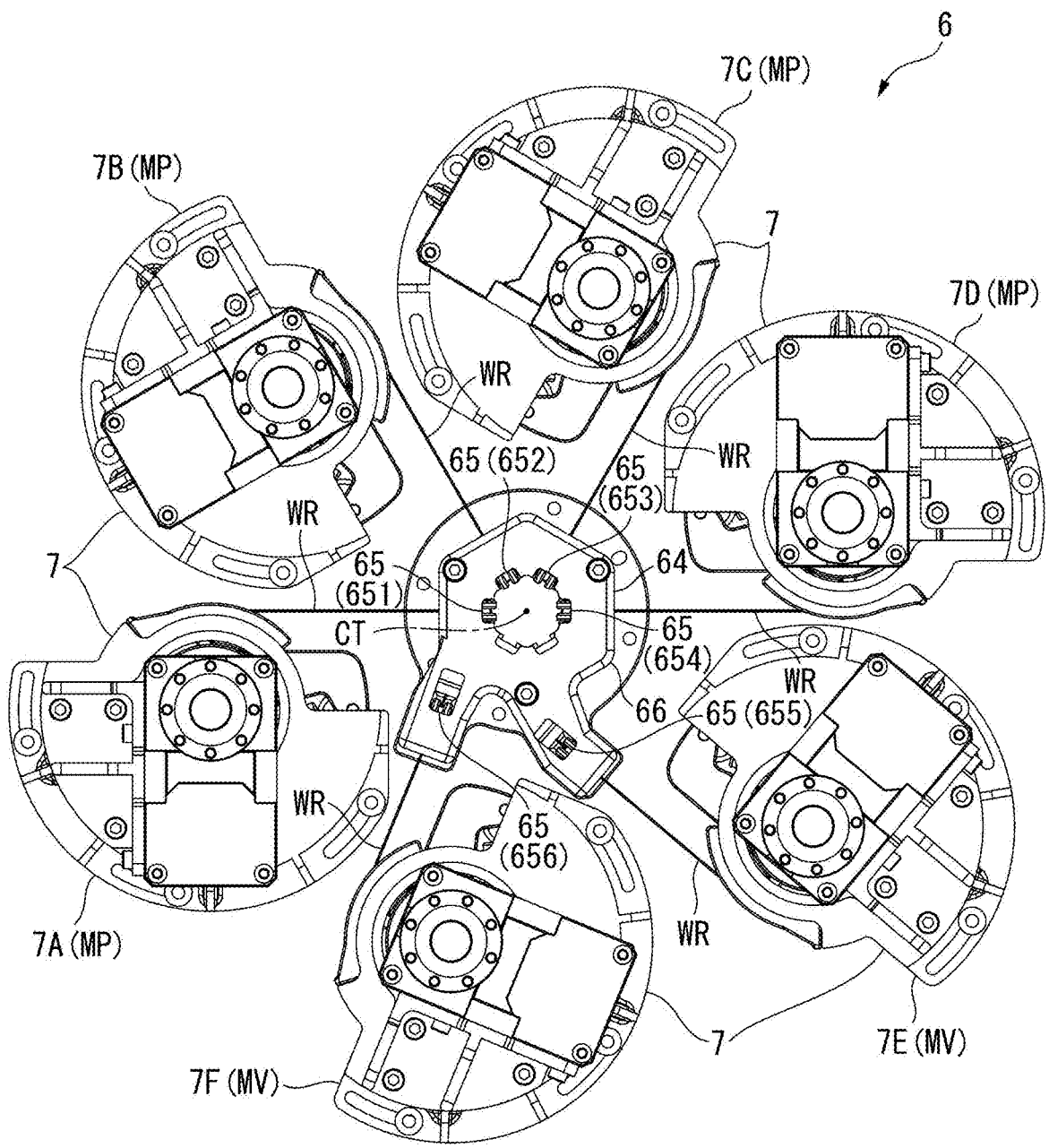
FIG. 16 is a plan view depicting a pulley unit and drive devices in the first embodiment.

[Configuration of Pulley Unit] FIG. 16 is a plan view depicting the pulley unit 64 and the six drive devices 7 as seen from +Z direction.

The pulley unit 64 is provided to substantially the middle of the base member 61 as seen from +Z direction. As depicted in FIG. 16, the pulley unit 64 has a plurality of pulleys 65 and a housing 66 that houses therein the plurality of pulleys 65.

The wires WR extending from the corresponding drive devices 7 in the plurality of drive devices 7 are laid on the plurality of pulleys 65, and the pulleys 65 change extending directions of the wires WR in +Z direction. The plurality of pulleys 65 include pulleys 651 to 656.

The pulleys 651 to 654 are arranged along the circumferential direction about the center CT. The respective wires WR connected to the upper second arm 41HB, the left arm 41L, the right arm 41R, and the upper first arm 41HA are laid on the pulleys 651 to 654.

The pulleys 655 and 656 are provided to positions apart from the pulleys 651 to 654. The wire WR connected to the sliding section 5522 of the main moving link 552 is laid on the pulley 655. The wire WR connected to the sliding section 5512 of the main moving link 551 is laid on the pulley 656.

Note that the arrangement of the pulleys 651 to 656 is not limited to that described above and can be changed as appropriate.

The respective pulleys 651 to 655 are provided in the housing 66 in such a manner that the pulleys 651 to 655 can rotate about pivot axes that lie along the X-Y plane and that are perpendicular to the extending directions of the wires WR extending from the corresponding drive devices 7 in the plurality of drive devices 7.

[Configuration of Drive Devices] The drive devices 7 unwind, in the first direction, the wires WR connected to operation targets with predetermined tension, and pull the wires WR in the direction opposite to the first direction to cause the operation targets to perform actions. Specifically, the plurality of drive devices 7 included in the drive unit 6 unwind and pull the wires WR to cause the four arms 41 and the two main moving links 551 and 552 to perform actions. The plurality of drive devices 7 include drive devices 7A to 7F arranged at substantially equal intervals clockwise about the center CT.

The drive device 7A is arranged in −X direction relative to the pulley unit 64 and causes the upper second arm 41HB to perform an action. The drive device 7B is arranged in +Y direction relative to the pulley unit 64 and causes the left arm 41L to perform an action. The drive device 7C is arranged in +X direction and +Y direction relative to the pulley unit 64 and causes the right arm 41R to perform an action. The drive device 7D is arranged in +X direction relative to the pulley unit 64 and causes the upper first arm 41HA to perform an action. The drive device 7E is arranged in −Y direction relative to the pulley unit 64 and causes the main moving link 552 to perform an action. The drive device 7F is arranged in −X direction and −Y direction relative to the pulley unit 64 and causes the main moving link 551 to perform an action.

In the following explanation, mutually perpendicular three directions are defined as +E1 direction, +E2 direction, and +E3 direction. In the present embodiment, +E1 direction and +E2 direction are directions included in the X-Y plane. +E1 direction is a direction in which a drive device 7 unwinds a wire WR. +E3 direction is a direction matching +Z direction. In addition, a direction opposite to +E1 direction is −E1 direction, a direction opposite to +E2 direction is −E2 direction, and a direction opposite to +E3 direction is −E3 direction.

Note that +E1 direction is equivalent to the first direction and −E1 direction is equivalent to the direction opposite to the first direction.

Figure 17:
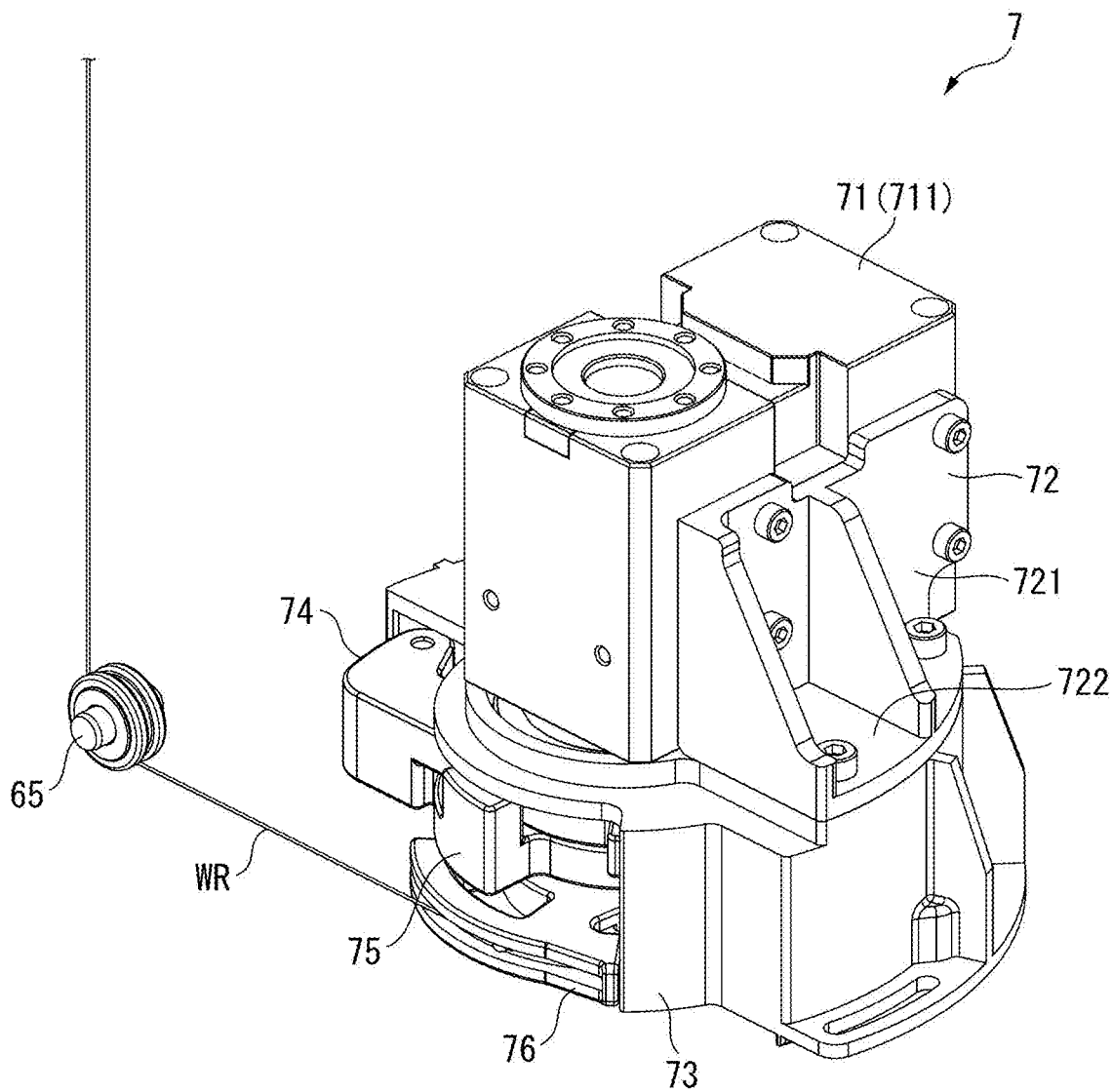
FIG. 17 is a perspective view depicting a drive device and a pulley in the first embodiment.
Figure 18:
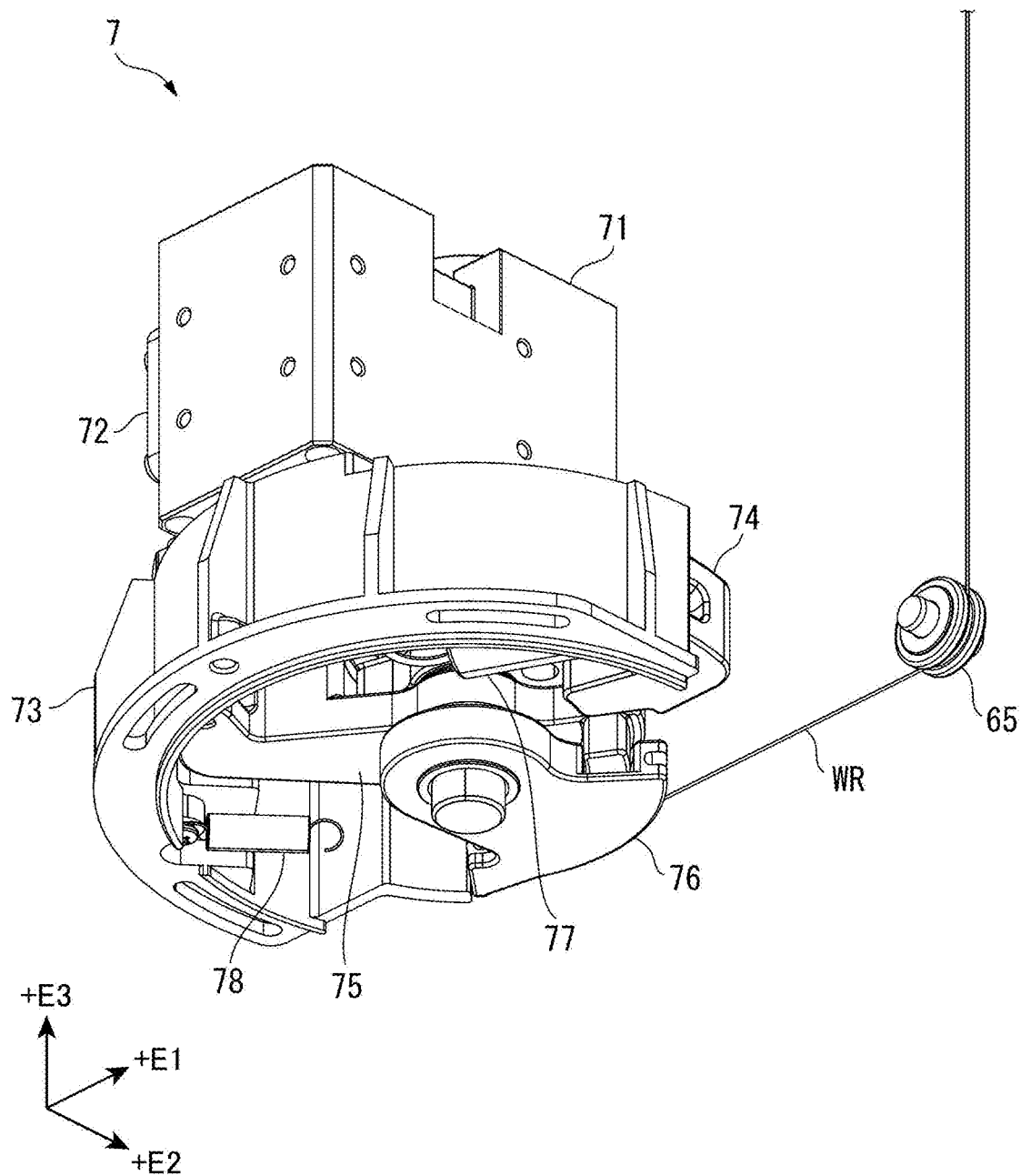
FIG. 18 is a perspective view depicting the drive device and the pulley in the first embodiment.
Figure 19:
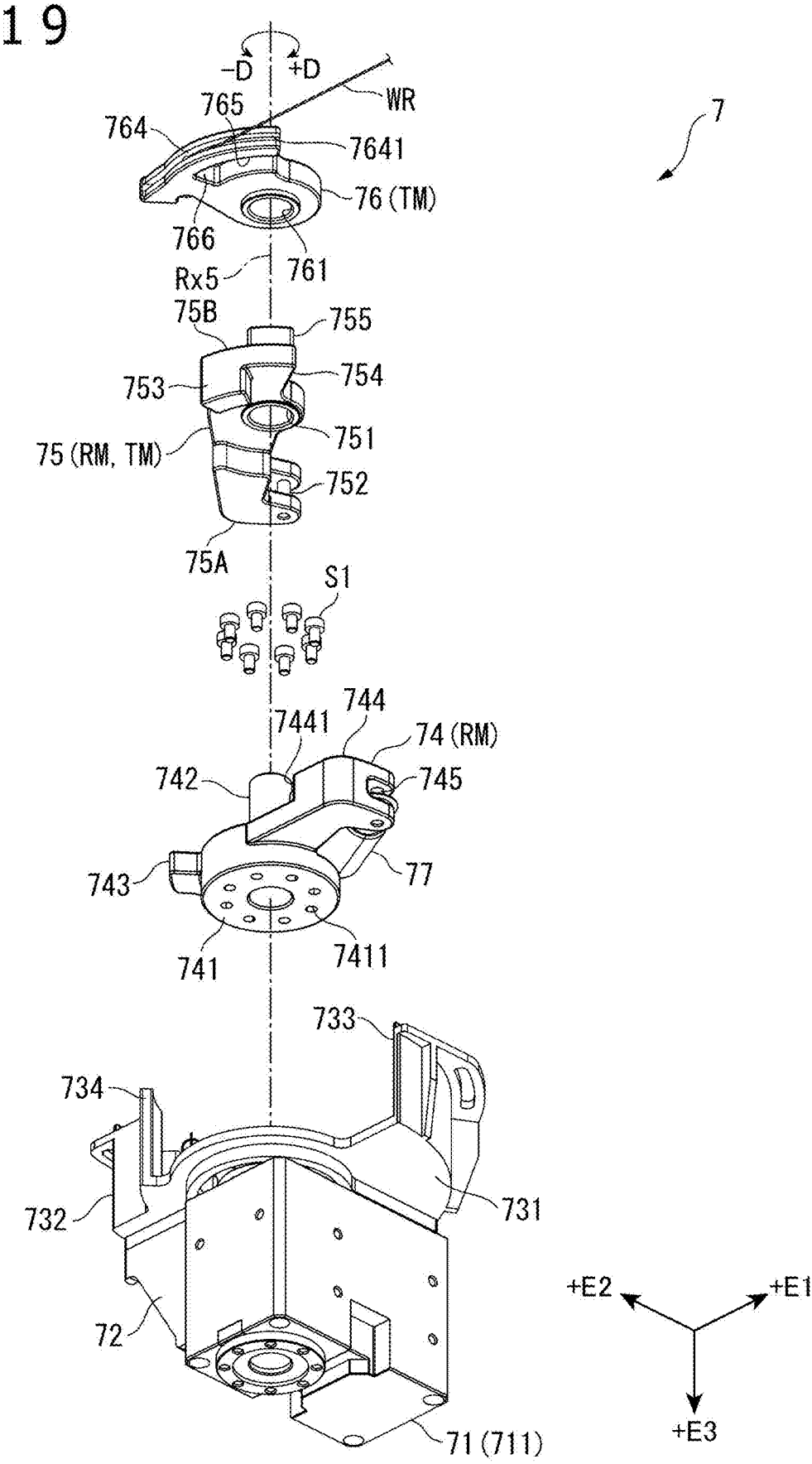
FIG. 19 is an exploded perspective view depicting the drive device in the first embodiment.
Figure 20:
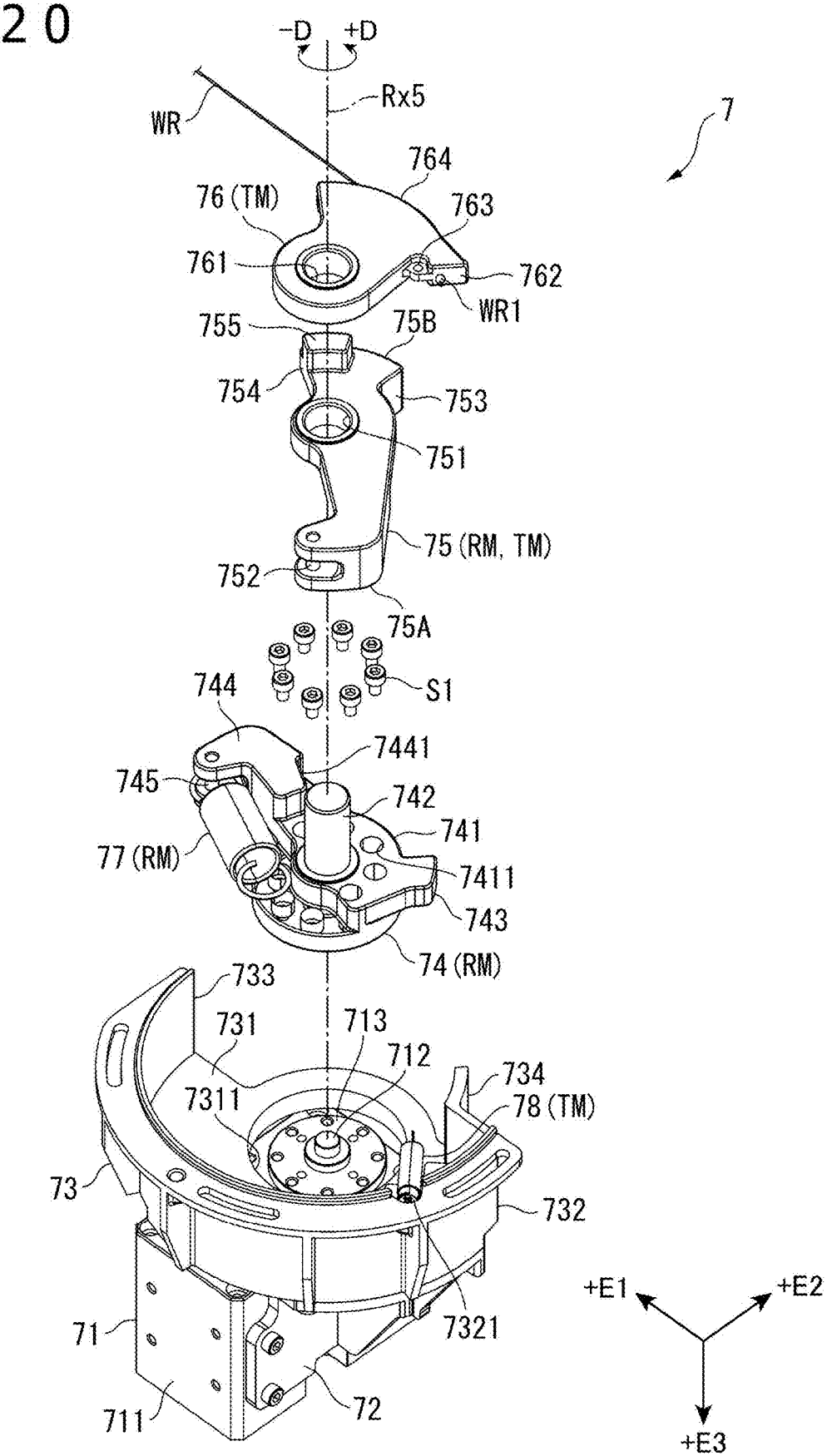
FIG. 20 is an exploded perspective view depicting the drive device in the first embodiment.

FIG. 17 and FIG. 18 are perspective views depicting a drive device 7 and a pulley 65 corresponding to the drive device 7. Specifically, FIG. 17 is a perspective view depicting the drive device 7 and the pulley 65 as seen from +E3 direction, and FIG. 18 is a perspective view depicting the drive device 7 and the pulley 65 as seen from −E3 direction. In addition, FIG. 19 and FIG. 20 are exploded perspective views depicting the drive device 7. Specifically, FIG. 19 is an exploded perspective view depicting the drive device 7 as seen from +E3 direction, and FIG. 20 is an exploded perspective view depicting the drive device 7 as seen from −E3 direction.

As depicted in FIG. 21 to FIG. 24, the drive device 7 includes a motor 71, a fixation member 72, a cover member 73, a first rotating member 74, a second rotating member 75, a coupling member 76, a first urging member 77, and a second urging member 78. In other words, the drive device 7 includes the motor 71, the fixation member 72, the cover member 73, a rotating member RM, the coupling member 76, and the second urging member 78. In other words, further, the drive device 7 includes the motor 71, the fixation member 72, the cover member 73, the first rotating member 74, a pulling member TM, and the second urging member 78.

Note that the rotating member RM includes the first rotating member 74, the second rotating member 75, and the first urging member 77. The rotating member RM can be rotated by the motor 71 in +D direction and −D direction about a rotation axis Rx5.

The pulling member TM includes the second rotating member 75, the coupling member 76, and the first urging member 77. The pulling member TM is provided rotatably coaxially with the first rotating member 74 and holds an end WR1 of the wire WR. The pulling member TM rotates in +D direction to unwind the wire WR in +E1 direction, and rotates in −D direction to pull the wire WR in −E1 direction.

+D direction is equivalent to a second direction and is a counterclockwise direction as seen from −E3 direction. +D direction is a rotation direction of the respective rotating members 74 and 75 and the coupling member 76 when the drive device 7 unwinds the wire WR in +E1 direction.

−D direction is equivalent to a direction opposite to the second direction and is a clockwise direction as seen from −E3 direction. −D direction is a rotation direction of the respective rotating members 74 and 75 and the coupling member 76 when the drive device 7 pulls the wire WR in −E1 direction.

Hereinbelow, respective constituent elements of the drive device 7 are mentioned specifically.

[Configuration of Motor] The motor 71 rotates the first rotating member 74 about the rotation axis Rx5 lying along +E3 direction. In the present embodiment, as depicted in FIG. 19, the motor 71 has a housing section 711 and, in addition, includes a servomotor having a shaft 712 and a servo horn 713, as depicted in FIG. 20.

As depicted in FIG. 19, the housing section 711 is formed in a substantially quadrangular prism shape. A rotor that rotates the shaft 712 is arranged inside the housing section 711.

As depicted in FIG. 20, the shaft 712 is a shaft-shaped member protruding in −E3 direction from the housing section 711. The shaft 712 is rotated by the rotor in the housing section 711 about the rotation axis Rx5 lying along +E3 direction.

The servo horn 713 is mounted on a leading end of the shaft 712 and rotated integrally with the shaft 712. The servo horn 713 is formed in a circular shape as seen from −E3 direction, and the first rotating member 74 is fixed to the servo horn 713.

[Configuration of Fixation Member] The fixation member 72 fixes the cover member 73 to the motor 71. As depicted in FIG. 17, the fixation member 72 has a first fixed surface 721 and a second fixed surface 722 perpendicular to the first fixed surface 721, and is formed in a substantially L-shape as seen from +E2 direction. The first fixed surface 721 is fixed to the housing section 711, and the second fixed surface 722 is fixed to the cover member 73.

[Configuration of Cover Member] The cover member 73 is mounted on the motor and covers sides of the respective rotating members 74 and 75 and the coupling member 76. The cover member 73 is fixed to the base member 61 in a state where the cover member 73 is fixed to the housing section 711 by the fixation member 72. The drive device 7 is thus fixed to the base member 61.

As depicted in FIG. 19 and FIG. 20, the cover member 73 has a mounting section 731, a standing section 732, and a cut 733.

The mounting section 731 contacts a +E3 direction side surface of the housing section 711. As depicted in FIG. 20, the mounting section 731 is formed in a substantially semicircular shape as seen from −E3 direction. The mounting section 731 has a circular opening 7311 at substantially the middle as seen from −E3 direction. The servo horn 713 is arranged in the opening 7311.

The standing section 732 stands in −E3 direction from a periphery of the mounting section 731 as seen from −E3 direction. The standing section 732 covers sides of the rotating members 74 and 75, the coupling member 76, and the urging members 77 and 78. The standing section 732 has a connecting section 7321 connected with one end of the second urging member 78.

The cut 733 is a portion through which the rotating members 74 and 75 and the coupling member 76 are exposed in +E2 direction. The wire WR held by the coupling member 76 extends out of the cover member 73 through the cut 733.

Figure 21:
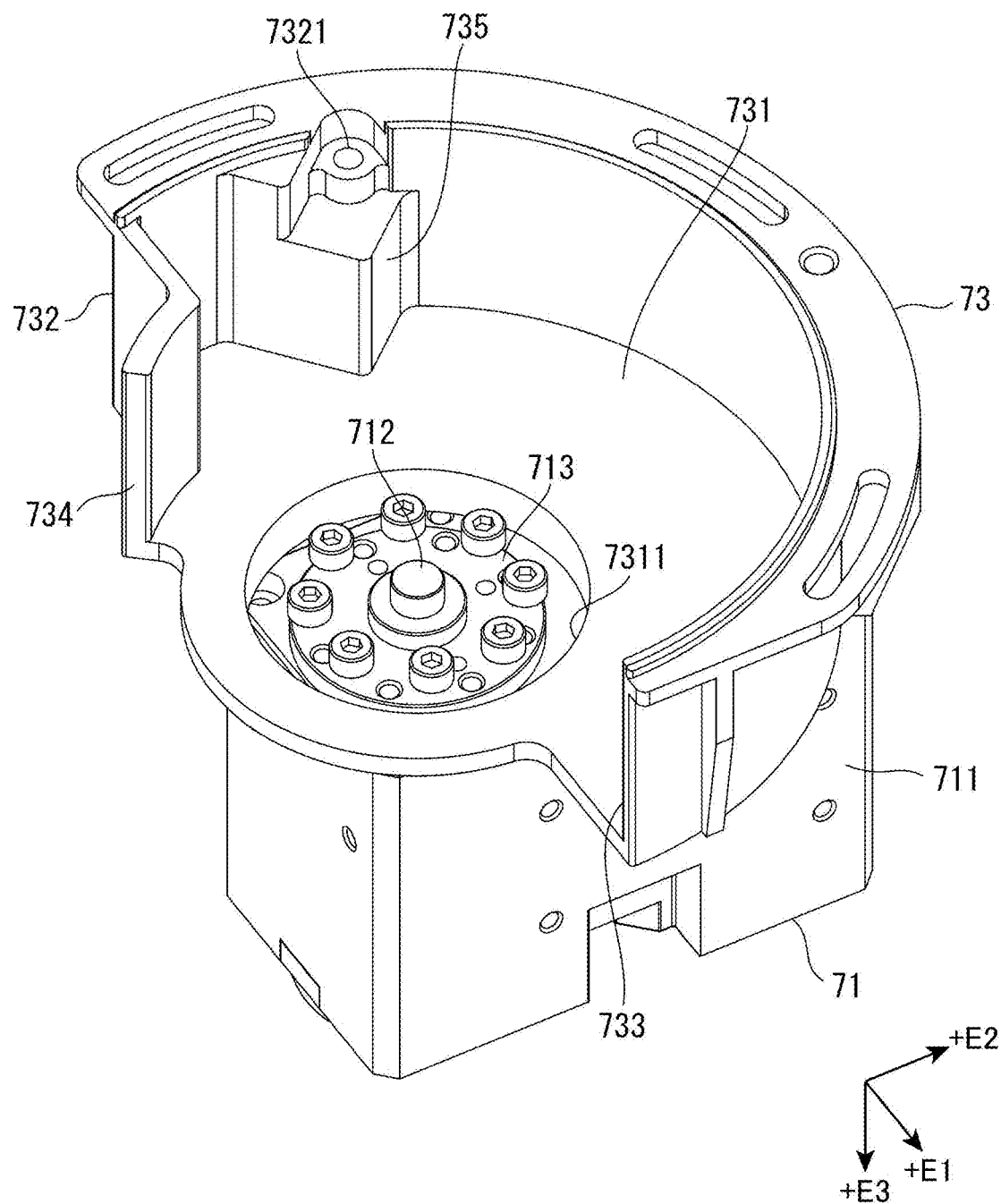
FIG. 21 is a perspective view depicting a cover member in the first embodiment.

FIG. 21 is a perspective view depicting the cover member 73.

The cover member 73 has the configuration described above and, in addition, further has restricting sections 734 and 735.

The restricting section 734 is provided to a −E1 direction side edge of the cut 733. As mentioned specifically later, the coupling member 76 contacts the restricting section 734 when the coupling member 76 rotates to the farthest position in −D direction when the wire WR is pulled in −E1 direction, and the restricting section 734 restricts further rotation of the coupling member 76 in −D direction.

The restricting section 735 stands in −E3 direction from the mounting section 731. Specifically, the restricting section 735 is provided to a position corresponding to the connecting section 7321. As mentioned specifically later, the second rotating member 75 contacts the restricting section 735 when the second rotating member 75 rotates to the farthest position in −D direction, and the restricting section 735 restricts further rotation of the second rotating member 75 in +D direction.

[Configuration of First Rotating Member] The first rotating member 74 depicted in FIG. 19 and FIG. 20 constitutes the rotating member RM.

The first rotating member 74 constitutes the rotating member RM. The first rotating member 74 is arranged in −E3 direction relative to the motor 71 with the mounting section 731 of the cover member 73 being interposed therebetween. The first rotating member 74 is rotated by the motor 71 in +D direction about the rotation axis Rx5. The first rotating member 74 is rotated by the motor 71 in +D direction to rotate, along with the second rotating member 75, the coupling member 76 holding the other end of the wire WR, and unwind the wire WR in +E1 direction. In addition, the first rotating member 74 is rotated by the motor 71 in −D direction to rotate the coupling member 76 along with the second rotating member 75, and pull the wire WR in −E1 direction.

The first rotating member 74 has a mounting section 741, an axis section 742, protrusions 743 and 744, and a connecting section 745.

As depicted in FIG. 19 and FIG. 20, the mounting section 741 is formed in a substantially circular shape as seen from ±E3 direction. The mounting section 741 is mounted on the servo horn 713 from −E3 direction and fixed by screws S1. The mounting section 741 is provided with a plurality of holes 7411 along the circumferential direction about the rotation axis Rx5. By fixing the plurality of screws S1 inserted into the plurality of holes 7411 to the servo horn 713, the first rotating member 74 is fixed to the servo horn 713.

The axis section 742 is a columnar portion protruding in −E3 direction from the middle of the mounting section 741 as seen from −E3 direction. The axis section 742 is inserted into the second rotating member 75 and the coupling member 76.

The protrusion 743 is equivalent to a first protrusion. The protrusion 743 protrudes toward the outside of the mounting section 741 from a periphery of the mounting section 741. A protrusion 753 of the second rotating member 75 can contact the protrusion 743.

The protrusion 744 protrudes toward the outside of the mounting section 741 from a periphery of the mounting section 741 on a side opposite to the protrusion 743 relative to the axis section 742. A −D direction side surface of the protrusion 744 is provided with a recessed section 7441 recessed in +D direction. A contact section 754 of the second rotating member 75 can contact the recessed section 7441.

That is, the protrusions 743 and 744 define a rotatable area of the second rotating member 75.

The connecting section 745 is connected with one end of the first urging member 77. The connecting section 745 is provided to a leading end of the protrusion 744.

[Configuration of Second Rotating Member] The second rotating member 75 constitutes the rotating member RM and, in addition, constitutes the pulling member TM. The second rotating member 75 is provided rotatably coaxially with the first rotating member 74 and is connected with the first urging member 77. The second rotating member 75 can rotate in ±D direction integrally with the first rotating member 74 and, in addition, can rotate in ±D direction about the rotation axis Rx5 independently of the first rotating member 74.

The second rotating member 75 is arranged in −E3 direction relative to the first rotating member 74 and extends in a direction perpendicular to the rotation axis Rx5. The second rotating member 75 has an insertion port 751, a connecting section 752, the protrusion 753, the contact section 754, and a guide protrusion 755.

The insertion port 751 is formed in a circular shape at substantially the middle of the second rotating member 75 as seen from −E3 direction and penetrates the second rotating member 75 in −E3 direction. Due to insertion of the axis section 742 through the insertion port 751, the second rotating member 75 is supported by the first rotating member 74 in such a manner that the second rotating member 75 can rotate about the rotation axis Rx5.

The connecting section 752 is provided to one end 75A in a direction perpendicular to the rotation axis Rx5. The connecting section 752 is connected with the first urging member 77. The first urging member 77 urges the second rotating member 75 in −D direction relative to the first rotating member 74.

The protrusion 753, the contact section 754, and the guide protrusion 755 are provided to an end 75B of the second rotating member 75 on a side opposite to the end 75A relative to the insertion port 751.

The protrusion 753 is equivalent to a second protrusion. The protrusion 753 protrudes toward the radially outer side of the insertion port 751 and can contact the protrusion 743 of the first rotating member 74. In a case where the first rotating member 74 and the second rotating member 75 are combined with each other in such a manner that the axis section 742 is inserted through the insertion port 751, the protrusion 753 is arranged in +D direction relative to the protrusion 743. That is, the pulling member TM has the protrusion 753 that is arranged in +D direction relative to the protrusion 743 and that can contact the protrusion 743.

The contact section 754 is provided to a +D direction side end surface of the end 75B. The contact section 754 can contact the recessed section 7441 of the first rotating member 74.

The guide protrusion 755 protrudes from the end 75B in −E3 direction. The guide protrusion 755 is inserted into a guide groove 765 of the coupling member 76 when the second rotating member 75 and the coupling member 76 are combined with each other.

[Configuration of Coupling Member] The coupling member 76 constitutes the pulling member TM. The coupling member 76 is arranged in −E3 direction relative to the second rotating member 75 and can rotate in +D direction about the rotation axis Rx5.

The coupling member 76 is coupled with the wire WR and can rotate coaxially with the second rotating member 75. Specifically, the coupling member 76 can rotate integrally with the second rotating member 75 and, in addition, can rotate independently of the second rotating member 75.

The coupling member 76 holds the end WR1 of the wire WR. Because of this, as the coupling member 76 rotates in +D direction, the drive device 7 unwinds the wire WR in +E1 direction. As the coupling member 76 rotates in −D direction, the drive device 7 pulls the wire WR in −E1 direction.

That is, the coupling member 76 is provided rotatably coaxially with the rotating member RM and coupled with the wire WR. The coupling member 76 rotates in +D direction integrally with the rotating member RM to unwind the wire WR in +E1 direction. The coupling member 76 rotates in −D direction integrally with the rotating member RM to pull the wire WR in −E1 direction.

As mentioned specifically later, when the wire WR is moved in −E1 direction due to an external factor, the coupling member 76 rotates in −D direction independently of the rotating member RM due to the urging force of the second urging member 78, to pull the wire WR in −E1 direction.

As depicted in FIG. 20, the coupling member 76 has an insertion port 761, a holding section 762, and a connecting section 763.

The insertion port 761 is formed in a circular shape as seen from +E3 direction. The axis section 742 inserted through the insertion port 751 is inserted through the insertion port 761 along −E3 direction. The coupling member 76 is thus supported rotatably by the first rotating member 74.

The holding section 762 holds the end WR1 of the wire WR on the side of the drive device 7. As described above, an end of the wire WR on the side of an operation target is held by one of the four arms 41 and the main moving links 551 and 552.

The connecting section 763 is provided near the holding section 762. The connecting section 763 is connected with the second urging member 78.

As depicted in FIG. 19, the coupling member 76 further has an arc-shaped section 764, the guide groove 765, and a contact section 766.

The arc-shaped section 764 is a portion that is formed in an arc shape about the middle of the insertion port 761 as seen from +E3 direction and that extends from the holding section 762. The arc-shaped section 764 has a groove 7641 lying along the arc-shaped section 764, and the wire WR whose end is held by the holding section 762 is laid on the groove 7641. Note that the wire WR extends from the arc-shaped section 764 along +E1 direction.

The guide groove 765 is a groove recessed in −E3 direction from a +E3 direction side surface of the coupling member 76. The guide groove 765 is formed in an arc shape about the middle of the insertion port 761 as seen from +E3 direction. When the second rotating member 75 and the coupling member 76 are combined with each other, the guide protrusion 755 is inserted into the guide groove 765 from +E3 direction. That is, the guide groove 765 is provided with the guide protrusion 755 slidably along +D direction.

The contact section 766 is provided to the guide groove 765 and contacts a −D direction side surface of the guide protrusion 755. Specifically, the contact section 766 is provided to an inner surface of the guide groove 765 on the side of the holding section 762. The contact between the contact section 766 and the guide protrusion 755 is mentioned specifically later.

[Configuration of First Urging Member] The first urging member 77 is equivalent to a pulling member side urging member and a rotating member side urging member. The first urging member 77 urges the second rotating member 75 constituting the pulling member TM in −D direction relative to the first rotating member 74. That is, the first urging member 77 urges the second rotating member 75 in −D direction relative to the first rotating member 74.

As described above, the first urging member 77 is connected to the connecting section 745 and the connecting section 752. In the present embodiment, the first urging member 77 includes an extension coil spring but may include a torsion coil spring.

When the second rotating member 75 is urged in −D direction by the first urging member 77, the protrusion 753 abuts on the protrusion 743. On the other hand, in a case where the second rotating member 75 rotates in +D direction against the urging force of the first urging member 77, the protrusion 753 gets spaced apart from the protrusion 743. Then, in a case where the second rotating member 75 relatively rotates in +D direction to the farthest position relative to the first rotating member 74, the contact section 754 contacts the recessed section 7441. In this manner, the second rotating member 75 can pivot between a position at which the protrusion 753 contacts the protrusion 743 and a position at which the contact section 754 contacts the protrusion 744.

[Configuration of Second Urging Member] The second urging member 78 is equivalent to a coupling member side urging member. The second urging member 78 urges the coupling member 76 holding the end WR1 of the wire WR in −D direction to adjust the tension of the wire WR in such a manner that the tension becomes a value in a predetermined range.

As described above, the second urging member 78 is connected to the connecting section 7321 of the cover member 73 and the connecting section 763 of the coupling member 76. In the present embodiment, the second urging member 78 includes an extension coil spring but may include a torsion coil spring.

Figure 22:
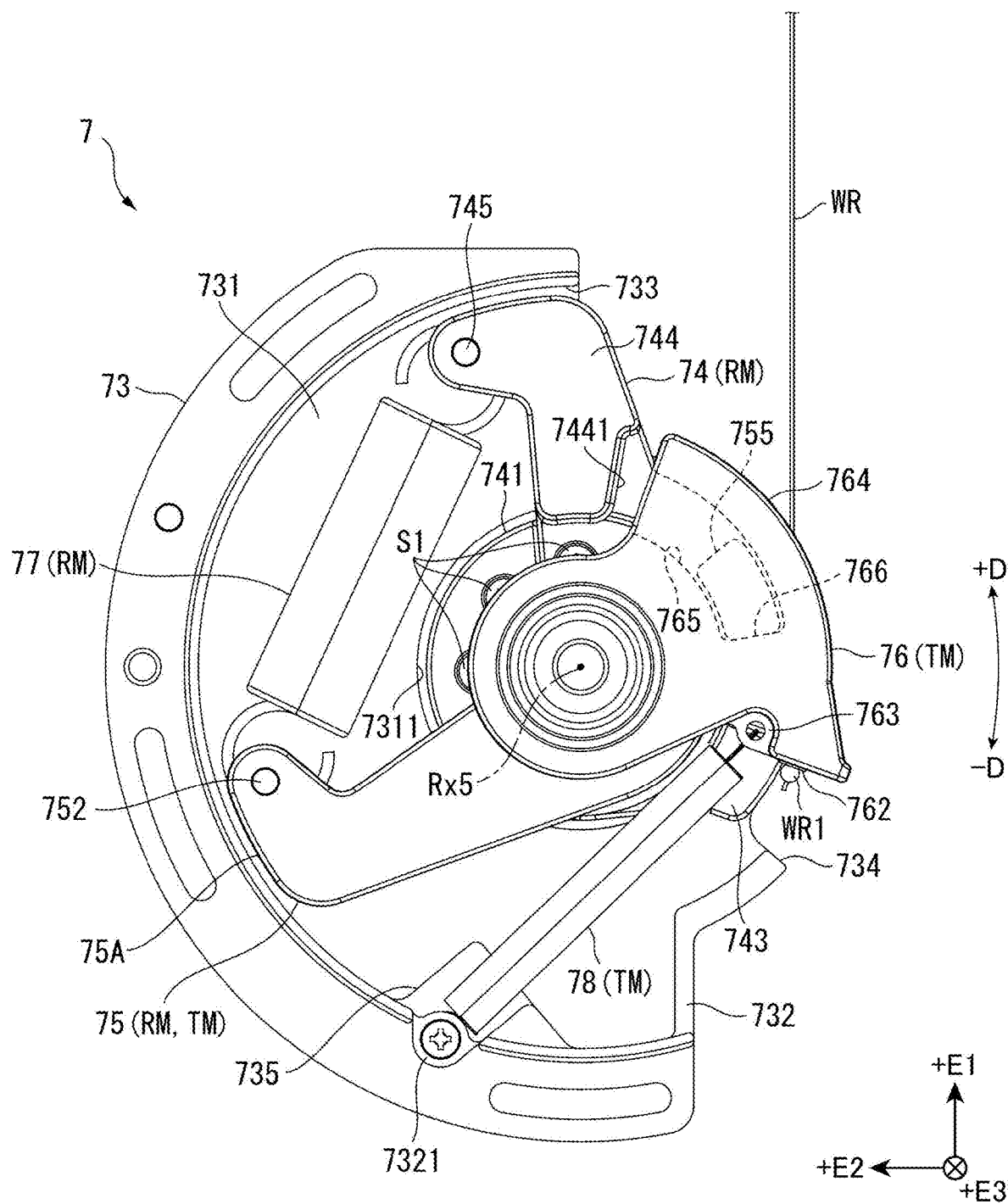
FIG. 22 is a figure depicting the drive device in a reference state in the first embodiment.

[Reference State of Drive Device] FIG. 22 is a figure depicting the drive device 7 in a reference state as seen from −E3 direction.

In the reference state, the shaft 712 of the motor 71 is arranged at the middle of a rotatable area of the shaft 712. The reference state is a state where the drive device 7 can implement any of unwinding and pulling of the wire WR, and the positions of respective constituent elements of the drive device 7 in the reference state are their reference positions.

As described above, tension in a predetermined range acts on the wire WR connecting the coupling member 76 and the operation target of the drive device 7, which is any one of the arms 41 and the main moving links 551 and 552, and the coupling member 76 is pulled in +D direction. Meanwhile, the urging force of the second urging member 78 in −D direction acts on the coupling member 76. Assuming that the tension of the wire WR in the reference state is initial tension, the urging force of the second urging member 78 is smaller than the initial tension of the wire WR. Because of this, in the reference state, the coupling member 76 is pulled by the wire WR and is arranged at such a position that the contact section 766 and the guide protrusion 755 contact each other.

Meanwhile, the urging force of the first urging member 77 applied to the second rotating member 75 is greater than the initial tension of the wire WR. Because of this, the second rotating member 75 relatively rotates in −D direction relative to the first rotating member 74, and a state where the protrusion 753 (see FIG. 19) and the protrusion 743 of the first rotating member 74 (see FIG. 19) contact each other is maintained. As a result, unless the tension of the wire WR exceeds an upper limit value in the predetermined range described above, the second rotating member 75 rotates integrally with the first rotating member 74. That is, the urging force of the first urging member 77 is greater than the urging force of the second urging member 78.

Figure 23:
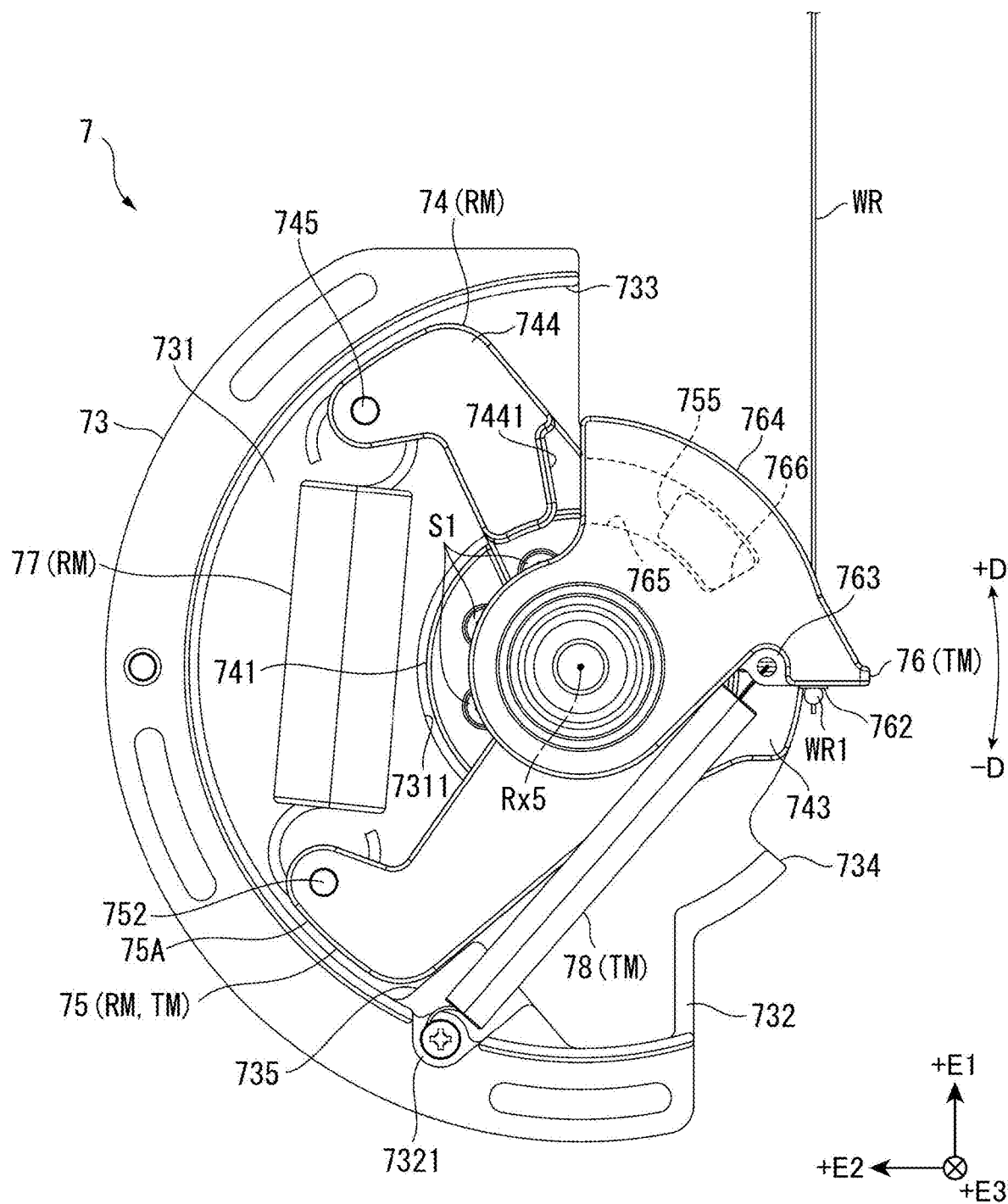
FIG. 23 is a figure depicting the drive device in the first embodiment.

[Unwinding of Wire by Drive Device] FIG. 23 is a figure depicting the drive device 7 as seen from −E3 direction in a state where the rotating members 74 and 75 and the coupling member 76 are arranged at maximum unwind positions.

In a case where the shaft 712 rotates from the reference position to the farthest position in +D direction (the second direction), as depicted in FIG. 23, the first rotating member 74 is arranged at the maximum unwind position, which is the farthest rotation position in +D direction. Since the second rotating member 75 is in a state where the protrusion 743 and the protrusion 753 contact each other due to the urging force of the first urging member 77, the second rotating member 75 is rotated in −D direction integrally with the first rotating member 74.

In addition, since the initial tension of the wire WR is greater than the urging force of the second urging member 78 in −D direction, the coupling member 76 is rotated in +D direction along with the second rotating member 75.

As a result, the wire WR is unwound from the drive device 7 in +E1 direction.

Figure 24:
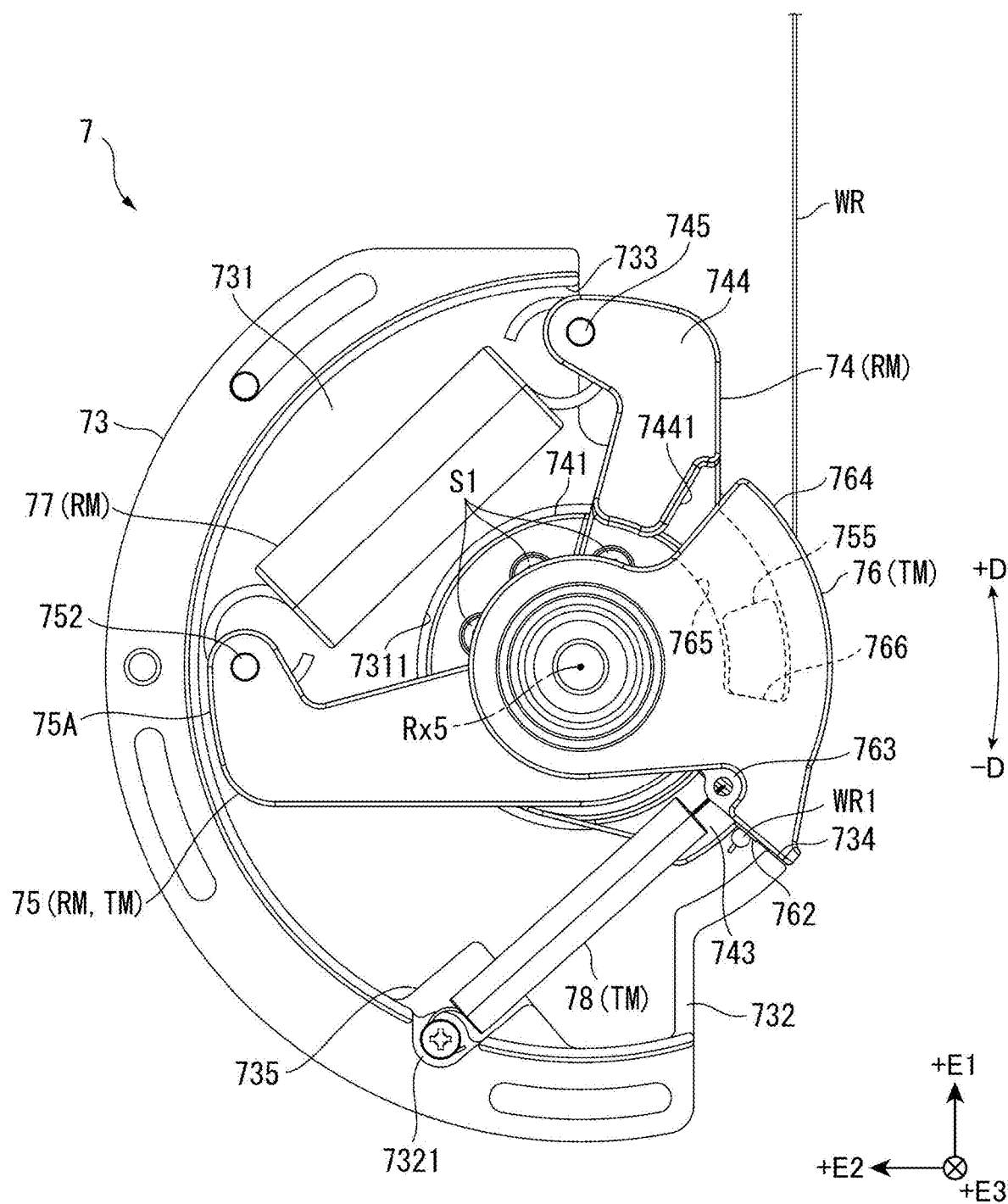
FIG. 24 is a figure depicting the drive device in the first embodiment.

[Pulling of Wire by Drive Device] FIG. 24 is a figure depicting the drive device 7 as seen from −E3 direction in a state where the rotating members 74 and 75 and the coupling member 76 are arranged at maximum pulling positions.

In a case where the shaft 712 rotates from the reference position to the farthest position in −D direction (the direction opposite to the second direction), as depicted in FIG. 24, the first rotating member 74 is arranged at the maximum pulling position, which is the farthest rotation position in −D direction. At this time, since the second rotating member 75 is in a state where the protrusion 743 and the protrusion 753 contact each other, the second rotating member 75 is rotated in −D direction integrally with the first rotating member 74.

In addition, the rotation of the second rotating member 75 in −D direction moves, in −D direction, the guide protrusion 755 whose −D direction side surface is in contact with the contact section 766. The contact section 766 is thus pressed in −D direction by the guide protrusion 755, and the coupling member 76 rotates in −D direction along with the second rotating member 75.

As a result, the wire WR is pulled in −E1 direction.

Note that, in a case where the coupling member 76 is arranged at the maximum pulling position, the coupling member 76 contacts the restricting section 734 of the cover member 73, and further rotation of the respective rotating members 74 and 75 and the coupling member 76 in +D direction is restricted. As a result, the drive device 7 is prevented from pulling the wire WR in −E1 direction excessively, and application of a load on the operation target is prevented.

[Protection of Drive Device] Here, if the shaft 712 is unintentionally rotated in −D direction for a reason such as that the wire WR is pulled in +E1 direction due to an external factor without driving by the drive device 7, a load is applied to the motor 71. For example, if an arm 41 is pulled by another user toward a side opposite to the bending direction, the wire WR coupled to the arm 41 is pulled in +E1 direction. If the shaft 712 is forcibly rotated in −D direction in such a case, there is a possibility that the motor 71 gets damaged.

Figure 25:
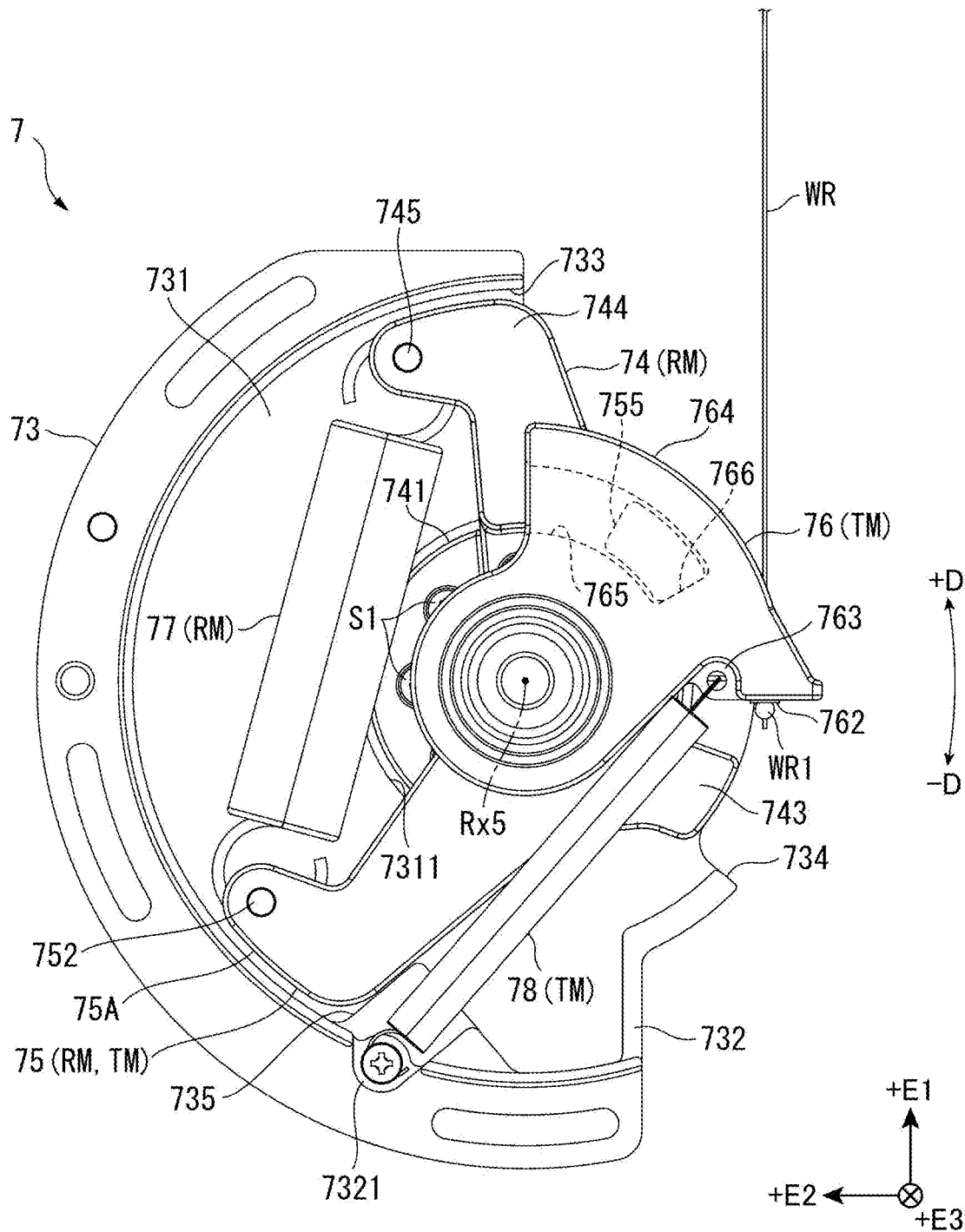
FIG. 25 is a figure depicting the drive device in the first embodiment.

FIG. 25 is an example of a figure depicting the drive device 7 as seen from −E3 direction in a case where the wire WR is pulled in +E1 direction due to an external factor.

To cope with this, in the present embodiment, the second rotating member 75 that rotates the coupling member 76 is configured independently rotatably relative to the first rotating member 74. That is, since the urging force of the first urging member 77 is smaller than the rotational force of the second rotating member 75 in +D direction due to an external factor, as depicted in FIG. 25, the second rotating member 75 rotates in +D direction against the urging force of the first urging member 77, to unwind the wire WR in +E1 direction. Specifically, in a case where the wire WR is pulled in +E1 direction due to an external factor, the contact section 766 of the coupling member 76 presses the guide protrusion 755 in +D direction, and the second rotating member 75 thus rotates in +D direction against the urging force of the first urging member 77.

That is, if the wire WR is moved in +E1 direction due to an external factor, the pulling member TM rotates relatively in +D direction relative to the first rotating member 74 against the urging force of the first urging member 77, to unwind the wire WR in +E1 direction. Specifically, if the wire WR is moved in +E1 direction due to the external factor, the second rotating member 75 rotates in +D direction integrally with the coupling member 76 against the urging force of the first urging member 77, to unwind the wire WR in +E1 direction.

Because of this, without causing the first rotating member 74 and the shaft 712 to rotate in +D direction, rotation of the pulling member TM including the second rotating member 75 and the coupling member 76 in +D direction unwinds the wire WR in +E1 direction. As a result, application of a load to the motor 71 is prevented, and damage to the drive device 7 is prevented.

Note that, in a case where the external factor is removed and there is no longer the load on the wire WR in +E1 direction, the pulling member TM rotates in −D direction due to the urging force of the first urging member 77. As a result, the pulling member TM returns to a position where the pulling member TM was before the wire WR is pulled in +E1 direction due to the external factor.

[Maintenance of Tension] As described above, in order to cause the operation target to perform an action according to the rotational state of the coupling member 76, it is necessary to keep the tension of the wire WR laid from the operation target to the coupling member 76 within a predetermined range. However, in a case where, for example, an arm 41 is bent due to an external factor, or in a case where, for example, the sliding section 5512 or 5522 is moved toward the inner side of the second base 52 due to an external factor for a reason such as that an end of the first base 51 on the side of the main moving link 551 or 552 is inclined in +Z direction, the wire WR is pulled in −E1 direction relative to the drive device 7.

Figure 26:
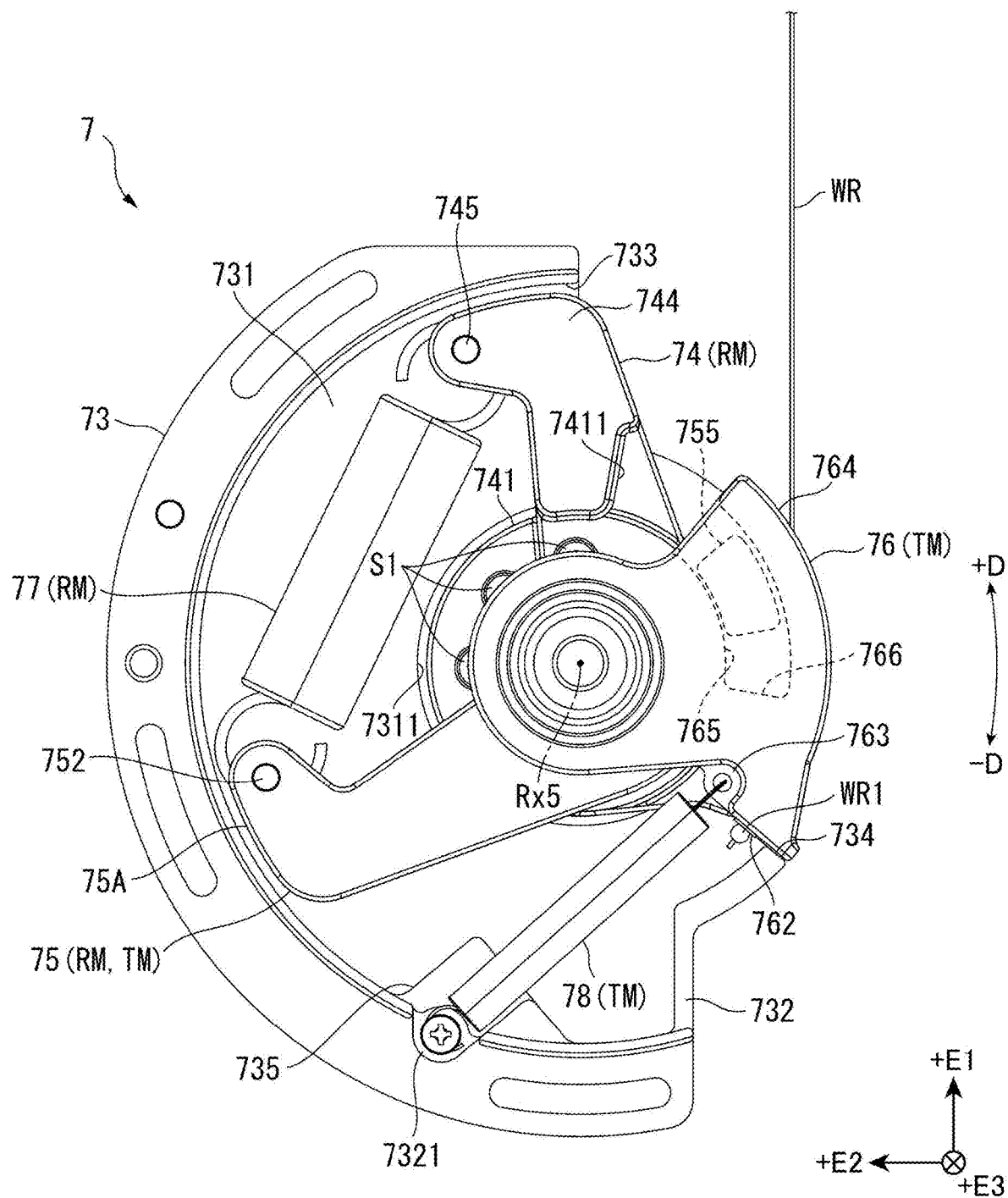
FIG. 26 is a figure depicting the drive device in the first embodiment.

FIG. 26 is an example of a figure depicting the drive device 7 as seen from −E3 direction in a case where the wire WR is unwound in −E1 direction due to an external factor.

To cope with this, the coupling member 76 can rotate in −D direction due to the urging force of the second urging member 78 independently of the rotating member RM including the first rotating member 74 and the second rotating member 75. In addition, the urging force of the second urging member 78 is greater than the tension of the wire WR that is applied when the wire WR is unwound in −E1 direction due to an external factor.

Because of this, as depicted in FIG. 26, the coupling member 76 rotates in −D direction due to the urging force of the second urging member 78 independently of the rotating member RM. At this time, the contact section 766 gets spaced apart from the guide protrusion 755. Since the wire WR is thus pulled in −E1 direction, the tension of the wire WR can be maintained at a value in the predetermined range described above.

Note that, in a case where the external factor is removed and the wire WR gets pulled in +E1 direction, the coupling member 76 rotates in +D direction due to the tension of the wire WR. As a result, the coupling member 76 returns to a position where the coupling member 76 was before the wire WR is unwound in −E1 direction due to the external factor.

Figure 27:
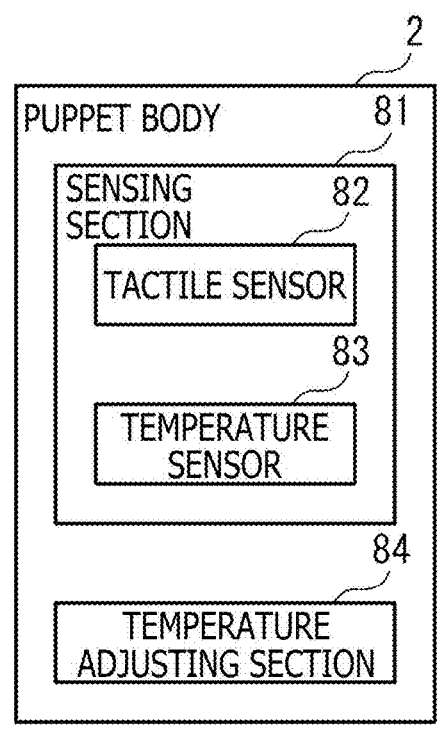
FIG. 27 is a block diagram depicting a configuration of the puppet operating device in the first embodiment.

[Other Configuration of Puppet Operating Device] FIG. 27 is a block diagram depicting a configuration of the puppet operating device 2.

For example, the puppet operating device 2 includes the configuration described above and, in addition, a sensing section 81 and a temperature adjusting section 84 as depicted in FIG. 27.

The sensing section 81 senses stimuli acting on the puppet operating device 2 and outputs sensing results to the second control device 14. The sensing section 81 includes tactile sensors 82 and temperature sensors 83.

The tactile sensors 82 sense approach of objects in a contactless manner. In addition, the tactile sensors 82 sense pressures being applied to objects in contact. In other words, the tactile sensors 82 sense pressures acting thereon from the objects in contact. For example, the tactile sensors 82 are provided to leading ends of the respective arms 41 of the puppet operating device 2. The tactile sensors 82 transmit sensing results to the second control device 14. Note that the tactile sensors 82 have a function as proximity sensors to sense approach of objects, and a function as pressure sensors to sense pressures. However, this is not the sole example. The tactile sensors 82 may have one of the function as proximity sensors and the function as pressure sensors. In addition, instead of the tactile sensors 82, proximity sensors and/or pressure sensors may be provided.

The temperature sensors 83 sense temperatures. For example, the temperature sensors 83 are provided to respective positions corresponding to the trunk section PP1, the head section PP2, the right arm section PP3, and the left arm section PP4 of the puppet PP in the puppet operating device 2, and transmit sensed temperatures to the second control device 14. On the basis of such results of the sensing by the temperature sensors 83, the control section 119 of the operating device 11 causes the temperature adjusting section 117 to operate, and hence, warmth/cold sensation information sensed at the puppet operating device 2 can be given as feedback to the user to which the operating device 11 is attached.

The temperature adjusting section 84 operates according to control signals received from the second control device 14 and gives warm sensations and cold sensations to the user. For example, the control signals are control signals based on results of the sensing by the temperature sensing section 114 of the operating device 11. Although detailed illustrations are omitted, for example, the temperature adjusting section 84 is provided to a position corresponding to the trunk section PP1 of the puppet PP in the puppet operating device 2. For example, the temperature adjusting section 84 can include a thermoelectric conversion element such as a Peltier element.

Furthermore, the puppet operating device 2 may include at least one sensor selected from an image sensor and an audio sensor (microphone). In this case, as with results of the sensing by the tactile sensors 82 and the temperature sensors 83, the puppet operating device 2 transmits, to the second control device 14, information regarding the surrounding environment of the puppet operating device 2 sensed by the at least one sensor. Then, the second control device 14 transmits results of the sensing by the at least one sensor described above to the first control device 13 via the network NT. Thus, in a case where, for example, a large motion or volume exceeding a predetermined threshold is sensed for a predetermined period of time, the control section 119 of the operating device 11 determines that the puppet operating device 2 is in a lively and excited situation, converts the surrounding situation of the puppet operating device 2 into information regarding stimuli to be given to the operating device 11 as vibrations to the user by the vibration generating section 116, heating of the user by the temperature adjusting section 117, and the like, and transmits the information. With such transmission, the operation system 1 can also present information for richer communication. Because of this, the operation system 1 can also be called a communication system.

[Advantages of First Embodiment] The operation system 1 according to the present embodiment explained above achieves the following advantages.

The drive device 7 unwinds, in +E1 direction, the wire WR connected to an operation target such as the arms 41 or the main moving links 551 and 552 with predetermined tension, and pulls the wire WR in −E1 direction, to cause the operation target to perform actions. The drive device 7 includes the motor 71, the first rotating member 74, the pulling member TM, and the first urging member 77.

The first rotating member 74 can be rotated by the motor 71 in +D direction about the rotation axis Rx5. The pulling member TM is provided rotatably coaxially with the first rotating member 74 and holds the end WR1 of the wire WR. The pulling member TM rotates in +D direction to unwind the wire WR in +E1 direction, and rotates in −D direction to pull the wire WR in −E1 direction. The first urging member 77 is equivalent to the pulling member side urging member and urges the pulling member TM in −D direction relative to the first rotating member 74. If the wire WR is moved in +E1 direction due to an external factor, the pulling member TM rotates in +D direction against the urging force of the first urging member 77, to unwind the wire WR in +E1 direction.

According to such a configuration, rotation of the first rotating member 74 and the pulling member TM by the motor 71 in +D direction can unwind the wire WR connected to the operation target in +E1 direction. In addition, rotation of the first rotating member 74 and the pulling member TM by the motor 71 in −D direction can pull the wire WR in −E1 direction. The operation target can thus be caused to perform an action.

In addition, in a case where the wire WR is moved in +E1 direction due to an external factor, rotation of the pulling member TM in +D direction against the urging force of the first urging member 77 can unwind the wire WR in +E1 direction without causing the first rotating member 74 to rotate. As a result, it is possible to prevent a load due to the external factor from being applied to the motor 71.

In the drive device 7, the first rotating member 74 has the protrusion 743 as the first protrusion. The second rotating member 75 constituting the pulling member TM has the protrusion 753 that is arranged in +D direction relative to the protrusion 743 and that can contact the protrusion 743. The protrusion 753 is equivalent to the second protrusion.

According to such a configuration, the protrusion 753 abuts on the protrusion 743 when the pulling member TM is rotated by the first urging member 77 in −D direction. As a result, relative rotation of the pulling member TM in +D direction relative to the first rotating member 74 can be limited to only when the wire WR is moved in +E1 direction due to an external factor.

In the drive device 7, the pulling member TM has the second rotating member 75, the coupling member 76, and the second urging member 78. The second rotating member 75 is provided rotatably coaxially with the first rotating member 74 and is connected with the first urging member 77. The coupling member 76 is coupled with the wire WR and can rotate coaxially with the second rotating member 75. The second urging member 78 urges the coupling member 76 in −D direction. The second urging member 78 is equivalent to the coupling member side urging member.

According to such a configuration, the second rotating member 75 and the coupling member 76 rotate integrally when the urging force of the second urging member 78 is smaller than the tension of the wire WR. Because of this, as described above, in a case where the wire WR is moved in +E1 direction due to an external factor, rotation of the pulling member TM in +D direction against the urging force of the second urging member 78 can unwind the wire WR in +E1 direction.

On the other hand, if the wire WR is moved in −E1 direction due to an external factor and the urging force of the second urging member 78 gets greater than the tension of the wire WR, rotation of the coupling member 76 in −D direction due to the urging force of the second urging member 78 pulls the wire WR in −E1 direction. As a result, the tension of the wire WR can be maintained in a predetermined range. Accordingly, the wire WR can be prevented from loosening, and it is possible to cause the operation target to perform an action stably.

In the drive device 7, the second rotating member 75 has the guide protrusion 755. The coupling member 76 has the guide groove 765 and the contact section 766. The guide groove 765 is provided with the guide protrusion 755 slidably along +D direction. The contact section 766 is provided to the guide groove 765. The contact section 766 contacts the −D direction side surface of the guide protrusion 755.

According to such a configuration, when the wire WR is moved in +E1 direction due to an external factor, the guide protrusion 755 arranged in the guide groove 765 presses the contact section 766, and the coupling member 76 coupled with the wire WR can thus rotate in +D direction along with the second rotating member 75 against the urging force of the first urging member 77. That is, the second rotating member 75 and the coupling member 76 can be rotated in +D direction without causing the first rotating member 74 to rotate. Accordingly, the wire WR can be unwound in +E1 direction, and hence, it is possible to prevent a load from being applied to the motor 71.

In the drive device 7, the urging force of the first urging member 77 as the pulling member side urging member and the rotating member side urging member is greater than the tension of the wire WR in the reference state. In addition, the urging force of the second urging member 78 as the coupling member side urging member is smaller than the tension of the wire WR in the reference state. Note that the reference state is a state where a force due to an external factor other than the drive devices 7 is not applied to the wire.

According to such a configuration, unless the wire WR is moved in +E1 direction due to an external factor, the first rotating member 74 can be rotated integrally with the second rotating member 75 and the coupling member 76.

In addition, in a case where the wire is moved in +E1 direction due to an external factor and the tension of the wire WR gets greater than the urging force of the first urging member, the second rotating member 75 and the coupling member 76 can be rotated relatively in +D direction relative to the first rotating member 74. As a result, the wire WR can be unwound in +E1 direction, and accordingly, it is possible to prevent a load from being applied to the motor 71.

Further, in a case where the wire WR is moved in −E1 direction due to an external factor and the tension of the wire WR gets smaller than the urging force of the second urging member 78, the coupling member 76 can be relatively rotated in −D direction relative to the second rotating member 75. As a result, the wire WR can be pulled in −E1 direction, and the tension of the wire WR can be maintained in a predetermined range.

In addition, the drive device 7 unwinds, in +E1 direction, the wire WR connected to the operation target such as the arms 41 or the main moving links 551 and 552 with predetermined tension, and pulls the wire WR in −E1 direction, to cause the operation target to perform actions.

The drive device 7 includes the motor 71, the rotating member RM, the coupling member 76, and the second urging member 78.

The rotating member RM can be rotated by the motor 71 in ±D direction about the rotation axis Rx5. The coupling member 76 is provided rotatably coaxially with the rotating member RM and coupled with the wire WR. The coupling member 76 rotates in +D direction integrally with the rotating member RM to unwind the wire WR in +E1 direction. The coupling member 76 rotates in −D direction integrally with the rotating member RM to pull the wire WR in −E1 direction. The second urging member 78 is equivalent to the coupling member side urging member and urges the coupling member 76 in −D direction. When the wire WR is moved in −E1 direction due to an external factor, the coupling member 76 rotates in −D direction independently of the rotating member RM due to the urging force of the second urging member 78, to pull the wire WR in −E1 direction.

According to such a configuration, as described above, rotation of the rotating member RM and the coupling member 76 by the motor 71 in +D direction can unwind the wire WR connected to the operation target in +E1 direction. In addition, rotation of the rotating member RM and the coupling member 76 by the motor 71 in −D direction can pull the wire WR in −E1 direction. As a result, the operation target can be caused to perform an action.

In addition, in a case where the wire WR is moved in −E1 direction due to an external factor, rotation of the coupling member 76 in −D direction, which is the rotation direction of the coupling member 76 at the time when the wire WR is pulled in −E1 direction, due to the urging force of the second urging member 78 can pull the wire WR in −E1 direction without causing the rotating member RM to rotate. As a result, the tension of the wire WR can be maintained in a predetermined range. Accordingly, the operation target can be caused to perform an action stably.

In the drive device 7, the rotating member RM has the first rotating member 74, the second rotating member 75, and the first urging member 77. The first rotating member 74 can be rotated by the motor 71 in +D direction about the rotation axis Rx5. The second rotating member 75 is provided rotatably in +D direction coaxially with the first rotating member 74. The first urging member 77 is equivalent to the rotating member side urging member and urges the second rotating member 75 in −D direction relative to the first rotating member 74. If the wire WR is moved in +E1 direction due to an external factor, the second rotating member 75 rotates in +D direction integrally with the coupling member 76 against the urging force of the first urging member 77, to unwind the wire WR in +E1 direction.

According to such a configuration, the first rotating member 74 and the second rotating member 75 rotate integrally when the urging force of the first urging member 77 is greater than the tension of the wire WR. Because of this, the wire WR can be moved in ±E1 direction according to the drive state of the motor 71 that rotates the first rotating member 74.

Meanwhile, when the wire WR is moved in +E1 direction due to an external factor and the tension of the wire WR gets greater than the urging force of the first urging member 77, rotation of the second rotating member 75 in +D direction against the urging force of the first urging member 77 can unwind the wire WR in +E1 direction without causing the first rotating member 74 to rotate. As a result, it is possible to prevent a load from being applied to the motor 71.

The drive device 7 includes the cover member 73 mounted on the motor 71. The second urging member 78 is connected to the coupling member 76 and the cover member 73.

According to such a configuration, the second urging member 78 can be arranged stably.

The manipulator MP includes the arms 41, the wires WR, and the drive devices 7 (7A to 7D).

Each arm 41 has the plurality of links that can bend relative to each other. Each wire WR is connected to at least one of the plurality of links. Each drive device 7 (7A to 7D) unwinds the wire WR in +E1 direction and pulls the wire WR in −E1 direction to drive an arm 41.

According to such a configuration, advantages similar to those of the drive device 7 can be achieved. In addition, as a result, the arms 41 can be caused to perform actions stably.

The puppet operating device 2 is attached inside the puppet PP and causes the puppet PP to perform actions. The puppet operating device 2 includes the manipulator MP and the support member 42. The manipulator MP includes a plurality of sets of the arm 41, the wire WR, and the drive device 7. The plurality of arms 41 include the right arm 41R, the left arm 41L, and the upper arms 41H. The right arm 41R is equivalent to the first arm. The right arm 41R is mounted to extend leftward from a left portion of the support member 42 as seen from the front surface side of the support member 42. The left arm 41L is equivalent to the second arm. The left arm 41L is mounted to extend rightward from a right portion of the support member 42 as seen from the front surface side of the support member 42. The upper arms 41H are mounted to extend upward from an upper portion of the support member 42 as seen from the front surface side of the support member 42. The upper arms 41H include the upper first arm 41HA as the third arm and the upper second arm 41HB as the fourth arm. The upper first arm 41HA is arranged to the left side of the upper second arm 41HB as seen from the front surface side of the support member 42.

According to such a configuration, for example, the right arm 41R and the left arm 41L can cause the right arm section PP3 and the left arm section PP4 of the puppet PP to perform actions. In addition, for example, the upper arms 41H can cause the head section PP2 of the puppet PP to perform an action. Accordingly, it is possible to cause the puppet PP to perform diverse actions.

In the puppet operating device 2, the right arm 41R causes the right arm section PP3 of the puppet PP to perform an action, and the left arm 41L causes the left arm section PP4 of the puppet PP to perform an action. In addition, each of the upper first arm 41HA and the upper second arm 41HB causes the head section PP2 of the puppet PP to perform an action mutually independently.

According to such a configuration, by operating the upper first arm 41HA and the upper second arm 41HB independently, for example, it is possible to incline the head section PP2 rightward or incline the head section PP2 leftward as seen from the front surface side. Accordingly, it is possible to cause the puppet PP to perform diverse actions.

The movable base MV constituting the puppet operating device 2 includes the first base 51, the second base 52, the support mechanism 54, the wires WR, and the drive devices 7 (7E, 7F).

The second base 52 is arranged to face the first base 51. The support mechanism 54 is provided to the second base 52 and supports the first base 51. The drive devices 7 (7E, 7F) unwind and pull the wires WR. The support mechanism 54 has the main moving links 551 and 552. The main moving link 551 has the mounting section 5511 mounted on the first base 51, and the sliding section 5512 that can slide along the second base 52. The main moving link 552 has the mounting section 5521 mounted on the first base 51, and the sliding section 5522 that can slide along the second base 52. The mounting sections 5511 and 5521 are equivalent to the main moving link side mounting sections, and the sliding sections 5512 and 5522 are equivalent to the main moving link side sliding sections. In addition, the first base 51 is equivalent to one base of the first base 51 and the second base 52, and the second base 52 is equivalent to the other base of the first base 51 and the second base 52.

The drive devices 7 (7E, 7F) either pull or unwind the wires WR to cause the sliding sections 5512 and 5522 to slide, and thus incline the first base 51 relative to the second base 52.

According to such a configuration, advantages similar to those of the drive device 7 described above can be achieved. In addition, as a result, it is possible to cause the main moving links 551 and 552 to perform actions stably, and it is thus possible to incline the first base 51 stably relative to the second base 52.

In the movable base MV, the support mechanism 54 includes the follower moving links 553 and 554. The follower moving link 553 has the mounting section 5531 mounted on the first base 51, and the sliding section 5532 that can slide along the second base 52. The follower moving link 554 has the mounting section 5541 mounted on the first base 51, and the sliding section 5542 that can slide along the second base 52. The mounting sections 5531 and 5541 are equivalent to the follower moving link side mounting sections, and the sliding sections 5532 and 5542 are equivalent to the follower moving link side sliding sections. The follower moving link 553 is provided being spaced apart from the main moving link 551 in +X direction in which the sliding section 5512 can slide, and the follower moving link 554 is provided being spaced apart from the main moving link 552 in +Y direction in which the sliding section 5522 can slide.

According to such a configuration, since the first base 51 is supported to the second base 52 by the main moving links 551 and 552 and the follower moving links 553 and 554, the first base 51 can be supported stably. In addition, while the sliding sections 5512 and 5522 of the main moving links 551 and 552 are caused to slide by the drive devices 7E and 7F, the sliding sections 5532 and 5542 of the follower moving links 553 and 554 are not caused to slide by the drive devices 7 but to slide following the movement of the sliding sections 5512 and 5522. Because of this, as compared to a configuration in which the sliding sections 5532 and 5542 are caused to slide by the drive devices 7, the number of drive devices 7 to cause the movable base MV to perform an action can be reduced.

The movable base MV includes the two main moving links 551 and 552 and the two follower moving links 553 and 554. The drive devices 7E and 7F are provided corresponding to the two main moving links 551 and 552. ±X direction in which the sliding section 5512 can slide and ±Y direction in which the sliding section 5522 can slide cross each other, and ±X direction in which the sliding section 5532 can slide and ±Y direction in which the sliding section 5542 can slide cross each other.

According to such a configuration, the first base 51 can be supported stably.

In addition, by arranging the main moving links 551 and 552 and the follower moving links 553 and 554 as described above, inclination directions of the first base 51 can be increased.

In a case where the main moving link 551 in the two main moving links 551 and 552 is defined as a first main moving link in the movable base MV, the main moving link 552 is a second main moving link. In a case where the follower moving link 553 in the two follower moving links 553 and 554 is defined as a first follower moving link, the follower moving link 554 is a second follower moving link. The direction (+X direction) in which the sliding section 5512 (first main moving link side sliding section) of the main moving link 551 can slide and the direction (+X direction) in which the sliding section 5532 (follower moving link side sliding section) of the follower moving link 553 can slide are parallel to each other. The direction (+Y direction) in which the sliding section 5522 (main moving link side sliding section) of the main moving link 552 can slide and the direction (+Y direction) in which the sliding section 5542 (follower moving link side sliding section) of the follower moving link 554 can slide are parallel to each other. The direction (+X direction) in which the sliding section 5512 of the main moving link 551 can slide and the direction (+Y direction) in which the sliding section 5522 of the main moving link 552 can slide are perpendicular to each other.

According to such a configuration, the two main moving links 551 and 552 and the two follower moving links 553 and 554 are arranged radially about a position between the main moving link 551 and the follower moving link 553. As a result, by causing each of the sliding sections 5512 and 5522 of the main moving links 551 and 552 to slide independently, it is possible to incline the first base in any direction relative to the second base. Accordingly, the convenience of the movable base MV can be enhanced.

In the movable base MV, the lengthwise dimensions of the main moving links 551 and 552 are shorter than the lengthwise dimensions of the follower moving links 553 and 554.

Here, the inclination angles of the main moving links 551 and 552 relative to the second base 52 increase as the sliding sections 5512 and 5522 and the mounting sections 5511 and 5521 get closer to each other as seen from the side of the first base 51, and decrease as the sliding sections 5512 and 5522 and the mounting sections 5511 and 5521 get farther from each other. Since the one main moving link 551 and the one follower moving link 553 are arranged to face each other in +X direction, if the lengthwise dimension of the main moving link 551 and the lengthwise dimension of the follower moving link 553 are the same, the first base 51 can incline only toward the side of the follower moving link 553 relative to the main moving link 551 even when the sliding section 5512 is moved. Similarly, if the lengthwise dimension of the main moving link 552 and the lengthwise dimension of the follower moving link 554 are the same, the first base 51 can incline only toward the side of the follower moving link 554 relative to the main moving link 552.

To cope with this, the lengthwise dimensions of the main moving links 551 and 552 are shorter than the lengthwise dimensions of the follower moving links 553 and 554. As a result, by causing the sliding section 5512 to slide to make the inclination angle of the main moving link 551 relative to the second base 52 smaller, the first base 51 can be inclined toward the side of the main moving link 551. In addition, by causing the sliding section 5512 to slide to make the inclination angle of the main moving link 551 relative to the second base 52 greater, the first base 51 can be inclined toward the side of the follower moving link 553. The same can be realized also with the main moving link 552 and the follower moving link 554. Accordingly, inclination directions of the first base 51 can be increased.

In the movable base MV, the base in the first base 51 and the second base 52 on which the mounting sections 5511, 5521, 5531, and 5541 are mounted is the first base 51, and the base on which the sliding sections 5512, 5522, 5532, and 5542 slide is the second base 52.

According to such a configuration, in a case where the second base 52 is arranged below the first base 51, the second base 52 can be formed larger than the first base 51. As a result, the sliding area of each sliding section 5512, 5522, 5532, or 5542 can be increased.

In the movable base MV, the wires WR are connected to the sliding sections 5512 and 5522.

According to such a configuration, it can be made easier to cause the sliding sections 5512 and 5522 to slide using the wires WR unwound and pulled by the drive devices 7.

The movable base MV includes the first guide rail 531 that slidably supports the sliding section 5512 of the main moving link 551, and the first guide rail 532 that slidably supports the sliding section 5522 of the main moving link 552. The first guide rail 531 has the hole 5312 that is provided in the sliding direction (+X direction) of the sliding section 5512 supported by the first guide rail 531, and through which the wire WR connected to the sliding section 5512 is inserted. Similarly, the first guide rail 532 has the hole 5322 that is provided in the sliding direction (+Y direction) of the sliding section 5522 supported by the first guide rail 532, and through which the wire WR connected to the sliding section 5522 is inserted.

According to such a configuration, a wire WR can be connected to each of the sliding sections 5512 and 5522 without causing the wire WR to twist. Accordingly, the reliability of the movable base MV can be enhanced.

[Second Embodiment] Next, a second embodiment of the present invention is explained.

An operation system according to the present embodiment includes a configuration similar to that of the operation system 1 according to the first embodiment, but is different in terms of the configuration of a puppet operating device. Specifically, a base unit in the puppet operating device of the operation system according to the present embodiment is different from the base unit 5 of the puppet operating device 2 of the operation system 1 according to the first embodiment. Note that, in the following explanation, portions identical to or substantially identical to portions explained already are given identical reference signs, and explanations thereof are omitted.

Figure 28:
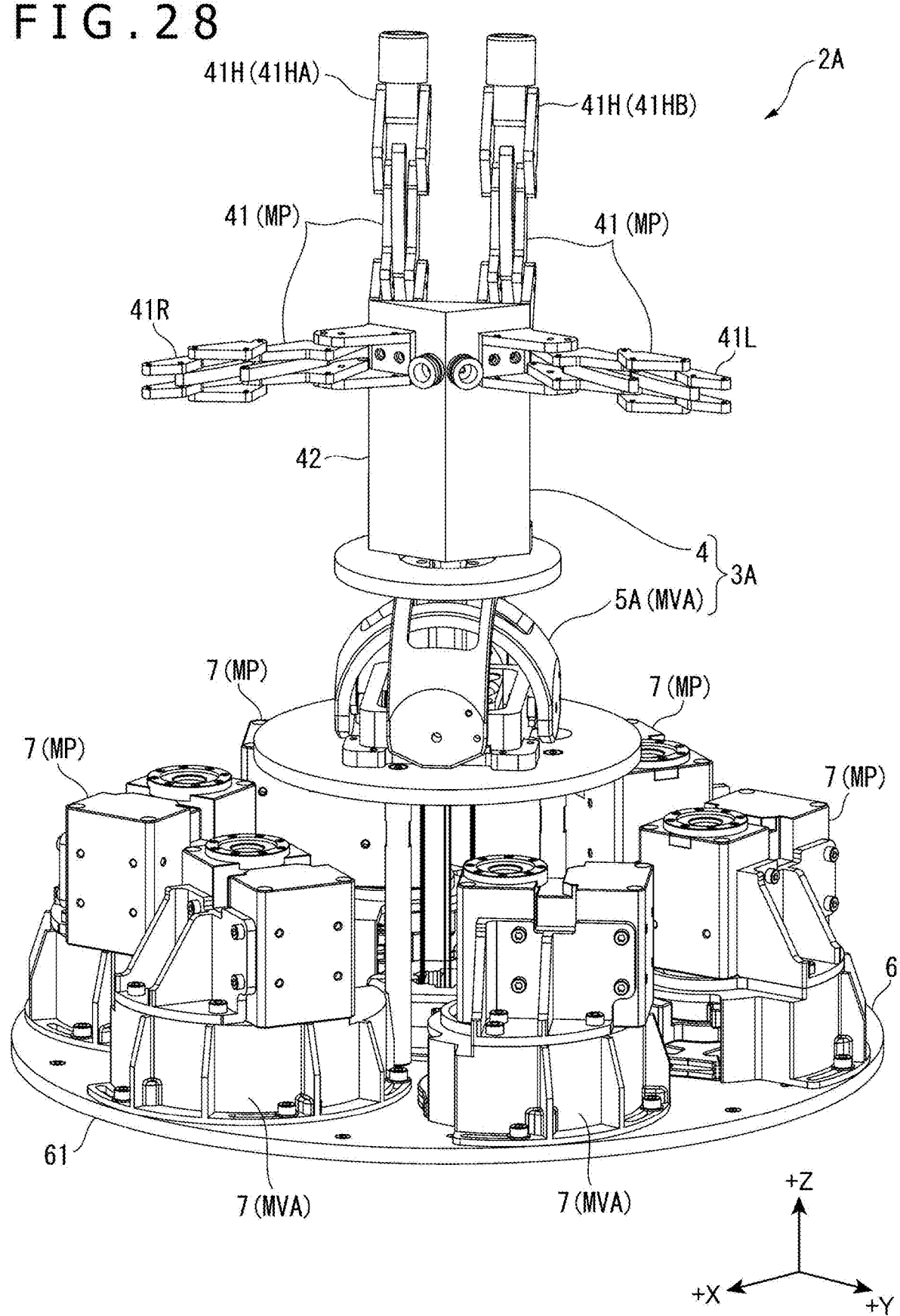
FIG. 28 is a perspective view depicting a puppet operating device of an operation system in a second embodiment.

[Schematic Configuration of Operation System and Puppet Operating Device] FIG. 28 is a perspective view depicting a puppet operating device 2A of the operation system in the present embodiment.

The operation system according to the present embodiment includes the puppet operating device 2A depicted in FIG. 28 instead of the puppet operating device 2, and, in other respects, has a configuration and functions similar to those of the operation system 1 according to the first embodiment.

The puppet operating device 2A includes an action unit 3A instead of the action unit 3, and, in other respects, has a configuration and functions similar to those of the puppet operating device 2 according to the first embodiment. That is, the puppet operating device 2A includes the action unit 3A and the drive unit 6. In addition, the action unit 3A includes a base unit 5A instead of the base unit 5, and, in other respects, has a configuration and functions similar to those of the action unit 3 according to the first embodiment. That is, the action unit 3A includes the arm unit 4 and the base unit 5A.

A movable base MVA according to the present embodiment includes the base unit 5A, and, in addition, includes the wire WR and the drive device 7 although illustrations are omitted in FIG. 28.

Figure 29:
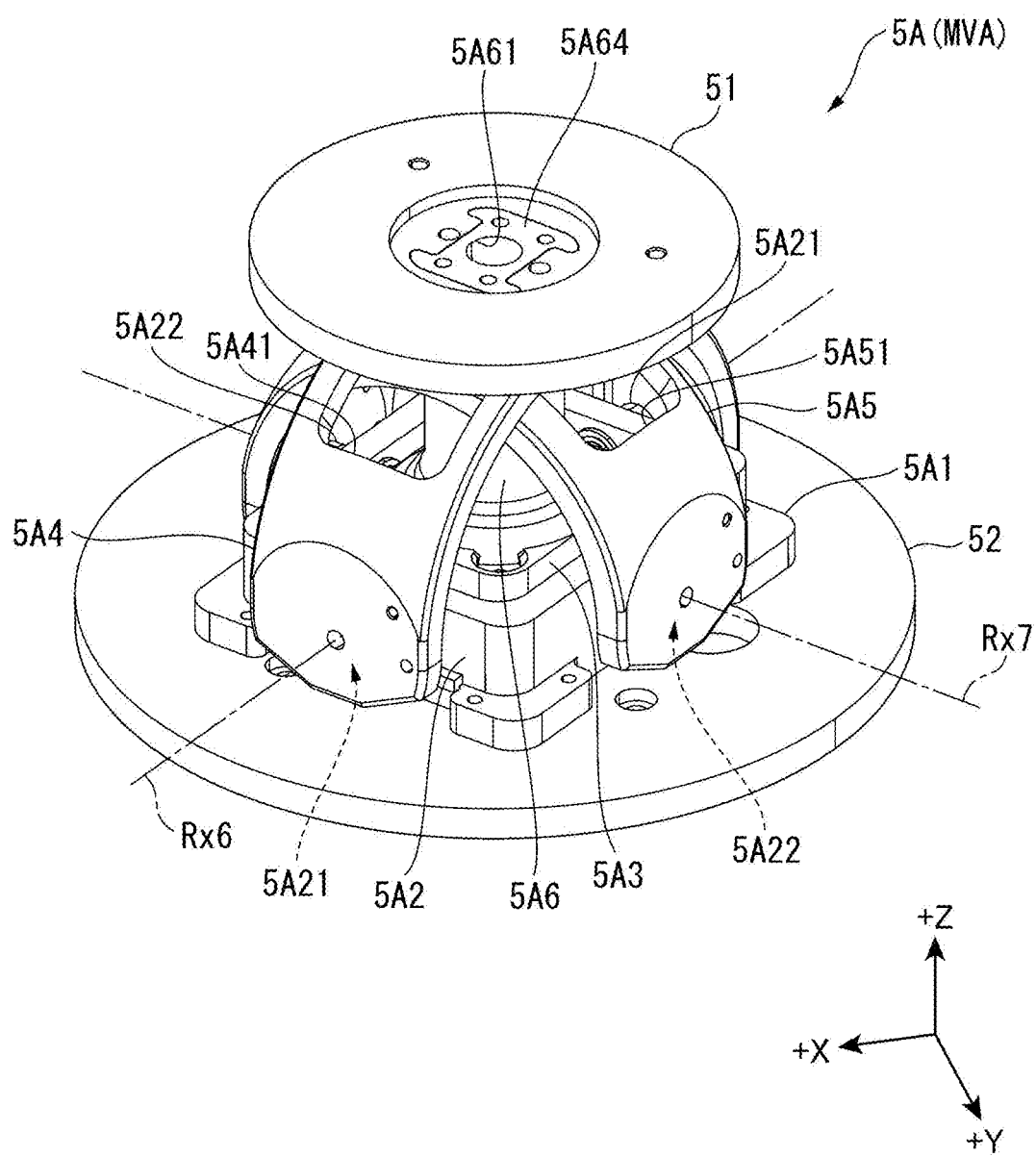
FIG. 29 is a perspective view depicting a base unit in the second embodiment.
Figure 30:
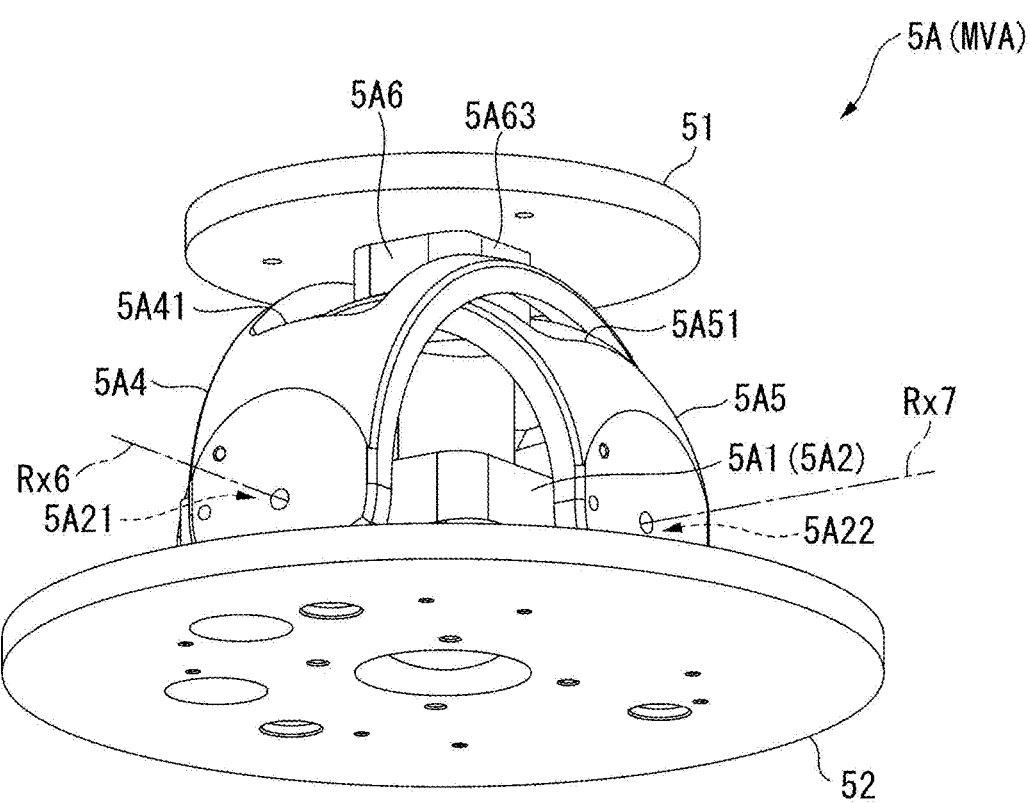
FIG. 30 is a perspective view depicting the base unit in the second embodiment.
Figure 31:
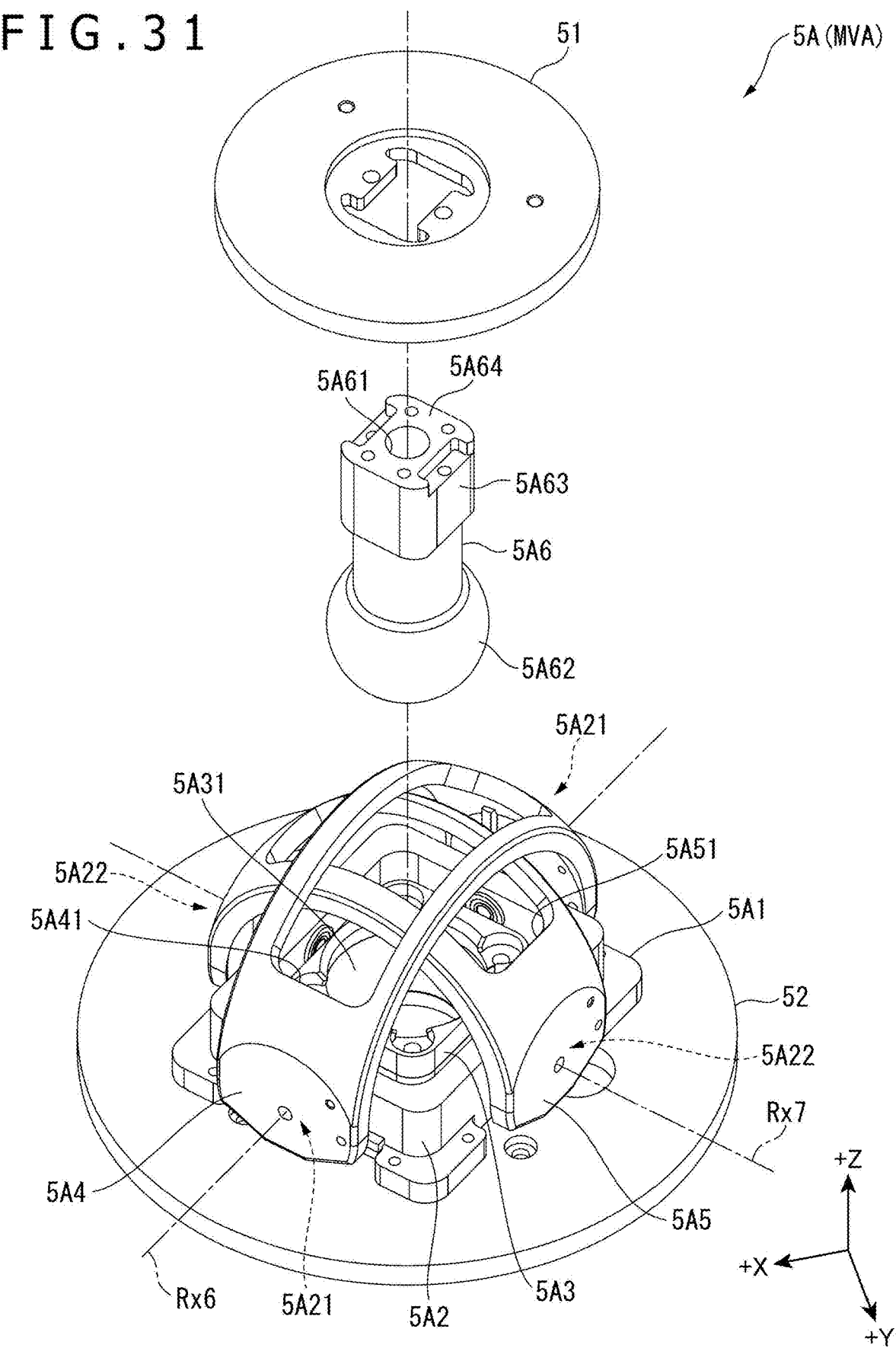
FIG. 31 is an exploded perspective view depicting the base unit in the second embodiment.
Figure 32:
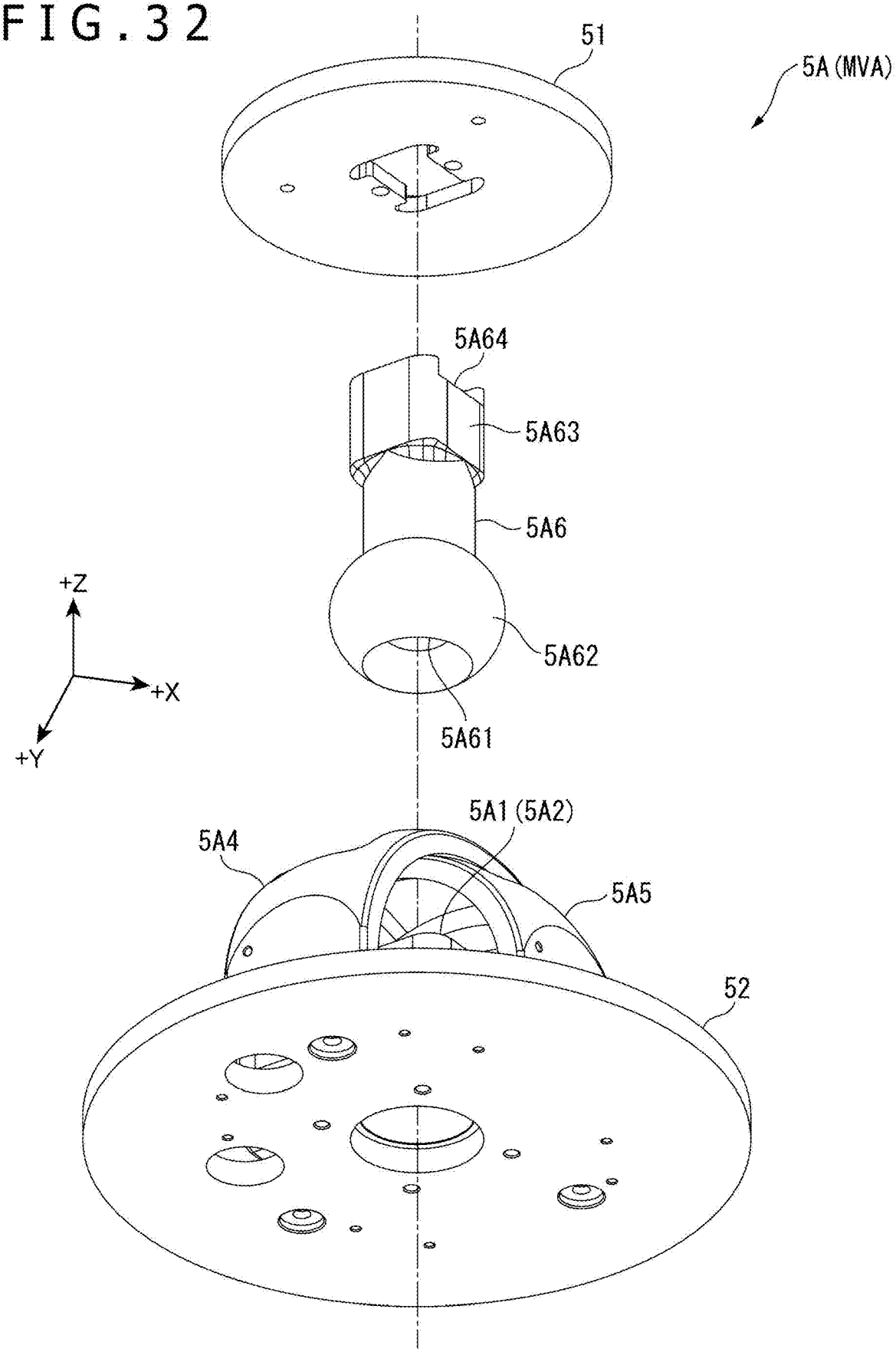
FIG. 32 is an exploded perspective view depicting the base unit in the second embodiment.

[Configuration of Base Unit] FIG. 29 is a perspective view of the base unit 5A as seen from +Z direction, and FIG. 30 is a perspective view of the base unit 5A as seen from −Z direction. FIG. 31 is an exploded perspective view of the base unit 5A as seen from +Z direction, and FIG. 32 is an exploded perspective view of the base unit 5A as seen from −Z direction.

As with the base unit 5, the base unit 5A supports the arm unit 4 and also inclines the arm unit 4 relative to an imaginary plane perpendicular to +Z direction. As depicted in FIG. 29 to FIG. 32, the base unit 5A includes the first base 51, the second base 52, a support base 5A1, a first arch 5A4, a second arch 5A5, and a shaft-shaped member 5A6.

[Configuration of Support Base] The support base 5A1 is arranged at substantially the middle of the second base 52 as seen from +Z direction. As depicted in FIG. 29 and FIG. 31, the support base 5A1 has a first support frame 5A2 and a second support frame 5A3.

The first support frame 5A2 supports the first arch 5A4 and the second arch 5A5. The first support frame 5A2 has a first support section 5A21 and a second support section 5A22.

The first support section 5A21 supports the first arch 5A4 in such a manner that the first arch 5A4 can rotate about a rotation axis Rx6 perpendicular to +Z direction. Although illustrations are omitted, the first support section 5A21 includes a protrusion that protrudes outward from an outer surface of the first support frame 5A2 and that is inserted into the first arch 5A4.

The second support section 5A22 supports the second arch 5A5 in such a manner that the second arch 5A5 can rotate about a rotation axis Rx7 perpendicular to both +Z direction and the rotation axis Rx6. Although illustrations are omitted, as with the first support section 5A21, the second support section 5A22 includes a protrusion that protrudes outward from the outer surface of the first support frame 5A2 and that is inserted into the first arch 5A4.

The second support frame 5A3 is a rectangular member arranged on the inner side of the first support frame 5A2 as seen from +Z direction and supports the shaft-shaped member 5A6. As depicted in FIG. 32, the second support frame 5A3 has a support surface 5A31 provided on the inner side of the second support frame 5A3.

The support surface 5A31 supports the shaft-shaped member 5A6 in such a manner that the shaft-shaped member 5A6 can incline relative to the X-Y plane. The support surface 5A31 is formed in a substantially hemispherical shape, and a spherical section 5A62 mentioned later of the shaft-shaped member 5A6 contacts the support surface 5A31.

[Configuration of First Arch and Second Arch] Each of the first arch 5A4 and the second arch 5A5 is formed in an arc shape protruding in +Z direction. As described above, the first arch 5A4 is supported by the support base 5A1 in such a manner that the first arch 5A4 can rotate about the rotation axis Rx6, and the second arch 5A5 is supported by the support base 5A1 in such a manner that the second arch 5A5 can rotate about the rotation axis Rx7.

The first arch 5A4 has an opening 5A41 at a position sandwiched by its both ends supported by the support base 5A1. The shaft-shaped member 5A6 is inserted through the opening 5A41 along +Z direction. Although detailed illustrations are omitted, the first arch 5A4 is connected with one drive device 7 in the drive devices 7E and 7F (see FIG. 16) via the wire WR. Then, when the one drive device 7 unwinds or pulls the wire WR, the first arch 5A4 rotates in one direction or in the other direction about the rotation axis Rx6. As a result, the shaft-shaped member 5A6 inclines relative to the second base 52 about the rotation axis Rx6.

The second arch 5A5 has an opening 5A51 at a position sandwiched by its both ends supported by the support base 5A1. The shaft-shaped member 5A6 is inserted through the opening 5A51 along +Z direction. Although detailed illustrations are omitted, the second arch 5A5 is connected with the other drive device 7 in the drive devices 7E and 7F via the wire WR. Then, when the other drive device 7 unwinds or pulls the wire WR, the second arch 5A5 rotates in one direction or in the other direction about the rotation axis Rx7. As a result, the shaft-shaped member 5A6 inclines relative to the second base 52 about the rotation axis Rx7.

[Configuration of Shaft-Shaped Member] The shaft-shaped member 5A6 supports the first base 51 and also is supported by the support base 5A1 in such a manner that the shaft-shaped member 5A6 can incline relative to the second base 52. In addition, the shaft-shaped member 5A6 inclines relative to the second base 52 according to the rotational state of the first arch 5A4 and the rotational state of the second arch 5A5. The shaft-shaped member 5A6 has a penetrating section 5A61, the spherical section 5A62, a contact section 5A63, and a coupling section 5A64.

As depicted in FIG. 32, the penetrating section 5A61 penetrates the shaft-shaped member 5A6 along +Z direction. The wires WR connected with the respective drive devices 7 of the drive unit 6 are inserted through the penetrating section 5A61 along +Z direction.

The spherical section 5A62 is provided to a −Z direction side end of the shaft-shaped member 5A6. The spherical section 5A62 is formed in a substantially spherical shape and contacts, from +Z direction, the support surface 5A31 formed in a hemispherical shape. As a result, the shaft-shaped member 5A6 is supported in such a manner that the shaft-shaped member 5A6 can incline relative to the second base 52 along the support surface 5A31.

The contact section 5A63 is provided in +Z direction relative to the spherical section 5A62 in the shaft-shaped member 5A6. The contact section 5A63 is a portion that contacts an inner edge of the opening 5A41 of the first arch 5A4 and an inner edge of the opening 5A51 of the second arch 5A5. In the present embodiment, the contact section 5A63 is formed in a quadrangular prism shape about an axis lying along +Z direction. Two surfaces in four outer surfaces of the contact section 5A63 are perpendicular to the rotation axis Rx6, and the other two surfaces are perpendicular to the rotation axis Rx7.

The coupling section 5A64 is a portion coupled with the first base 51. The coupling section 5A64 is arranged at a +Z direction side end of the shaft-shaped member 5A6. That is, the coupling section 5A64 is provided on the side opposite to the spherical section 5A62 relative to the contact section 5A63.

[Action of Base Unit] When rotation of the first arch 5A4 about the rotation axis Rx6 and/or rotation of the second arch 5A5 about the rotation axis Rx7 occurs, the shaft-shaped member 5A6 inclines relative to the second base 52 along the hemispherical support surface 5A31 contacted by the spherical section 5A62. Because of this, the first base 51 coupled to the coupling section 5A64 of the shaft-shaped member 5A6 inclines relative to the second base 52. That is, the first base 51 inclines relative to the X-Y plane. As a result, it is possible to incline the arm unit 4 supported by the first base 51 relative to the X-Y plane.

[Advantages of Second Embodiment] The operation system according to the present embodiment explained above can achieve advantages similar to those of the operation system 1 according to the first embodiment.

[Third Embodiment] Next, a third embodiment of the present invention is explained.

An operation system according to the present embodiment includes a configuration similar to that of the operation system 1 according to the first embodiment or the operation system according to the second embodiment, but is different in terms of the configuration of a pulley unit included in the drive unit. Note that, in the following explanation, portions identical to or substantially identical to portions explained already are given identical reference signs, and explanations thereof are omitted.

Figure 33:
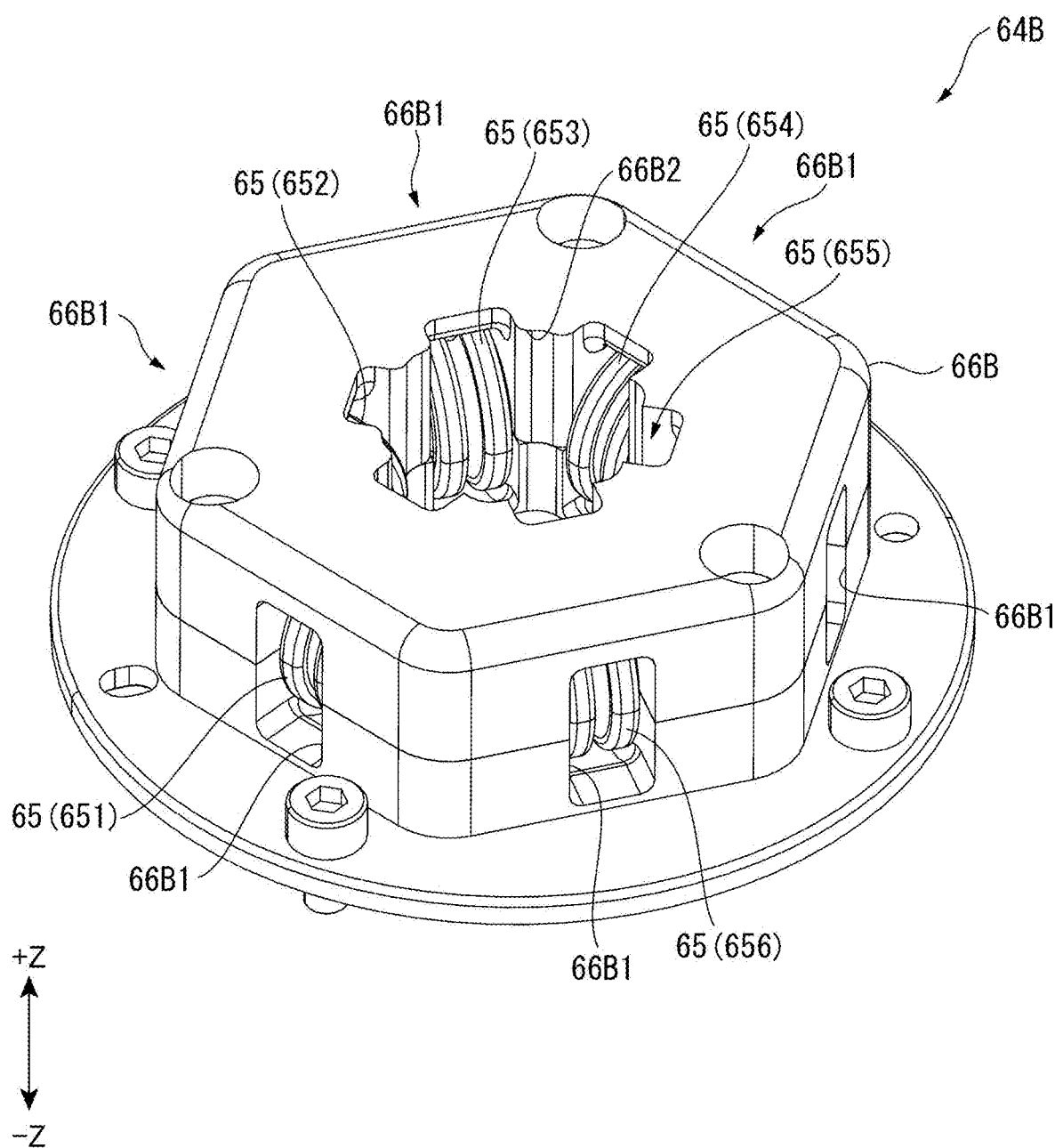
FIG. 33 is a perspective view depicting a pulley unit in a third embodiment.

FIG. 33 is a plan view of a pulley unit 64B included in a puppet operating device of the operation system according to the present embodiment as seen from +Z direction.

The operation system according to the present embodiment includes the pulley unit 64B depicted in FIG. 33 instead of the pulley unit 64, and, in other respects, has a configuration and functions similar to those of the operation system 1 according to the first embodiment or the operation system according to the second embodiment. That is, the puppet operating device according to the present embodiment includes the pulley unit 64B instead of the pulley unit 64, and, in other respects, has a configuration and functions similar to those of the puppet operating device 2 or the puppet operating device 2A.

As with the pulley unit 64, the pulley unit 64B includes the plurality of pulleys 65 and a housing 66B that houses therein the plurality of pulleys 65.

In the pulley unit 64B, the plurality of pulleys 65 are arranged at substantially equal intervals along the circumferential direction about the middle of the housing 66B as seen from +Z direction. As described above, the wires WR extending from the corresponding drive devices 7 in the plurality of drive devices 7 are laid on the plurality of pulleys 65, and the pulleys 65 change the extending directions of the wires WR in +Z direction.

The respective wires WR connected to the upper second arm 41HB, the left arm 41L, the right arm 41R, and the upper first arm 41HA are laid on the pulleys 651 to 654 in the plurality of pulleys 65.

In a case where the puppet operating device according to the present embodiment includes the base unit 5, a wire WR connected to the sliding section 5522 of the main moving link 552 is laid on the pulley 655, and a wire WR connected to the sliding section 5512 of the main moving link 551 is laid on the pulley 656. Meanwhile, in a case where the puppet operating device according to the present embodiment includes the base unit 5A, a wire WR connected to one arch of the first arch 5A4 and the second arch 5A5 is laid on the pulley 655, and a wire WR connected to the other arch of the first arch 5A4 and the second arch 5A5 is laid on the pulley 656.

The housing 66B is formed in a substantially hexagonal shape as seen from +Z direction. The housing 66B rotatably supports therein the plurality of pulleys 65. The housing 66B has a plurality of first openings 66B1 and one second opening 66B2.

The plurality of first openings 66B1 are provided through side surfaces of the housing 66B facing the six drive devices 7. Each wire WR extending from a drive device 7 is inserted through a first opening 66B1. Each wire WR inserted into a first opening 66B1 is laid on a corresponding pulley 65 in the plurality of pulleys 65.

The second opening 66B2 is provided through a +Z direction side surface of the housing 66B. Each wire WR whose extending direction is converted in +Z direction by the corresponding pulley 65 is inserted through the second opening 66B2. As a result, the extending directions of the wires WR extending from the respective drive devices 7 can be made +Z direction uniformly, and, in addition, the area where the respective wires WR pass through on the X-Y plane can be made smaller.

[Advantages of Third Embodiment] The operation system according to the present embodiment explained above achieves advantages similar to those of the operation system 1 according to the first embodiment or the operation system according to the second embodiment.

[Modifications of Embodiments] The present invention is not limited to the respective embodiments described above, and modifications, improvements, and the like within the scope that can achieve the object of the present invention are included in the present invention.

In the respective embodiments described above, the operation targets that the drive devices 7 cause to perform actions by unwinding and pulling the wires WR are the arms 41 constituting the manipulator MP. In addition, in the first and third embodiments described above, the operation targets of the drive devices 7 are the main moving links 551 and 552 constituting the movable base MV, and, in the second and third embodiments described above, the operation targets of the drive devices 7 are the first arch 5A4 and the second arch 5A5 constituting the movable base MVA. However, this is not the sole example. Operation targets that the drive devices 7 cause to perform actions can be any operation targets. For example, the operation targets may be robot hands.

In the respective embodiments described above, each drive device 7 includes the motor 71, the fixation member 72, the cover member 73, the first rotating member 74, the second rotating member 75, the coupling member 76, the first urging member 77, and the second urging member 78. Among them, the first rotating member 74, the second rotating member 75, and the first urging member 77 constitute the rotating member RM, and the second rotating member 75, the coupling member 76, and the second urging member 78 constitute the pulling member TM. However, this is not the sole example. For example, each drive device 7 may include the motor 71, the rotating member RM, the coupling member 76, and the second urging member 78, but not include other constituent elements. In addition, for example, each drive device 7 may include the motor 71, the first rotating member 74, and the pulling member TM, but not include other constituent elements.

In the respective embodiments described above, the first rotating member 74 has the protrusion 743 as the first protrusion, and the second rotating member 75 constituting the pulling member TM has the protrusion 753 as the second protrusion that is arranged in +D direction relative to the protrusion 743 and that can contact the protrusion 743. However, this is not the sole example. The protrusions 743 and 753 may not be present as long as a state where the second rotating member 75 can be relatively rotated in +D direction relative to the first rotating member 74 against the urging force of the first urging member 77 according to the tension of the wire WR and a state where the second rotating member 75 cannot be relatively rotated can be switched from one to the other.

In the respective embodiments described above, the second rotating member 75 has the guide protrusion 755, and the coupling member 76 has the guide groove 765 and the contact section 766. However, this is not the sole example. The guide protrusion 755, the guide groove 765, and the contact section 766 may not be present. For example, the guide protrusion 755 and the guide groove 765 having the guide protrusion 755 arranged therein may not be present as long as the coupling member 76 includes a contact section that contacts the second rotating member 75 to rotate the second rotating member 75 in +D direction when the wire WR is moved in +E1 direction due to an external factor.

In addition, it is sufficient if the coupling member 76 is coupled with the wire WR, and the coupling member 76 may not necessarily hold the end WR1 of the wire WR. That is, a portion at which the wire WR is coupled with the coupling member 76 may not be the end WR1.

In the respective embodiments described above, the second urging member 78 is connected to the coupling member 76 and the cover member 73. However, this is not the sole example. A part, other than the coupling member 76, connected with the second urging member 78 may be another constituent element and, for example, may be the motor 71.

In the respective embodiments described above, the manipulator MP includes the four arms 41 (41HA, 41HB, 41R, 41L), the four drive devices 7 (7A to 7D), and the four wires WR. However, this is not the sole example. The number of sets of the arm 41, the drive device 7, and the wire WR included in the manipulator MP can be changed as appropriate. In addition, the arrangement and configuration of the arms 41 are not limited to the arrangement and configuration described above and can be changed as appropriate.

In the first embodiment described above, the support mechanism 54 of the movable base MV includes the follower moving links 553 and 554 in addition to the main moving links 551 and 552. However, this is not the sole example. The numbers of main moving links and follower moving links included in the support mechanism 54 can be changed as appropriate. For example, the support mechanism 54 may include one or more main moving links but may not include follower moving links. In addition, for example, the support mechanism 54 may include other links instead of follower moving links. In this case, one end of each of the other links may be connected to the first base 51 in such a manner that the link can rotate about its rotation axis crossing an extending direction of the other links, and the other end of each of the other links may be connected to the second base 52 in such a manner that the link can rotate about its rotation axis crossing the extending direction of the other links.

In the first embodiment described above, the main moving link 551 and the follower moving link 553 whose sliding sections 5512 and 5532 can slide in ±X direction are arranged being spaced apart from each other in +X direction. Specifically, an imaginary line linking the main moving link 551 and the follower moving link 553 as seen from +Z direction is parallel to +X direction. The main moving link 552 and the follower moving link 554 whose sliding sections 5522 and 5542 can slide along +Y direction are arranged being spaced apart from each other in +Y direction. Specifically, an imaginary line linking the main moving link 552 and the follower moving link 554 as seen from +Z direction is parallel to +Y direction. However, this is not the sole example. The arrangement of main moving links and follower moving links included in the support mechanism 54 is not limited to that described above and can be changed as appropriate.

In the first embodiment described above, the lengthwise dimensions of the main moving links 551 and 552 are shorter than the lengthwise dimensions of the follower moving links 553 and 554. However, this is not the sole example. The lengthwise dimensions of the main moving links may be greater than or the same as the lengthwise dimensions of the follower moving links. In addition, the lengthwise dimensions of the links 55 included in the support mechanism 54 may be different link by link. That is, the lengthwise dimension of at least one link 55 in the links 55 included in the support mechanism 54 may be different from the lengthwise dimension of another link 55.

In the first embodiment described above, the base to which the respective mounting sections 5511, 5521, 5531, and 5541 are rotatably connected is the first base 51, which is one base of the first base 51 and the second base 52. In addition, the base to which the respective sliding sections 5512, 5522, 5532, and 5542 are slidably connected is the second base 52, which is the other base of the first base 51 and the second base 52. However, this is not the sole example. The respective mounting sections 5511, 5521, 5531, and 5541 may be rotatably connected to the second base 52, and the respective sliding sections 5512, 5522, 5532, and 5542 may be slidably connected to the first base 51.

In the first embodiment described above, the wires WR are connected to the sliding sections 5512 and 5522 of the main moving links 551 and 552. However, this is not the sole example. The connection positions of the wires WR in the main moving links 551 and 552 may be other positions as long as the sliding sections 5512 and 5522 can slide.

In the first embodiment described above, the wire WR connected to the sliding section 5512 of the main moving link 551 is inserted through the hole 5312 of the first guide rail 531, and the wire WR connected to the sliding section 5522 of the main moving link 552 is inserted through the hole 5322 of the first guide rail 532. However, this is not the sole example. Such holes 5312 and 5322 may not be present.

In the first embodiment described above, the drive devices that unwind and pull the wires WR connected to the main moving links 551 and 552 are the drive devices 7. In the second embodiment described above, the drive devices that unwind and pull the wires WR connected to the first arch 5A4 and the second arch 5A5 are the drive devices 7. That is, the drive devices constituting the movable bases MV and MVA are the drive devices 7 including protecting mechanisms and tension maintaining mechanisms described above. However, this is not the sole example. The drive devices constituting the movable bases MV and MVA may be drive devices not including protecting mechanisms and tension maintaining mechanisms. Motors such as servomotors can be mentioned as examples of such drive devices.

In the respective embodiments described above, the manipulator MP and the movable bases MV and MVA are applied to the puppet operating devices 2 and 2A that cause the puppet PP to perform actions. However, this is not the sole example. Each of the manipulator MP and the movable bases MV and MVA may be applied to other electronic equipment or may be configured as a discrete device.

[Summary of Present Invention] Hereinbelow, a summary of the present invention is stated additionally.

[1] A drive device according to a first aspect of the present invention is a drive device that unwinds, in a first direction, a wire connected to an operation target with predetermined tension and pulls the wire in a direction opposite to the first direction to cause the operation target to perform an action. The drive device includes a motor, a first rotating member that is able to be rotated by the motor in a second direction and in a direction opposite to the second direction about a rotation axis, a pulling member that is provided rotatably coaxially with the first rotating member, holds an end of the wire, rotates in the second direction to unwind the wire in the first direction, and rotates in the direction opposite to the second direction to pull the wire in the direction opposite to the first direction, and a pulling member side urging member that urges the pulling member in the direction opposite to the second direction relative to the first rotating member. When the wire is moved in the first direction due to an external factor, the pulling member rotates in the second direction against an urging force of the pulling member side urging member, to unwind the wire in the first direction.

According to such a configuration, rotation of the first rotating member and the pulling member by the motor in the second direction can unwind the wire connected to the operation target in the first direction. In addition, rotation of the first rotating member and the pulling member by the motor in the direction opposite to the second direction can pull the wire in the direction opposite to the first direction. As a result, the operation target can be caused to perform an action.

In addition, in a case where the wire is moved in the first direction due to an external factor, rotation of the pulling member in the second direction, which is the rotation direction of the pulling member at the time when the wire is unwound in the first direction, against the urging force of the pulling member side urging member can unwind the wire in the first direction without causing the first rotating member to rotate. As a result, it is possible to prevent a load due to the external factor from being applied to the motor.

[2] In the drive device according to [1], the first rotating member may have a first protrusion, and the pulling member may have a second protrusion that is arranged in the second direction relative to the first protrusion and that is able to contact the first protrusion.

According to such a configuration, when the pulling member is rotated by the pulling member side urging member in the direction opposite to the second direction, the second protrusion of the pulling member abuts on the first protrusion of the first rotating member. As a result, relative rotation of the pulling member in the second direction relative to the first rotating member can be limited to only when the wire is moved in the first direction due to an external factor.

[3] In the drive device according to [1] or [2], the pulling member may have a second rotating member that is provided rotatably coaxially with the first rotating member and that is connected with the pulling member side urging member, a coupling member that is coupled with the wire and that is rotatable coaxially with the second rotating member, and a coupling member side urging member that urges the coupling member in the direction opposite to the second direction.

According to such a configuration, the second rotating member and the coupling member rotate integrally when the urging force of the coupling member side urging member is smaller than the tension of the wire. Because of this, as described above, in a case where the wire is moved in the first direction due to an external factor, rotation of the pulling member in the second direction against the urging force of the pulling member side urging member can unwind the wire in the first direction.

On the other hand, if the wire is moved in the direction opposite to the first direction due to an external factor and the urging force of the coupling member side urging member gets greater than the tension of the wire, rotation of the coupling member in the direction opposite to the second direction due to the urging force of the coupling member side urging member pulls the wire in the direction opposite to the first direction. As a result, the tension of the wire can be maintained in a predetermined range. Accordingly, the wire can be prevented from loosening, and it is possible to cause the operation target to perform an action stably.

[4] In the drive device according to [3], the second rotating member may have a guide protrusion, and the coupling member may have a guide groove provided with the guide protrusion slidably along the second direction, and a contact section that is provided to the guide groove and that contacts a surface of the guide protrusion positioned in the direction opposite to the second direction.

According to such a configuration, when the wire is moved in the first direction due to an external factor, the guide protrusion arranged in the guide groove presses the contact section, and the coupling member coupled with the wire can thus rotate in the second direction along with the second rotating member against the urging force of the pulling member side urging member. That is, the pulling member can be rotated in the second direction without causing the first rotating member to rotate. Accordingly, the wire can be unwound in the first direction, and hence, it is possible to prevent a load from being applied to the motor.

[5] In the drive device according to [3] or [4], the urging force of the pulling member side urging member may be greater than the tension of the wire in a reference state, and an urging force of the coupling member side urging member may be smaller than the tension of the wire in the reference state.

According to such a configuration, unless the wire is moved in the first direction or in the direction opposite to the first direction due to an external factor, the first rotating member and the pulling member can be rotated integrally.

In addition, in a case where the wire is moved in the first direction due to an external factor and the tension of the wire gets greater than the urging force of the pulling member side urging member, the second rotating member can be rotated relatively in the second direction relative to the first rotating member. As a result, it is possible to prevent a load from being applied to the motor.

Furthermore, in a case where the wire is moved in the direction opposite to the first direction due to an external factor and the tension of the wire gets smaller than the urging force of the coupling member side urging member, the coupling member can be rotated relatively in the direction opposite to the second direction relative to the second rotating member. As a result, the tension of the wire can be maintained in a predetermined range.

[6] A drive device according to a second aspect of the present invention is a drive device that unwinds, in a first direction, a wire connected to an operation target with predetermined tension and pulls the wire in a direction opposite to the first direction to cause the operation target to perform an action. The drive device includes a motor, a rotating member that is able to be rotated by the motor in a second direction and in a direction opposite to the second direction about a rotation axis, a coupling member that is provided rotatably coaxially with the rotating member, is coupled with the wire, rotates in the second direction integrally with the rotating member to unwind the wire in the first direction, and rotates in the direction opposite to the second direction integrally with the rotating member to pull the wire in the direction opposite to the first direction, and a coupling member side urging member that urges the coupling member in the direction opposite to the second direction. When the wire is moved in the direction opposite to the first direction due to an external factor, the coupling member rotates in the direction opposite to the second direction independently of the rotating member due to an urging force of the coupling member side urging member to pull the wire in the direction opposite to the first direction.

According to such a configuration, rotation of the rotating member and the coupling member by the motor in the second direction can unwind the wire connected to the operation target in the first direction. In addition, rotation of the rotating member and the coupling member by the motor in the direction opposite to the second direction can pull the wire in the direction opposite to the first direction. As a result, the operation target can be caused to perform an action.

In addition, in a case where the wire is moved in the direction opposite to the first direction due to an external factor, rotation of the coupling member in the direction opposite to the second direction, which is the rotation direction of the coupling member at the time when the wire is pulled in the direction opposite to the first direction, due to the urging force of the coupling member side urging member can pull the wire in the direction opposite to the first direction without causing the rotating member to rotate. As a result, the tension of the wire can be maintained in a predetermined range. Accordingly, the operation target can be caused to perform an action stably.

[7] In the drive device according to [6], the rotating member may include a first rotating member that is able to be rotated by the motor in the second direction and in the direction opposite to the second direction about the rotation axis, a second rotating member that is provided rotatably in the second direction and in the direction opposite to the second direction coaxially with the first rotating member, and a rotating member side urging member that urges the second rotating member in the direction opposite to the second direction relative to the first rotating member. When the wire is moved in the first direction due to an external factor, the second rotating member may rotate in the second direction integrally with the coupling member against an urging force of the rotating member side urging member, to unwind the wire in the first direction.

According to such a configuration, the first rotating member and the second rotating member rotate integrally when the urging force of the rotating member side urging member is greater than the tension of the wire. Because of this, the wire can be moved in the first direction or in the direction opposite to the first direction according to the drive state of the motor that rotates the first rotating member.

Meanwhile, when the wire is moved in the first direction due to an external factor and the tension of the wire gets greater than the urging force of the rotating member side urging member, rotation of the second rotating member in the second direction against the urging force of the rotating member side urging member can unwind the wire in the first direction without causing the first rotating member to rotate. As a result, it is possible to prevent a load from being applied to the motor.

[8] In the drive device according to [7], the second rotating member may have a guide protrusion, and the coupling member may have a guide groove provided with the guide protrusion slidably along the second direction, and a contact section that is provided to the guide groove and that contacts a surface of the guide protrusion positioned in the direction opposite to the second direction.

According to such a configuration, as with the drive device according to the first aspect described above, when the wire is moved in the first direction due to an external factor, the guide protrusion arranged in the guide groove presses the contact section, and the coupling member coupled with the wire can thus rotate in the second direction along with the second rotating member against the urging force of the coupling member side urging member. That is, the second rotating member and the coupling member can be rotated in the second direction without causing the first rotating member to rotate. Accordingly, the wire can be unwound in the first direction, and hence, it is possible to prevent a load from being applied to the motor.

[9] In the drive device according to [7] or [8], the urging force of the rotating member side urging member may be greater than the tension of the wire in a reference state, and the urging force of the coupling member side urging member may be smaller than the tension of the wire in the reference state.

According to such a configuration, advantages similar to those of the drive device according to the first aspect described above can be achieved.

That is, unless the wire is moved in the first direction or in the direction opposite to the first direction due to an external factor, the rotating member and the coupling member can be rotated integrally.

In addition, in a case where the wire is moved in the first direction due to an external factor and the tension of the wire gets greater than the urging force of the rotating member side urging member, the second rotating member can be rotated relatively in the second direction relative to the first rotating member. As a result, it is possible to prevent a load from being applied to the motor.

Furthermore, in a case where the wire is moved in the direction opposite to the first direction due to an external factor and the tension of the wire gets smaller than the urging force of the coupling member side urging member, the coupling member can be rotated relatively in the direction opposite to the second direction relative to the second rotating member. As a result, the tension of the wire can be maintained in a predetermined range.

[10] The drive device according to any one of [3] to [9] may include a cover member mounted on the motor, and the coupling member side urging member may be connected to the coupling member and the cover member.

According to such a configuration, the coupling member side urging member can be arranged stably.

[11] A manipulator according to a third aspect of the present invention is a manipulator including an arm having a plurality of links bendable relative to each other, a wire connected to at least one of the plurality of links, and the drive device according to the first or second aspect described above that unwinds the wire in the first direction and pulls the wire in the direction opposite to the first direction to drive the arm.

According to such a configuration, advantages similar to those of the drive device according to the first and second aspects described above can be achieved. In addition, as a result, the arm can be caused to perform actions stably.

[12] A puppet operating device according to a fourth aspect of the present invention is a puppet operating device that is attached inside a puppet and that causes the puppet to perform an action. The puppet operating device includes the manipulator according to [11] and a support member. The manipulator includes a plurality of sets of the arm, the wire, and the drive device. A plurality of the arms include a first arm that is mounted to extend leftward from a left portion of the support member as seen from a front surface side of the support member, a second arm that is mounted to extend rightward from a right portion of the support member as seen from the front surface side of the support member, and a third arm and a fourth arm that are mounted to extend upward from an upper portion of the support member as seen from the front surface side of the support member. The third arm is arranged to a left side of the fourth arm as seen from the front surface side of the support member.

According to such a configuration, for example, the first arm and the second arm can cause the right arm section and the left arm section of the puppet to perform actions. In addition, for example, the third and fourth arms can cause the head section of the puppet to perform actions. Accordingly, it is possible to cause the puppet to perform diverse actions.

[13] In the puppet operating device according to [12], the first arm may cause a right arm section of the puppet to perform an action, the second arm may cause a left arm section of the puppet to perform an action, and the third arm and the fourth arm may mutually independently cause a head section of the puppet to perform an action.

According to such a configuration, by operating the third arm and the fourth arm independently, for example, it is possible to incline the head section of the puppet rightward or incline the head section of the puppet leftward as seen from the front surface side. Accordingly, it is possible to cause the puppet to perform diverse actions.

[14] A movable base according to a fifth aspect of the present invention includes a first base, a second base arranged to face the first base, a support mechanism that is provided to the second base and that supports the first base, a wire, and the drive device according to the first or second aspect described above that unwinds and pulls the wire. The support mechanism includes a main moving link having a main moving link side mounting section mounted on one base of the first base and the second base and a main moving link side sliding section that is able to slide along the other base of the first base and the second base. The drive device either pulls or unwinds the wire to cause the main moving link side sliding section to slide, thereby inclining the first base relative to the second base.

According to such a configuration, advantages similar to those of the drive device according to the first and second aspects described above can be achieved. In addition, as a result, it is possible to cause the main moving link to perform an action stably, and it is thus possible to incline the first base stably relative to the second base.

[15] In the movable base according to [14], the support mechanism may include a follower moving link having a follower moving link side mounting section mounted on the one base and a follower moving link side sliding section that is able to slide along the other base. The follower moving link may be provided being spaced apart from the main moving link in a direction in which the main moving link side sliding section is able to slide.

According to such a configuration, since the first base is supported by the second base by use of the main moving link and the follower moving link, the first base can be supported stably. In addition, while the main moving link side sliding section is caused to slide by the drive device, the follower moving link side sliding section is not caused to slide by a drive device but slides following the movement of the main moving link side sliding section. Because of this, as compared to a configuration in which the follower moving link side sliding section is caused to slide by a drive device, the number of drive devices to cause the movable base to perform an action can be reduced.

[16] In the movable base according to [15], a plurality of the main moving links may be provided, a plurality of the follower moving links may be provided, a plurality of the drive devices may be provided corresponding to the plurality of main moving links, directions in which the respective main moving link side sliding sections in the plurality of main moving links are able to slide may cross each other, and directions in which the respective follower moving link side sliding sections in the plurality of follower moving links are able to slide may cross each other.

According to such a configuration, the first base can be supported stably.

In addition, by arranging the plurality of main moving links and the plurality of follower moving links as described above, inclination directions of the first base can be increased.

[17] In the movable base according to [16], the plurality of main moving links may include a first main moving link and a second main moving link, the plurality of follower moving links may include a first follower moving link and a second follower moving link, a direction in which the main moving link side sliding section of the first main moving link is able to slide and a direction in which the follower moving link side sliding section of the first follower moving link is able to slide may be parallel to each other, a direction in which the main moving link side sliding section of the second main moving link is able to slide and a direction in which the follower moving link side sliding section of the second follower moving link is able to slide may be parallel to each other, and the direction in which the main moving link side sliding section of the first main moving link is able to slide and the direction in which the main moving link side sliding section of the first main moving link is able to slide may be perpendicular to each other.

According to such a configuration, the first main moving link, the second main moving link, the first follower moving link, and the second follower moving link are arranged radially about a position between the first main moving link and the first follower moving link. As a result, by causing each of the main moving link side sliding section of the first main moving link and the main moving link side sliding section of the second main moving link to slide independently, the first base can be inclined in any direction relative to the second base. Accordingly, the convenience of the movable base can be enhanced.

[18] In the movable base according to any one of to [17], a lengthwise dimension of the main moving link may be shorter than a lengthwise dimension of the follower moving link.

Here, the inclination angle of the main moving link relative to the second base increases as the main moving link side sliding section and the main moving link side mounting section get closer to each other as seen from the side of the first base, and decreases as the main moving link side sliding section and the main moving link side mounting section get farther from each other. Because of this, for example, in a case where one main moving link and one follower moving link are arranged facing each other, if the lengthwise dimension of the main moving link and the lengthwise dimension of the follower moving link are the same, the first base can be inclined only toward the side of the follower moving link relative to the main moving link even if the main moving link side sliding section is moved.

To cope with this, the lengthwise dimension of the main moving link is shorter than the lengthwise dimension of the follower moving link. As a result, by causing the main moving link side sliding section to slide and making the inclination angle of the main moving link relative to the second base smaller, the first base can be inclined toward the side of the main moving link. In addition, by causing the main moving link side sliding section to slide and making the inclination angle of the main moving link relative to the second base greater, the first base can be inclined toward the side of the follower moving link. Accordingly, inclination directions of the first base can be increased.

[19] In the movable base according to any one of to [18], the one base may be the first base, and the other base may be the second base.

According to such a configuration, in a case where the second base where the main moving link side sliding section and the follower moving link side sliding section are arranged is arranged below the first base, the second base can be formed larger than the first base. As a result, the sliding area of the main moving link side sliding section and the sliding area of the follower moving link side sliding section can be made larger.

[20] In the movable base according to any one of to [19], the wire may be connected to the main moving link side sliding section.

According to such a configuration, it can be made easier to cause the main moving link side sliding section to slide, by using the wire unwound and pulled by the drive device.

[21] The movable base according to [20] may include a guide rail that slidably supports the main moving link side sliding section, and the guide rail may have a hole that is provided in a sliding direction of the main moving link side sliding section supported by the guide rail and through which the wire connected to the main moving link side sliding section is inserted.

According to such a configuration, each wire can be connected to a main moving link side sliding section without being caused to twist. Accordingly, the reliability of the movable base can be enhanced.

REFERENCE SIGNS LIST

1: Operation system
11: Operating device
13: First control device
14: Second control device
2, 2A: Puppet operating device
3: Action unit
4: Arm unit
41: Arm
41H: Upper arm
41HA: Upper first arm
41HB: Upper second arm
41L: Left arm
41R: Right arm
5: Base unit
51: First base
52: Second base
53: Guide rail
531, 532: First guide rail
533, 534: Second guide rail
54: Support mechanism
55: Link
551, 552: Main moving link
5511, 5521: Mounting section (main moving link side mounting section)
5512, 5522: Sliding section (main moving link side sliding section)
553, 554: Follower moving link
5531, 5541: Mounting section (follower moving link side mounting section)
5532, 5542: Sliding section (follower moving link side sliding section)
6: Drive unit
61: Base member
62: Post
63: Support plate
64, 64B: Pulley unit
65: Pulley
7, 7A, 7B, 7C, 7D, 7E, 7F: Drive device
71: Motor
711: Housing section
712: Shaft
713: Servo horn
72: Fixation member
73: Cover member
731: Mounting section
732: Standing section
733: Cut
734, 735: Restricting section
74: First rotating member
743: Protrusion (first protrusion)
75: Second rotating member
753: Protrusion (second protrusion)
755: Guide protrusion
76: Coupling member
765: Guide groove
766: Contact section
77: First urging member (pulling member side urging member, rotating member side urging member)
78: Second urging member (coupling member side urging member)
MP: Manipulator
MV, MVA: Movable base
PP: Puppet
RM: Rotating member
TM: Pulling member
WR: Wire
WR1: End

The invention claimed is:

1. A drive device that unwinds, in a first direction, a wire connected to an operation target with predetermined tension and pulls the wire in a direction opposite to the first direction to cause the operation target to perform an action, the drive device comprising:
a motor;
a first rotating member that is able to be rotated by the motor in a second direction and in a direction opposite to the second direction about a rotation axis;
a pulling member that is provided rotatably coaxially with the first rotating member, holds an end of the wire, rotates in the second direction to unwind the wire in the first direction, and rotates in the direction opposite to the second direction to pull the wire in the direction opposite to the first direction; and
a pulling member side urging member that urges the pulling member in the direction opposite to the second direction relative to the first rotating member, wherein,
when the wire is moved in the first direction due to an external factor, the pulling member rotates in the second direction against an urging force of the pulling member side urging member, to unwind the wire in the first direction.

2. The drive device according to claim 1, wherein
the first rotating member has a first protrusion, and
the pulling member has a second protrusion that is arranged in the second direction relative to the first protrusion and that is able to contact the first protrusion.

3. The drive device according to claim 1, wherein
the pulling member has
a second rotating member that is provided rotatably coaxially with the first rotating member and that is connected with the pulling member side urging member,
a coupling member that is coupled with the wire and that is rotatable coaxially with the second rotating member, and
a coupling member side urging member that urges the coupling member in the direction opposite to the second direction.

4. The drive device according to claim 3, wherein
the second rotating member has a guide protrusion, and
the coupling member has a guide groove provided with the guide protrusion slidably along the second direction, and a contact section that is provided to the guide groove and that contacts a surface of the guide protrusion positioned in the direction opposite to the second direction.

5. The drive device according to claim 3, wherein
the urging force of the pulling member side urging member is greater than the tension of the wire in a reference state, and
an urging force of the coupling member side urging member is smaller than the tension of the wire in the reference state.

6. A drive device that unwinds, in a first direction, a wire connected to an operation target with predetermined tension and pulls the wire in a direction opposite to the first direction to cause the operation target to perform an action, the drive device comprising:
a motor;
a rotating member that is able to be rotated by the motor in a second direction and in a direction opposite to the second direction about a rotation axis;
a coupling member that is provided rotatably coaxially with the rotating member, is coupled with the wire, rotates in the second direction integrally with the rotating member to unwind the wire in the first direction, and rotates in the direction opposite to the second direction integrally with the rotating member to pull the wire in the direction opposite to the first direction; and
a coupling member side urging member that urges the coupling member in the direction opposite to the second direction, wherein,
when the wire is moved in the direction opposite to the first direction due to an external factor, the coupling member rotates in the direction opposite to the second direction independently of the rotating member due to an urging force of the coupling member side urging member to pull the wire in the direction opposite to the first direction.

7. The drive device according to claim 6, wherein
the rotating member includes
a first rotating member that is able to be rotated by the motor in the second direction and in the direction opposite to the second direction about the rotation axis,
a second rotating member that is provided rotatably in the second direction and in the direction opposite to the second direction coaxially with the first rotating member, and
a rotating member side urging member that urges the second rotating member in the direction opposite to the second direction relative to the first rotating member, and,
when the wire is moved in the first direction due to an external factor, the second rotating member rotates in the second direction integrally with the coupling member against an urging force of the rotating member side urging member, to unwind the wire in the first direction.

8. The drive device according to claim 7, wherein
the second rotating member has a guide protrusion, and
the coupling member has
a guide groove provided with the guide protrusion slidably along the second direction, and
a contact section that is provided to the guide groove and that contacts a surface of the guide protrusion positioned in the direction opposite to the second direction.

9. The drive device according to claim 7, wherein
the urging force of the rotating member side urging member is greater than the tension of the wire in a reference state, and
the urging force of the coupling member side urging member is smaller than the tension of the wire in the reference state.

10. The drive device according to claim 3, comprising:
a cover member mounted on the motor, wherein
the coupling member side urging member is connected to the coupling member and the cover member.

11. A manipulator comprising:
an arm having a plurality of links bendable relative to each other;
a wire connected to at least one of the plurality of links; and
a drive device that unwinds, in a first direction, the wire connected to an operation target with predetermined tension and pulls the wire in a direction opposite to the first direction to cause the operation target to perform an action, the drive device comprising:
a motor;
a first rotating member that is able to be rotated by the motor in a second direction and in a direction opposite to the second direction about a rotation axis;
a pulling member that is provided rotatably coaxially with the first rotating member, holds an end of the wire, rotates in the second direction to unwind the wire in the first direction, and rotates in the direction opposite to the second direction to pull the wire in the direction opposite to the first direction; and
a pulling member side urging member that urges the pulling member in the direction opposite to the second direction relative to the first rotating member, wherein,
when the wire is moved in the first direction due to an external factor, the pulling member rotates in the second direction against an urging force of the pulling member side urging member, to unwind the wire in the first direction.

12. A puppet operating device that is attached inside a puppet and that causes the puppet to perform an action, the puppet operating device comprising:
a manipulator comprising:
an arm having a plurality of links bendable relative to each other;
a wire connected to at least one of the plurality of links; and
a drive device that unwinds, in a first direction, the wire connected to an operation target with predetermined tension and pulls the wire in a direction opposite to the first direction to cause the operation target to perform an action, the drive device comprising:

a motor;

a first rotating member that is able to be rotated by the motor in a second direction and in a direction opposite to the second direction about a rotation axis;

a pulling member that is provided rotatably coaxially with the first rotating member, holds an end of the wire, rotates in the second direction to unwind the wire in the first direction, and rotates in the direction opposite to the second direction to pull the wire in the direction opposite to the first direction; and a pulling member side urging member that urges the pulling member in the direction opposite to the second direction relative to the first rotating member, wherein, when the wire is moved in the first direction due to an external factor, the pulling member rotates in the second direction against an urging force of the pulling member side urging member, to unwind the wire in the first direction; and a support member, wherein the manipulator includes a plurality of sets of the arm, the wire, and the drive device, a plurality of the arms include a first arm that is mounted to extend leftward from a left portion of the support member as seen from a front surface side of the support member, a second arm that is mounted to extend rightward from a right portion of the support member as seen from the front surface side of the support member, and a third arm and a fourth arm that are mounted to extend upward from an upper portion of the support member as seen from the front surface side of the support member, and the third arm is arranged to a left of the fourth arm as seen from the front surface side of the support member.

13. The puppet operating device according to claim 12, wherein the first arm causes a right arm section of the puppet to perform an action, the second arm causes a left arm section of the puppet to perform an action, and the third arm and the fourth arm mutually independently cause a head section of the puppet to perform an action.

14. A movable base comprising:

a first base;

a second base arranged to face the first base;

a support mechanism that is provided to the second base and that supports the first base;

a wire; and a drive device that unwinds, in a first direction, the wire connected to an operation target with predetermined tension and pulls the wire in a direction opposite to the first direction to cause the operation target to perform an action, the drive device comprising:

a motor;

a first rotating member that is able to be rotated by the motor in a second direction and in a direction opposite to the second direction about a rotation axis;

a pulling member that is provided rotatably coaxially with the first rotating member, holds an end of the wire, rotates in the second direction to unwind the wire in the first direction, and rotates in the direction opposite to the second direction to pull the wire in the direction opposite to the first direction; and a pulling member side urging member that urges the pulling member in the direction opposite to the second direction relative to the first rotating member, wherein, when the wire is moved in the first direction due to an external factor, the pulling member rotates in the second direction against an urging force of the pulling member side urging member, to unwind the wire in the first direction, wherein the support mechanism includes a main moving link having a main moving link side mounting section mounted on one base of the first base and the second base and a main moving link side sliding section that is able to slide along the other base of the first base and the second base, and the drive device either pulls or unwinds the wire to cause the main moving link side sliding section to slide, thereby inclining the first base relative to the second base.

15. The movable base according to claim 14, wherein the support mechanism includes a follower moving link having a follower moving link side mounting section mounted on the one base and a follower moving link side sliding section that is able to slide along the other base, and the follower moving link is provided being spaced apart from the main moving link in a direction in which the main moving link side sliding section is able to slide.

16. The movable base according to claim 15, wherein a plurality of the main moving links are provided, a plurality of the follower moving links are provided, a plurality of the drive devices are provided corresponding to the plurality of main moving links, directions in which the respective main moving link side sliding sections in the plurality of main moving links are able to slide cross each other, and directions in which the respective follower moving link side sliding sections in the plurality of follower moving links are able to slide cross each other.

17. The movable base according to claim 16, wherein the plurality of main moving links include a first main moving link and a second main moving link, the plurality of follower moving links include a first follower moving link and a second follower moving link, a direction in which the main moving link side sliding section of the first main moving link is able to slide and a direction in which the follower moving link side sliding section of the first follower moving link is able to slide are parallel to each other, a direction in which the main moving link side sliding section of the second main moving link is able to slide and a direction in which the follower moving link side sliding section of the second follower moving link is able to slide are parallel to each other, and the direction in which the main moving link side sliding section of the first main moving link is able to slide and the direction in which the main moving link side sliding section of the first main moving link is able to slide are perpendicular to each other.

18. The movable base according to claim 15, wherein a lengthwise dimension of the main moving link is shorter than a lengthwise dimension of the follower moving link.

19. The movable base according to claim 15, wherein the one base is the first base, and the other base is the second base.

20. The movable base according to claim 14, wherein the wire is connected to the main moving link side sliding section.

21. The movable base according to claim 20, comprising:
a guide rail that slidably supports the main moving link side sliding section, wherein
the guide rail has a hole that is provided in a sliding direction of the main moving link side sliding section supported by the guide rail and through which the wire connected to the main moving link side sliding section is inserted.

* * * * *